(12) United States Patent
Bui et al.

(10) Patent No.: US 9,886,722 B1
(45) Date of Patent: Feb. 6, 2018

(54) INSURANCE MARKETING METHODS

(75) Inventors: Huyen K. Bui, Daly City, CA (US); Jeffrey Lewis Goodman, San Francisco, CA (US); Bennet Harvey, Tiburon, CA (US); Donald Holm, Walnut Creek, CA (US); Hans S. Johansen, Oakland, CA (US); Moncef Klouche, San Francisco, CA (US); Alex Lerner, San Francisco, CA (US); Patrick Traichal, El Sobrante, CA (US); David Zona, Burlingame, CA (US)

(73) Assignee: Esurance Insurance Services, Inc., San Francisco, CA (US)

( * ) Notice: Subject to any disclaimer, the term of this patent is extended or adjusted under 35 U.S.C. 154(b) by 1575 days.

(21) Appl. No.: 10/130,930

(22) PCT Filed: Nov. 27, 2000

(86) PCT No.: PCT/US00/32342
§ 371 (c)(1),
(2), (4) Date: May 22, 2002

(87) PCT Pub. No.: WO01/39090
PCT Pub. Date: May 31, 2001

Related U.S. Application Data

(60) Provisional application No. 60/167,636, filed on Nov. 26, 1999, provisional application No. 60/170,027, (Continued)

(51) Int. Cl.
*G06Q 40/08* (2012.01)
*G06Q 20/40* (2012.01)

(52) U.S. Cl.
CPC .......... *G06Q 40/08* (2013.01); *G06Q 20/401* (2013.01)

(58) Field of Classification Search
CPC .............................. G06Q 10/00; G06Q 30/02
(Continued)

(56) References Cited

U.S. PATENT DOCUMENTS 4,831,526 A * 5/1989 Luchs et al. ................. 705/4
4,975,840 A * 12/1990 DeTore et al. ............... 705/4
(Continued)

OTHER PUBLICATIONS

Dunlop, N., "Famous Last Words," Canadian Underwriter, pp. 1-3 (1997).
(Continued)

*Primary Examiner* — David Rines
(74) *Attorney, Agent, or Firm* — Mintz Levin Cohn Ferris Glovsky and Popeo, P.C.

(57) ABSTRACT

A method of purchasing and selling insurance includes transmitting property information, having the property information analyzed, modifying at least one quotation calculation underwriting rule based on the analysis of the information, creating an insurance pricing model based on the modified underwriting rule, transmitting and receiving the insurance quote, and purchasing insurance via computer. A method for modifying insurance coverage including transmitting property information and existing policy information to a first insurance provider, generating a document directed to a second insurance provider authorizing cancellation of the existing insurance policy and directing the second insurance provider to remit a refund payment.

23 Claims, 53 Drawing Sheets

Related U.S. Application Data filed on Dec. 10, 1999, provisional application No. 60/198,007, filed on Apr. 18, 2000, provisional application No. 60/199,483, filed on Apr. 25, 2000, provisional application No. 60/209,155, filed on Jun. 2, 2000.

(58) Field of Classification Search
USPC .......................................................... 705/4
See application file for complete search history.

(56) References Cited

U.S. PATENT DOCUMENTS

| | | | |
|---|---|---|---|
| 5,523,942 A | | 6/1996 | Tyler et al. |
| 5,537,315 A | | 7/1996 | Mitcham |
| 5,586,313 A | * | 12/1996 | Schnittker et al. ........ 707/104.1 |
| 5,655,085 A | * | 8/1997 | Ryan et al. ........................ 705/4 |
| 5,809,478 A | | 9/1998 | Greco et al. |
| 5,842,178 A | * | 11/1998 | Giovannoli ................. 705/26.4 |
| 5,845,256 A | * | 12/1998 | Pescitelli et al. .................. 705/4 |
| 5,855,005 A | * | 12/1998 | Schuler et al. .................... 705/4 |
| 6,064,970 A | | 5/2000 | McMillan et al. |
| 6,182,048 B1 | * | 1/2001 | Osborn et al. .................... 705/4 |
| 6,684,189 B1 | * | 1/2004 | Ryan et al. ........................ 705/4 |
| 6,983,253 B1 | * | 1/2006 | Maul et al. ........................ 705/4 |
| 7,027,992 B2 | * | 4/2006 | Zaccaria et al. .................. 705/4 |
| 7,124,088 B2 | * | 10/2006 | Bauer et al. ...................... 705/4 |
| 7,249,056 B1 | * | 7/2007 | Crouthamel .......... G06Q 30/06 |
| | | | 705/26.41 |
| 7,962,409 B2 | * | 6/2011 | O'Leary et al. ................ 705/39 |
| 2002/0026334 A1 | * | 2/2002 | Igoe .................................. 705/4 |
| 2002/0029158 A1 | * | 3/2002 | Wolff et al. ....................... 705/4 |
| 2004/0083125 A1 | * | 4/2004 | Almeida et al. .................. 705/4 |

OTHER PUBLICATIONS

Longo, T., "Insurance Online: Faster, Not Cheaper," Kiplinger's Personal Finance Magazine, p. 1 (1996).

Menchen, J., "Insurance Pioneers Blaze Trail on World Wide Web," National Underwriter, pp. 1-3 (1996).

Morningstar, M., "Drifting Toward Cyberspace," Best's Review, pp. 1-4 (1998).

Tauhert, C., "ITSA,ISI Alliance Promotes Point-of-Sale Underwriting," Insurance and Technology, pp. 1-2 (1996).

* cited by examiner

FIG. 2

2000 esurance
Insurance. Only Better.

Buy customized auto insurance in minutes!
We'll help you select the right coverage to save money.

| home | why buy from us | service commitment | about us | customer feedback | help center |

Planning Tools steps | 1 | 2 | 3 | Coverage Counselor    1070

Safe Driving
Esurance tips for safe winter driving.

International Driving
Is your insurance valid outside the U.S.?

Road Rage
Protect yourself from danger.

24/7 Customer Service
- chat with an insurance advisor online (go)
- call 1 800 926 6012

If you are uncertain about which types of coverage and limits/deductibles to buy, or you'd like to evaluate whether your current selections provide enough protection, this planning tool can help.

Complete the following questions and we'll provide some suggestions for your auto insurance plan.

► Information about you and your household

1. What is your marital status? [Divorced/Widow ▼] — 2001

2. Do you have children who live at home with you? [No, I do not have children ▼]

3. If you have children who live at home, how many are licensed to drive? [0] — 2003   2002

4. If you have children, how many of your children are 18 or older? [0] — 2004

5. Do you own or rent your home?   2005 — ⊙ Own   2006 — ○ Rent

6. If you own your home, what is its approximate value?   2007 — [$150,000 to $199,999 ▼]

7. Do you and people who are frequent passengers in your car (family, friends, or others) have health insurance?   2008   ⊙ Yes   2009 — ○ No 8. Select the option that best describes your health coverage:   2010 — [Covers almost all medical and dental ▼]

2011 — ( continue ►► )

Privacy Statement | Insurance Licenses | Legal Disclaimer | Insurance Ratings

FIG. 2A

| esurance — Insurance. Only Better. | Buy customized auto insurance in minutes! We'll help you select the right coverage to save money. | home | why buy from us | service commitment | about us | customer feedback | help center Planning Tools steps [1][2][3] Coverage Counselor          2100

Safe Driving
Esurance tips for safe winter driving.

International Driving
Is your insurance valid outside the U.S.?

Road Rage
Protect yourself from danger.

24/7 Customer Service
► chat with an insurance advisor online (go)
► call 1 800 926 6012

► Information about the assets you want to protect  2101

9. What is your household's annual salary-based income? [$100,000 to $109,999 ▼]

10. What is the estimated value of your savings and all other assets, such as stocks and bonds, including retirement investment accounts such as IRAs and 401k plans? 2102 [$25,000 to $99,999 ▼]

11. What is your expected net worth when you retire, including your future salary from employment, interest from your investments and your retirement accounts? 2103 [$1,500,000 to $1,999,999 ▼]

► Information about your automobiles                             2104       2105
12. Are any of your cars financed or leased?                      ○ Yes     ⊙ No 13. Are any of your cars currently in storage?             2106 ⊙ Yes  2107 ○ No 14. Do you or other drivers in your household often park 2108 in areas where cars are reportedly vandalized and/or stolen? ○ Yes  2109 ⊙ No 15. Do you or other drivers in your household drive in areas where 2110 accidents with deer and other large animals are common?  ○ Yes  2111 ⊙ No 16. Do you live in an area where severe storms, snow accumulation, flooding, and/or natural disasters occur? 2112 ○ Yes  2113 ⊙ No 17. If your car was damaged or needed replacement, would you have access to temporary alternative transportation?  2114 ○ Yes  2115 ⊙ No 18. Do any of your cars have a history of unexpected breakdowns?  2116 ○ Yes  2117 ⊙ No 19. Do you belong to an auto club or have a roadside assistance plan which pays for towing?  2118 ○ Yes  2119 ⊙ No 2120 ( view results ►► )

Note: This tool is provided for informational purposes only, to help you understand the various factors that may be relevant to coverage, limit and deductible selection. The tool is not intended to yield a recommendation from Esurance for an individual; rather, it leverages a general model that is applicable across a certain range of conditions. State insurance laws and specific underwriting rules may further restrict available coverage options. After using this tool, if you have additional questions about your coverage, please speak with an Esurance advisor.

FIG. 2C  ~2200 it during the six month policy term, you may not need collision coverage. We suggest you only waive your collision if you can be certain that no one will need to drive it. If you do drive without this coverage and you are in an accident, damage to your vehicle will not be covered.

When you take your car out of storage, be sure to obtain collision coverage and set the start date on or before the day you begin driving.

Comprehensive

Deductible

Based on your information, comprehensive coverage is suggested as an important part of your insurance protection. Consider a deductible of $1000. When selecting your deductible, there are two factors to keep in mind:

1. A higher deductible will lower the premium you pay for your insurance.
 2. You must be prepared to pay the deductible amount if you get into an accident.

In setting your deductible, think about which you'd prefer--a low insurance premium accompanied by a higher out-of-pocket amount in the event of a loss, or a higher premium to ensure lower out-of-pocket expenses toward a loss. On the Esurance site, it's easy to explore the effect of changing your deductible by getting a quote, then using our "customize coverage" features.

When examining your comprehensive deductible and your overall need for comprehensive coverage, consider whether you are generally at risk for the types of damages often paid for by comprehensive coverage, or whether other factors make this coverage suitable for you.

Storage

Although your car is currently in storage, you should consider comprehensive coverage to protect against damage that could occur while it is not in use. Even in a garage or closed facility, cars can be stolen or severely damaged by fire. Note that if you store your vehicle at home in the garage, typical homeowner's insurance specifically excludes damage to vehicles, so comprehensive coverage is the only way to protect your garaged car.

Medical Payments

Because you and your regular passengers are fully covered by a health plan, you may not need medical payments coverage.

However, if your health plan requires you to pay a deductible, medical payments coverage may help pay it. This coverage can also help pay for items not covered by your health plan, such as dental treatment, professional nursing services, prostheses, and funeral services. If covering a health deductible or paying for these additional treatments would be valuable to you, select a medical payments coverage amount that reflects your needs.

Though you are covered by a health plan, your state's insurance laws could require you to purchase Personal Injury Protection (PIP). PIP covers everything that medical payments coverage does, as well as rehabilitation, psychiatric treatment, lost wages, and similar costs relating to an accident.

It's a good idea to check your health plan to ensure that you do not duplicate your coverages. Depending on your health insurance, you may find that medical payments or PIP provide additional benefits.

Bodily Injury Liability and Uninsured/Underinsured Motorist

Given the financial assets you have specified, you should set your bodily injury liability and uninsured/underinsured motorist limits to be at least $250,000/500,000. The dual coverage limits refer to the maximum amounts that

FIG. 2D ⎯2200 will be paid per person, per accident, respectively.

Remember that you should purchase the highest limits you can comfortably afford in order to obtain maximum insurance protection. Further, the low limits required in some states are typically not enough to protect you and your household.

Some Statistics

Why is this the case? Inpatient hospitalization costs average around $14,000 per person nationwide. If someone is so badly hurt that they cannot work, wages may be lost during recovery. By adding the cost of lost wages to hospitalization costs, you can see why higher liability and uninsured motorist limits constitute an important protection.

Bodily Injury Facts

Your bodily injury liability covers you in the event you injure others in an accident. If you are held responsible for injuring someone, you are liable for the costs of their medical treatment, lost wages, and pain and suffering. You may also be subject to a lawsuit.

If a case involving personal injury caused by an automobile leads to a jury trial, injured parties typically win. Judgments in such cases can be substantial, exceeding $250,000 for cases of severe injury. And these figures do not include attorney's fees. If you are held responsible for injuring one person in an auto accident, you could easily be looking at $14,000 for hospitalization, the injured party's lost wages, a judgment of around $250,000, and legal fees—all of which could add up to more than $300,000.

Insurance helps protect you and your future from such financial calamities. As a result, it is extremely important to take these factors into account when you choose your bodily injury liability limits.

Uninsured/Underinsured Motorists

Uninsured or underinsured motorist liability coverage is equally important for similar reasons. These coverages protect you and your passengers if you are hit by a driver lacking full insurance coverage. If an uninsured or underinsured motorist hits your car and causes injuries, you and your passengers will have to pay for your medical treatment.

Those costs can quickly exceed the limits on many health plans, particularly for injuries that are more severe than average. For example, with four people in your car, medical treatment could be on the order of $50,000. When you add the cost of lost wages, pain and suffering, and rehabilitation expenses, it's easy to see why higher uninsured/underinsured motorist limits an extremely valuable protection.

Property Damage Liability Limits

Given the financial assets you have specified, you should select property damage bodily injury liability limits of at least $100,000. Remember that you should purchase the highest limits you can comfortably afford in order to obtain maximum insurance protection. Further, the low limits required in some states are typically not enough to protect you and your household.

Why is this the case? Consider the cost of a new car on average—over $20,000. If you are responsible for destroying someone else's car, you may be responsible for $20,000. If you cause an accident which destroys someone's Porsche, you will be liable for $40,000-$50,000 of damage. If you hit someone's house in an accident, structural damage to a home could easily top $50,000.

Property damage liability coverage provides a lot of protection and is inexpensive. It costs only a few dollars more to purchase a higher level of coverage.

Rental Car Reimbursement

Since getting around without your car would be difficult, you would probably need a

FIG. 2E  2200 rental car. Rental car reimbursement defrays the cost of a rental car used while your car is in the shop or while your car is being replaced. When selecting your rental reimbursement coverage, be sure to consider the size and make of the vehicle that suits your needs and the typical daily rental rate for it.

Emergency Road Service

You may need emergency road service because:

You do not belong to an auto club or similar program which helps you pay for towing costs. In selecting an emergency road service plan, consider how much it would cost to get your vehicle towed in your area, and make sure your coverage will be adequate for these circumstances.

Using Your Coverage Counselor Results

You can review or change any of the personal information you entered.

After you get a quote, use the results to customize the initial coverages provided to you. Remember to print these counselor results for easy reference.

Get a quote now!

[        ] (go) — 2230

Enter Zip — 2220

Exit Counselor — 2240

Privacy Statement    Insurance Licenses    Legal Disclaimer    Insurance Ratings

FIG. 3 esurance  Buy customized auto insurance in minutes!
Insurance. Only Better.  We'll help you select the right coverage to save money.

home | why buy from us | service commitment | about us | customer feedback | help center Quotes
steps  1 2 3 4  Car Information

*Watch this space for important tips about the quote process.

*An Esurance policy can cover up to four cars.

*If this is a new car, your current insurance company is the one that covered your old car.

24/7 Customer Service
► chat with an insurance advisor online (go)
► call 1 800 926 6012

► Please describe Car #1 — 3020
Year
[1997 ▼] — 3001
                3002
Make
[Chevrolet ▼]  Car not listed?
                                        3003
Model/body style
[Blazer: 4 dr                        ▼]

Zip code where car is parked at night.
[46220] — 3004

Years the primary driver of this car has been continuously insured.  — 3005
[18]         Need help with this question?

If you commute, miles driven one-way; if not, miles driven daily.
3006 — [4-9 ▼]

3008      3009
Primary use
3007 — ⊙ Commuting to work/school  ○ Pleasure  ○ Business
                3011         3012
Ownership
3010 — ⊙ Paid for  ○ Financed  ○ Leased Your current auto insurance company.
3013 — [American Family            ▼]

Expiration date for current auto policy.
3014 — [04/2001] mm/yyyy

Current annual auto premium (total for household).
3015 — [397] ($ per year) Why are we asking this?

3016 — ( add another car )  3017 — ( next ►► )

Privacy Statement   Insurance Licenses   Legal Disclaimer   Insurance Ratings

FIG. 3B

3200 esurance   Buy customized auto insurance in minutes!
Insurance. Only Better.   We'll help you select the right coverage to save money.

home | why buy from us | service commitment | about us | customer feedback | help center Quotes Your Quote

Safe Driving
Esurance tips for safe winter driving.

International Driving
Is you insurance valid outside the U.S.?

Road Rage
Protect yourself from danger.

We're sorry.

Given the information you have provided, we regret that we cannot currently offer you coverage.

We appreciate your consideration of Esurance.

24/7 Customer Service
► chat with an insurance advisor online (go)
► call 1 800 926 6012

Privacy Statement   Insurance Licenses   Legal Disclaimer   Insurance Ratings

FIG. 3C esurance
Insurance. Only Better.
Buy customized auto insurance in minutes!
We'll help you select the right coverage to save money.

home | why buy from us | service commitment | about us | customer feedback | help center Quotes
steps | 1 | 2 | 3 | 4 | Driver Discounts These Esurance discounts can help you lower your insurance costs.

If you become eligible for a discount after purchasing your policy, call our service center.

New cars often have safety features that can save you money.

24/7 Customer Service
- chat with an insurance advisor online (go)
- call 1 800 926 6012

▶ Ekaterina may be eligible for the following discounts

These discounts will be applied automatically if the driver qualifies.

Multiple Cars: You have two or more vehicles insured by the same policy with coverage for both bodily injury and property damage liability.

Passive Restraints: Your car is equipped with airbags and/or motorized or self-propelled seat belts.

Premier: You have had no moving violations or accidents in the past three years. You have also been continuously covered by auto insurance for the past three years.

Premier Plus: You have had no moving violations or accidents in the past five years. Additionally, you have been continuously covered by auto insurance for the past three years.

Additional rate-reduction factors may apply. Check the following if true:

3301 — ☐ Good Student: You are under the age of 25, enrolled as a full-time high school, college or university student, and maintain a grade point average of 3.0 (B) or better.

3302 — ☐ Resident Student: You are under the age of 21 years, residing at school over 100 miles away from where the car is kept.

3303 — ☐ Single Parent: You are a single adult with legal responsibility for a child living in your home.

3304 —(add another driver)   3305 —(get my quote ▶▶)

Privacy Statement   Insurance Licenses   Legal Disclaimer   Insurance Ratings

FIG. 3E

3500 esurance Buy customized auto insurance in minutes!
Insurance. Only Better. We'll help you select the right coverage to save money.

home | why buy from us | service commitment | about us | customer feedback | help center Log In Your Account

Getting Answers
Need help? We're here for you 24/7.

Fine-tuning your quote
Change these coverages by clicking "customize coverages".

Buying your policy
Have the following on hand if you want to buy your policy:

−Driver's license numbers
−MC/VISA credit or debit card
−Vehicle registration card(s)
−Odometer readings
−Loan/leasing information

24/7 Customer Service
► chat with an insurance advisor online (go)
► call 1 800 926 6012

► Please create a new account below or <u>click here</u> to login to an existing Esurance account.

User name [ekaterina] (4 to 13 letters and numbers)
3501

Password [        ] (4 to 13 letters and numbers--must include at least 1 number)
3502

Re-type password [        ] — 3503

In case you ever forget your password, you can answer a question to verify your identity. Please give us the question and answer you would like to use.

Your question  3504
[do you know it?] (4 to 24 characters)

Your answer  3505
[        ] (4 to 24 characters)

Email address
[dhugehs@btlex.com] — 3506

☐ I would like to receive notifications from selected Esurance partners on related products or services.
3507

3508   3509
[cancel]  [next ►►]

Privacy Statement   Insurance Licenses   Legal Disclaimer   Insurance Ratings

FIG. 3F

FIG. 3G esurance — customized auto insurance in minutes!
Insurance. Only Better.  We'll help you select the right coverage to save money.

home | why buy from us | service commitment | about us | customer feedback | help center Quotes
  Quote Comparison

Safe Driving
Esurance tips for safe winter driving.

International Driving
Is your insurance valid outside the U.S.?

Road Rage
Protect yourself from danger.

24/7 Customer Service
► chat with an insurance advisor online (go)
► call 1 800 926 6012

► Your Quote—Comparisons

Take a look at how Esurance's quote compares with other insurers' quotes for the same levels of coverage.

( purchase ►► ) ~3702

|  | 1997 Chevrolet |
|---|---|
| Esurance | $674.50 |
| State Farm | $611.69 |
| Allstate Insurance | $805.00 |
| SAFECO | $679.60 |

~3701

When comparing Esurance to other companies, be sure to look at the coverage levels, quality ratings and customer service commitment. Quotes from other insurers are general representations which are not guaranteed and are provided for comparison only. Actual rates will differ.

Your Esurance quote can be updated for purchase during the next 3 months. However, the premium may vary due to changes in your personal information or our rates.

If you are currently insured by another provider, we can help you transfer to Esurance even before the expiration date of your policy. Just complete your Esurance purchase and call our customer service center at 1-800-926-6012 to put the transfer in motion.

3703 — change car/driver
3704 — customize coverages
3705 — email my quote
3706 — save quote
3707 — purchase ►►

3708 — Back to quote summary

Privacy Statement   Insurance Licenses   Legal Disclaimer   Insurance Ratings

FIG. 31

3840 esurance — Buy customized auto insurance in minutes!
Insurance. Only Better.   We'll help you select the right coverage to save money.

home | why buy from us | service commitment | about us | customer feedback | help center Quotes Customize Coverages

Safe Driving
Esurance tips for safe winter driving.

International Driving
Is your insurance valid outside the U.S.?

Road Rage
Protect yourself from danger.

24/7 Customer Service
- chat with an insurance advisor online (go)
- call 1 800 926 6012

► Change your terms and click the next button below for a new quote.

For help in selecting your limits and deductibles, click on the coverage name.

| 1997 Chevrolet Blazer | | |
|---|---|---|
| Coverage Limits & Deductibles | Esurance Terms | Quoted Terms |
| Bodily Injury Limits | $50,000/$100,000 ▼ | $50,000/$100,000 |
| Property Damage Limit | $50,000 ▼ | $50,000 |
| Medical Payments Limit | $5,000 ▼ | $5,000 |
| Uninsured/Underinsured Motorist Bodily Injury Limits | $50,000/$100,000 ▼ | $50,000/$100,000 |
| Uninsured Motorist Property Damage | None ▼ | None |
| Collision Deductible | $500 ▼ | $500 |
| Comprehensive Deductible | $500 ▼ | $500 |
| Rental Car Limits | $20/$600 ▼ | $20/$600 |
| Emergency Road Service Limits | $25 ▼ | $25 |

3842 — ( cancel )  ( next ►► ) — 3843   3841

Privacy Statement   Insurance Licenses   Legal Disclaimer   Insurance Ratings

| esurance | Buy customized auto insurance in minutes! |
| Insurance. Only Better. | We'll help you select the right coverage to save money. | home | why buy from us | service commitment | about us | customer feedback | help center Quotes Car Summary

Safe Driving
Esurance tips for safe winter driving.

International Driving
Is your insurance valid outside the U.S.?

Road Rage
Protect yourself from danger.

24/7 Customer Service
► chat with an insurance advisor online (go)
► call 1 800 926 6012

► Please make changes to your existing quote information below:

|  | Car #1 |
|---|---|
| Year | 1997 |
| Make | Chevrolet |
| Model/body style | Blazer |
| Commute mileage, one-way | 0-3 |
| Zip code | 46220 |
| Currently insured by | American Family |
| Years continuously insured | 4 |
| Ownership | Paid for |
| Primary use | Commuting |
|  | >Edit |

3814

3812 — (add another car)  (next ►►) — 3813    3811

Privacy Statement   Insurance Licenses   Legal Disclaimer   Insurance Ratings

FIG. 3L esurance — Buy customized auto insurance in minutes!
Insurance. Only Better. We'll help you select the right coverage to save money.

home | why buy from us | service commitment | about us | customer feedback | help center Quotes
Driver Information

Safe Driving
Esurance tips for safe winter driving.

International Driving
Is your insurance valid outside the U.S.?

Road Rage
Protect yourself from danger.

24/7 Customer Service
► chat with an insurance advisor online (go)
► call 1 800 926 6012

► Please make changes to your existing quote information below:

|  | Driver #1 |
|---|---|
| First Name | Ekaterina |
| Gender | F |
| Marital status | S |
| Occupation | Accountant |
| Years employed in this occupation | 5 |
| Years licensed to drive in the U.S. | 5 |
| Accidents | 0 |
| Violations | 0 |
| Discounts | 0 |
|  | >Edit |

( add another driver ) ( next ►► )

Privacy Statement | Insurance Licenses | Legal Disclaimer | Insurance Ratings

FIG. 3M

3830 esurance Buy customized auto insurance in minutes!
Insurance. Only Better. We'll help you select the right coverage to save money.

home | why buy from us | service commitment | about us | customer feedback | help center Quotes steps | 1 | 2 | 3 | 4 | Matching Drivers to Cars ∗With your information about who drives each car, we can give you the right rate.

▸ Here are your existing car and driver associations. Are they still valid?

∗If your use of each car varies, give us your best estimate.

24/7 Customer Service
▸ chat with an insurance advisor online (go)
▸ call 1 800 926 6012

3836

|  | 1997 Chevrolet Blazer 4 dr | 1986 Ford Mustang LX Convertible, 8-Cyl, 302ci |
|---|---|---|
| Driver | | |
| Ekaterina | More than half the time ▼ | Less than a quarter of the time ▼ |
| | 3831  3833 | 3832  3834 |
| Dewayne | A quarter to half the time ▼ | More than half the time ▼ |

Note: If there are more than 2 drivers, select "more than half the time" for the driver using a car the most, even if their actual use is less.

Need help assigning drivers?

3835 — ( next ▸▸ )

Privacy Statement   Insurance Licenses   Legal Disclaimer   Insurance Ratings

4200 esurance  Buy customized auto insurance in minutes!
Insurance. Only Better.   We'll help you select the right coverage to save money.

home | why buy from us | service commitment | about us | customer feedback | help center Your Account Your Account                                                                 4215

Safe Driving        Would you like to change your <u>personal account information</u>?
Esurance tips for safe
winter driving.         ► Esurance Policies
International Driving
Is your insurance valid  Our records show that you have not purchased an Esurance
outside the U.S.?        policy. If this information is not correct, please call our
Road Rage            customer service center at 1-800-926-6012.
Protect yourself from
danger.                 ► Esurance Quotes 24/7 Customer Service   Click on the quote name to view your quote or change any
► chat with an          information.
  insurance advisor     Quote Name                              4212
  online (go)
► call 1 800 926 6012   <u>Ekaterina-</u>  ( email my quote )  ( delete )  ( purchase ►► )
                        <u>Blazer</u>

<u>Dewayne &</u>   ( email my quote )  ( delete )  ( purchase ►► )
                        <u>Katya-Test</u>
                                        4211                                4210

<u>Dewayne &</u>   ( email my quote )  ( delete )  ( purchase ►► )
                        <u>Ekat-Test</u>
                                                                            4213

Would you like a <u>new quote</u>? ~ 4214

Back to Esurance Home Page

Privacy Statement   Insurance Licenses   Legal Disclaimer   Insurance Ratings

FIG. 5 esurance
Insurance. Only Better.
Buy customized auto insurance in minutes!
We'll help you select the right coverage to save money.

home | why buy from us | service commitment | about us | customer feedback | help center Purchase
Your Policy

Get Answers
Need help? We're here for you 24/7.
Rely On Your Coverage
Esurance is insurance you can trust.
Complete Your Purchase
You're almost finished! Here's what to expect.

24/7 Customer Service
► chat with an insurance advisor online (go)
► call 1 800 926 6012

What date would you like your policy to begin?

The effective date must be on or after 11/24/2000. The policy will take effect at 12:01 AM (in the time zone of record) on this date, or at the time you accept our offer, if the policy is to be effective today.

5001 — [12/01/2000] (mm/dd/yyyy)

► Please provide information about Dewayne, the policyholder:

First name — [Dewayne] 5002
MI — [A] 5003
Last name — [Hughes] 5004

Mailing address
[                    ] — 5005

City — 5006 — [Indianapolis]
State — 5007 — [IN ▼]
Zip code — [46220] — 5008

Is this address:
5009 — ⦿ Home   5010 — ○ Business   5011 — ○ Both

Phone
5012 — [317] – [255] — 5013
5014 — [   ] – [   ] — 5015
Fax (optional)

Driver's license number
5016 — [8910-89]   5017 — [IN ▼]
Issuing state

Email address (required for policy holder)
5018 — [dhugehs@btlex.com]

Your email address will only be used by Esurance to contact you about your policy or insurance coverages and will not be shared or sold to a third party without your approval unless otherwise required by law or state regulation.

5019 — ( clear )  ( next ►► ) — 5020

Privacy Statement    Insurance Licenses    Legal Disclaimer    Insurance Ratings

FIG. 5A

5100 esurance  Buy customized auto insurance in minutes!
Insurance. Only Better.  We'll help you select the right coverage to save money.

home | why buy from us | service commitment | about us | customer feedback | help center Purchase Your Policy ▸ Please provide information about Ekaterina:

Get Answers
Need help? We're here for you 24/7.

Rely On Your Coverage
Esurance is insurance you can trust.

Complete Your Purchase
You're almost finished! Here's what to expect.

24/7 Customer Service
▸ chat with an insurance advisor online (go)
▸ call 1 800 926 6012

First name: Ekaterina    MI: V    Last name: Gridneva

Your relationship to policy holder — 5101
Spouse ▼

Mailing Address

City: Indianapolis    State: IN ▼    Zip code: 46220

Is this address:
⊙ Home    ○ Business    ○ Both

Phone: 317 - [ ]    Fax (optional): [ ] - [ ]

Driver's license number: 8910    Issuing state: IN ▼

Email address (required for policy holder)
dhugehs@btlex.com

Your email address will only be used by Esurance to contact you about your policy or insurance coverages and will not be shared or sold to a third party without your approval unless otherwise required by law or state regulation.

( clear )  ( next ►► ) — 5102

Privacy Statement    Insurance Licenses    Legal Disclaimer    Insurance Ratings

| esurance | Buy customized auto insurance in minutes! |
| Insurance. Only Better. | We'll help you select the right coverage to save money. | home | why buy from us | service commitment | about us | customer feedback | help center Purchase Payment Information

Get Answers
Need help? We're here for you 24/7.

Rely On Your Coverage
Esurance is insurance you can trust.

Complete Your Purchase
You're almost finished! Here's what to expect.

24/7 Customer Service
- chat with an insurance advisor online (go)
- call 1 800 926 6012

5301 ► Payment terms
○ Pay $318.08 now, and $168.98 monthly for the next 4 months.
5302 ⊙ Pay $994.00 every 6 months.
If you pay monthly with a credit card, your credit card will be automatically charged each month.

► Pay by Credit Card
Credit card  5303 Credit card number   Expiration date
○ MasterCard    [128745678321678]   [02/2001]   (mm/yyyy)
⊙ VISA — 5304       5305              5306
Note: We cannot accept debit cards unless they feature a MasterCard or VISA logo.                  5307

Social Security Number of the card holder [312]-[80]-[2337]

Please confirm your billing address information. This should be the same address that appears on your credit card statement. If what you see here is not the same as that address, please update it to reflect the correct billing address.

First name          MI          Last name
5308 [Dewayne]     [A] — 5309  [Hughes]      — 5310

Billing address
5311 [                    ]

City                State       Zip code
5312 [INDIANAPOLIS]  5313 [IN ▼]  [46220]    — 5314

Phone number
5315 [                    ]

Note: Billing and renewal notices will be sent by email. Please be sure to let us know if your email address changes.

Policy email address [dhugehs@btlex.com]    — 5316

5317 ☐ Check here to update your account with this email address.
Concerned about security?
( next ►► ) — 5318
Please review our refund policy.

Privacy Statement    Insurance Licenses    Legal Disclaimer    Insurance Ratings

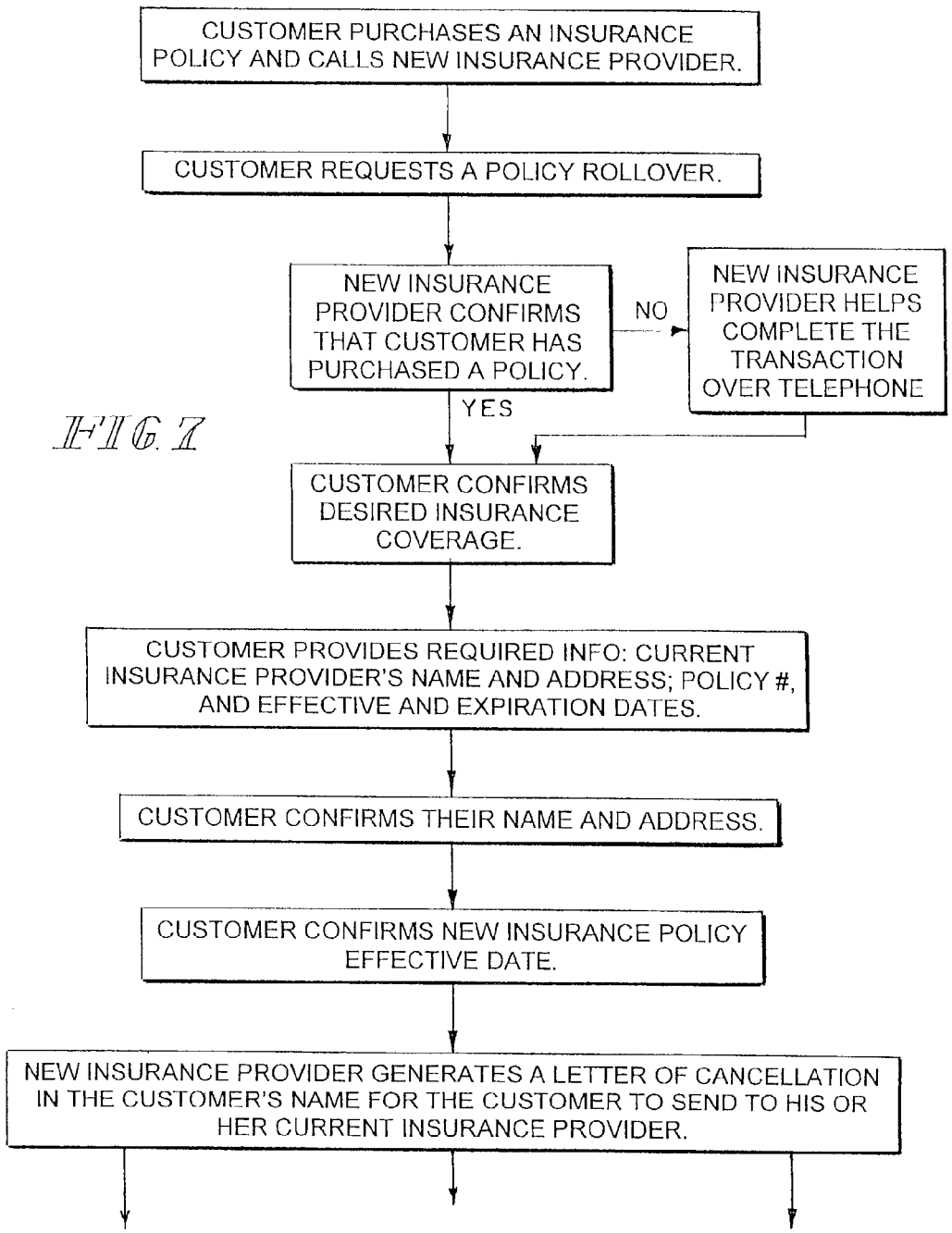

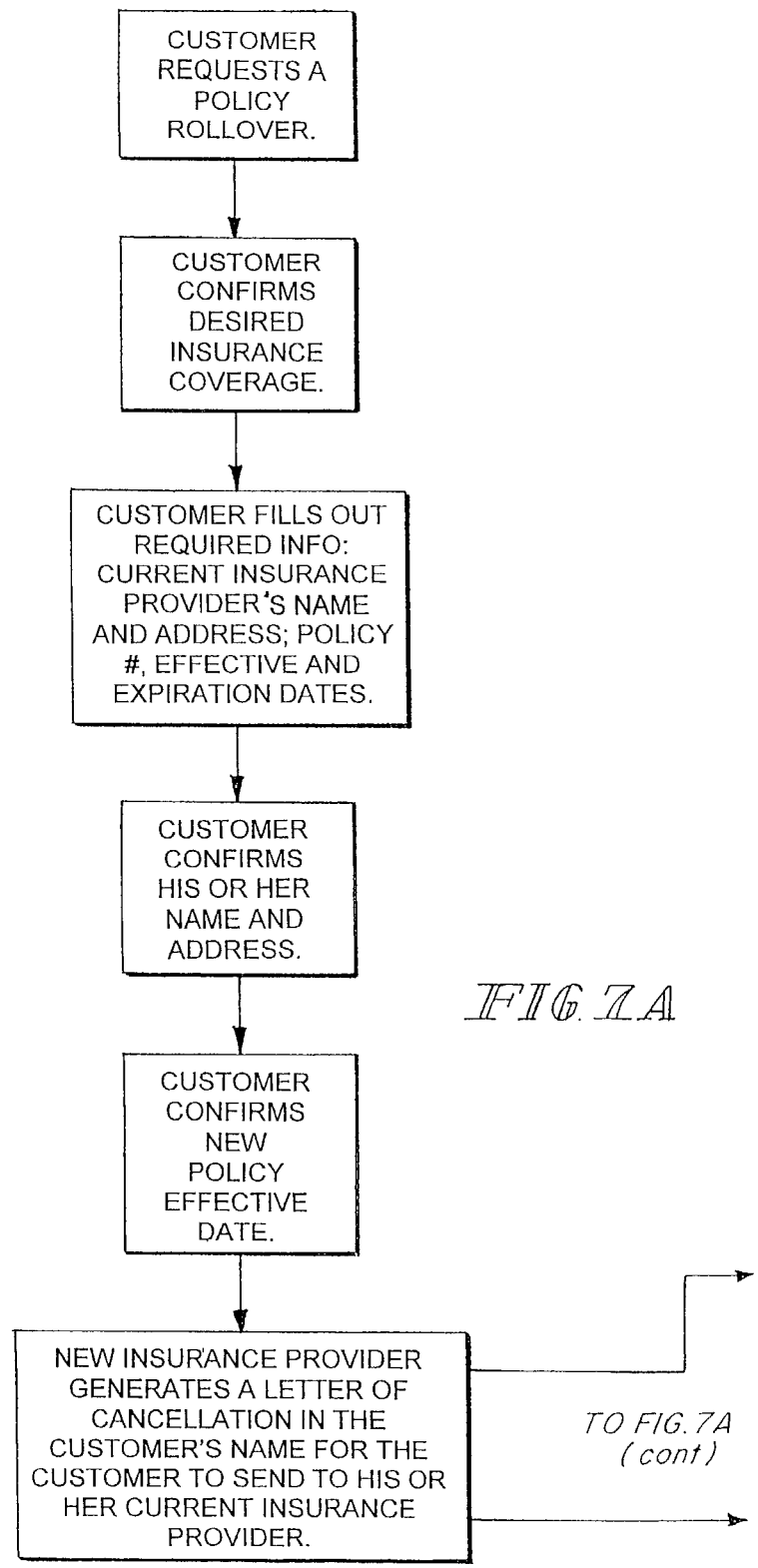

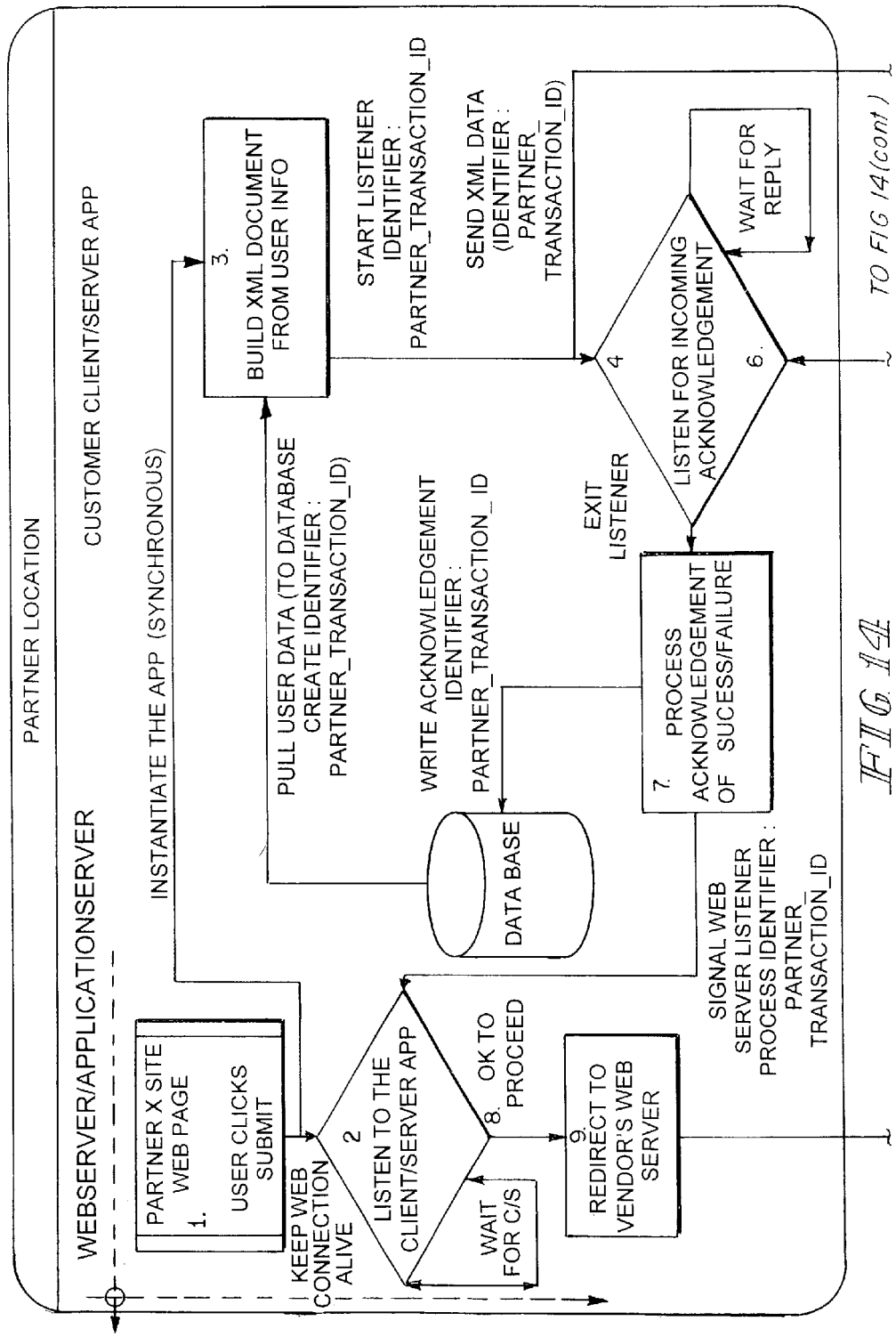

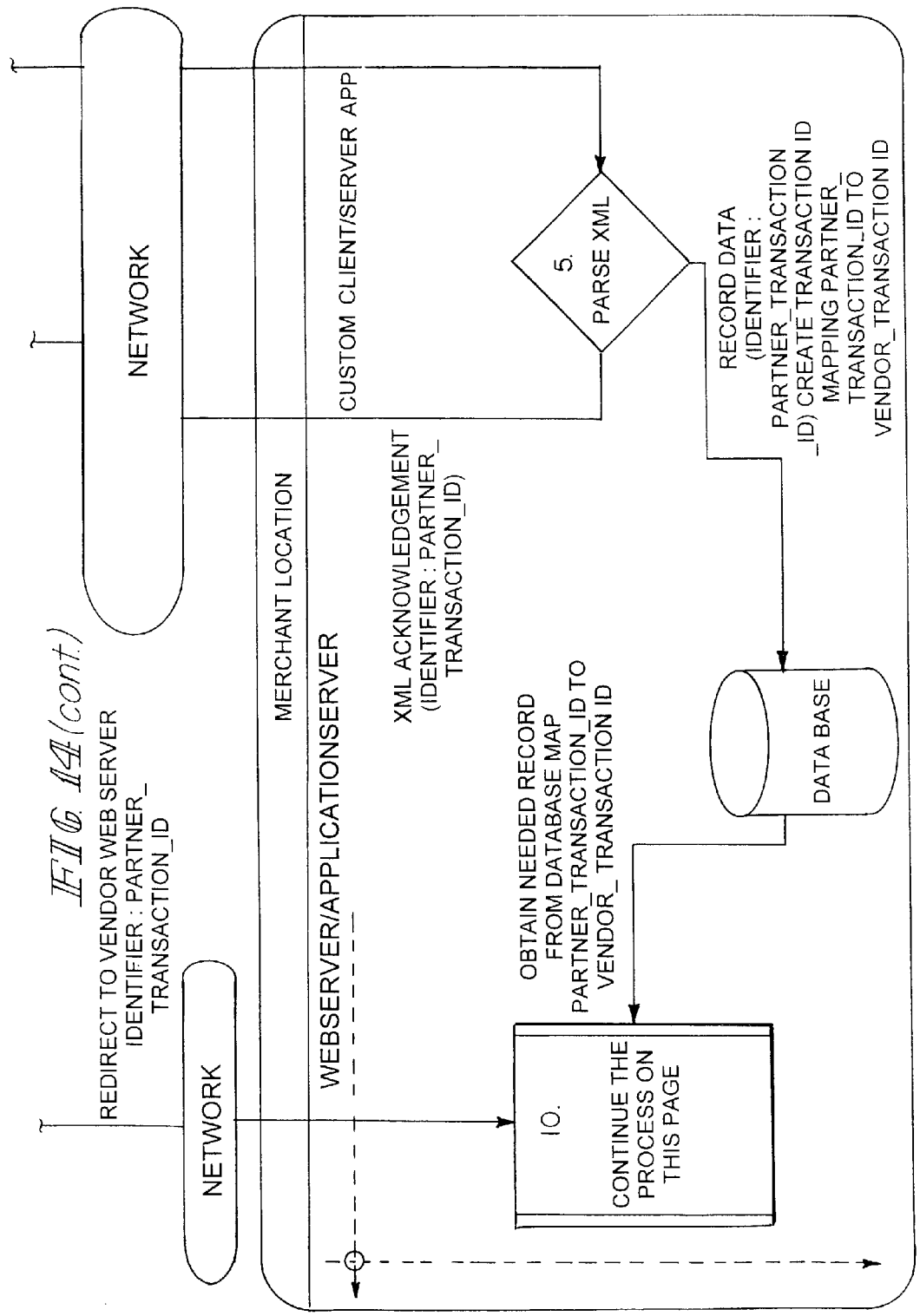

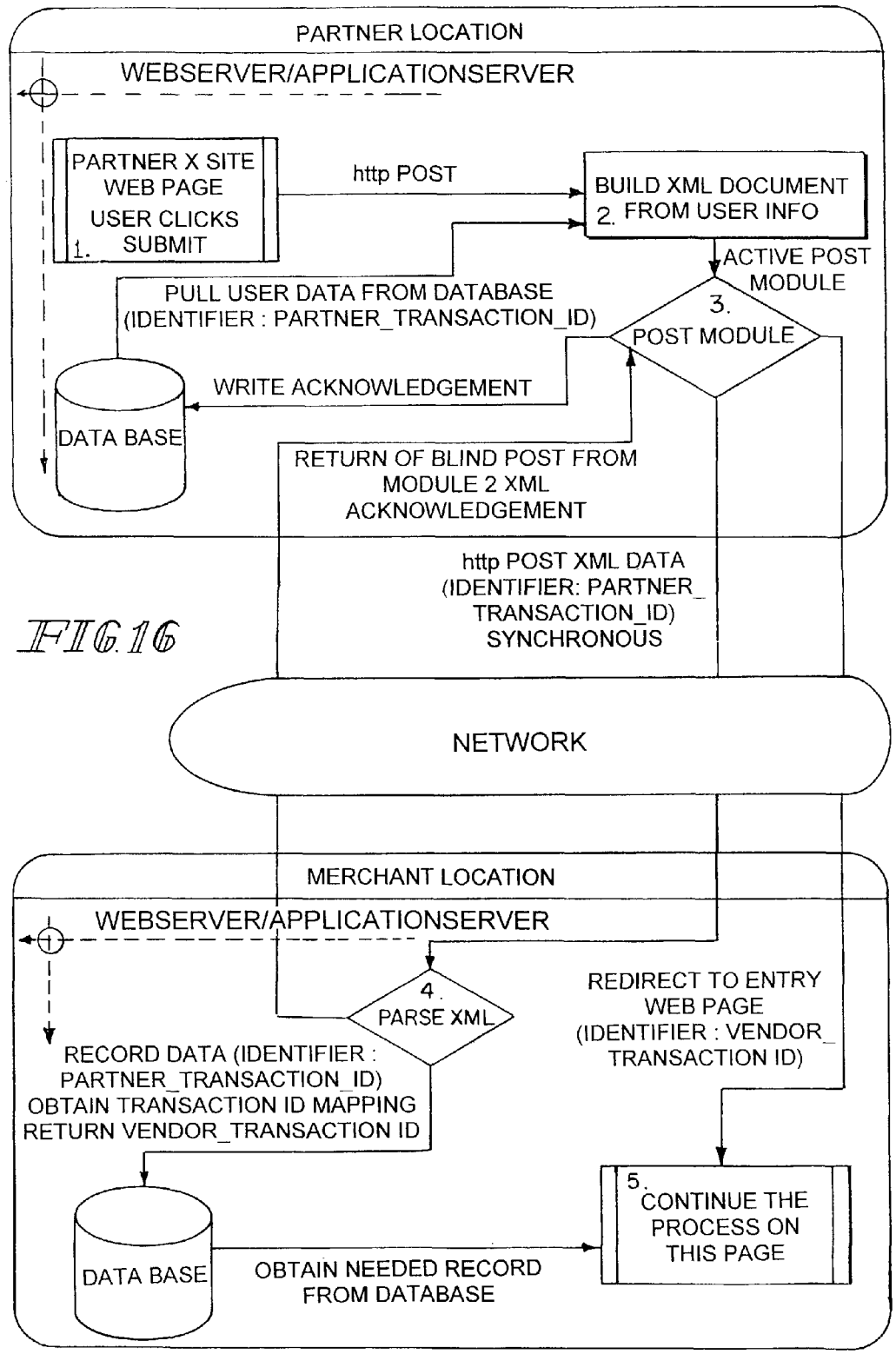

INSURANCE MARKETING METHODS

CROSS-REFERENCE TO RELATED APPLICATIONS

This application is a U.S. national counterpart application of international application serial no. PCT/US00/32342 filed Nov. 27, 2000, which claims the benefit under 35 U.S.C. §119(e) to U.S. Provisional Patent Application Ser. Nos. 60/167,636 filed Nov. 26, 1999; 60/170,027 filed Dec. 10, 1999; 60/198,007 filed Apr. 18, 2000; 60/199,483 filed Apr. 25, 2000; and 60/209,155 filed Jun. 2, 2000, the disclosures of which are hereby incorporated herein by reference.

FIELD OF THE INVENTION

This invention relates to the marketing and sale of insurance services via the internet. It is disclosed in the context of certain embodiments and utilities, but is believed to be useful in other applications as well.

BACKGROUND OF THE INVENTION

Methods utilizing computers to sell insurance, for example, selling insurance via the internet, are in widespread use. Such methods permit users to, for example, perform basic steps in the complicated process of purchasing insurance, such as submitting a request for a quote via a web site, or entering information about the insured's home in order for an agent of the insurer to later contact the insured to recommend changes in insurance coverage.

A known method of modifying an insurance pricing model is as follows. First, the insurance provider collects information from individual customers. As each customer provides information, his or her quote is provided based on the existing insurance pricing model. As an ongoing process, the information provided by customers is collected and analyzed. Actuaries use this information and market comparisons to create new insurance pricing models. The new pricing models are compared to other insurance pricing models available in the marketplace. If a new pricing model is deemed worthy of use, this new model is filed with state authorities. Some states, known as "prior approval" states, require state approval prior to the use of an insurance pricing model. In these states, after the approval of the state authorities, the new insurance pricing model is used to provide insurance price quotes to customers. Other states, known as "file and use" states, allow the use of a pricing model after filing with the state, but prior to approval. In these states, after the filing with the state authorities, the new insurance pricing model is used to provide insurance price quotes to customers.

The practice of balance transfer is well known in the credit card industry. For example, a customer chooses to transfer outstanding balances from one credit card to another in order to take advantage of lower interest rates, lower minimum payment, lower penalty fees, or the like. Even though there are many similarities between credit cards and insurance, this practice has never been applied to insurance policies. Currently, if an insured discovers a cheaper or better insurance policy, he or she typically waits until the end of the current policy before purchasing and initiating a new policy. In order to cancel a current policy, an insured must go through a complex process on his or her own initiative. This inconvenience reduces choice, flexibility and inclination to switch.

An individual's insurance needs often vary based upon temporary changes in his or her risk profile. Historically, an individual has either had to pay for coverage he or she did not need, or cancel and subsequently reinstate insurance coverage.

When providing third-party liability coverage, specifically bodily injury and property damage liability coverage, an insurance provider does not offer a user the ability to self-insure a portion of the loss in exchange for a lower rate. The primary reason for this is that these coverages are designed to provide innocent third parties a source of economic recovery in the event of an accident. Thus, insurance providers are ultimately responsible, on a first dollar basis, for any claim where the insured refuses to pay or is unable to pay the deductible.

Currently, most individuals maintain relatively incomplete records regarding their household possessions. This is due in part to the difficulty in keeping such a list current. Keeping such a list on a computer makes it easier to add to the list. If the computer is maintained away from an individual's home, the likelihood that the individual will be able to locate the list when needed is enhanced. For example, in the event of a house fire, a list of household contents that is kept in the house is likely to be lost. Furthermore, when making a claim, it is quicker and easier to select items from an existing, computer-based list than it is to, create a new document containing a list describing household possessions, especially given that these possessions may no longer exist.

Internet users can be classified into three broad groups based upon their activity at a merchant site. Browsers are the visitors who look at the content presented on the site, but do not transact any business with the merchant. These visitors are indirectly counted through measures such as a raw page hits. The second major group is prospects. Prospects are distinguished from browsers by beginning a purchase process. For an insurance carrier, a browser becomes a prospect when the browser begins the quoting interview process. The last major group is customers, policyholders in insurance parlance. Policyholders are those visitors who have completed a purchase of insurance.

Current numbers indicate that attrition between these classes of internet users is tremendous. The conversion rate from internet browser to prospect is comparable to direct mailing conversion rates—percentages well under five percent. In addition, many internet users who begin a purchase abandon the process before completion. Some estimates indicate that about one-third of prospects become customers. In this environment, a merchant or service provider would like to obtain qualified leads and quickly execute the purchase.

DISCLOSURE OF THE INVENTION

According to one aspect of the invention, a method of purchasing and selling insurance includes transmitting from a first computer information regarding property to be insured, receiving at the first computer a quote for insurance and purchasing insurance via the first computer.

Illustratively, the property includes a vehicle.

Further illustratively, the information includes the vehicle's vehicle identification number (VIN).

Further illustratively, the method includes maintaining a data set containing, by VIN, a year of manufacture (year) of the vehicle, a manufacturer identification (make) of the vehicle, a model designation of the vehicle (model), and a body style (style) of the vehicle, and using information contained in the data set to provide the quote.

Further illustratively, the method includes determining the quote from the year, make, model and style.

Additionally illustratively, determining the quote from the year, make, model and style includes determining the quote from the year, make, model and style using a second computer.

Illustratively, transmitting information includes transmitting information concerning a year of manufacture (year) of the vehicle, a manufacturer identification (make) of the vehicle, a model designation of the vehicle (model), and a body style (style) of the vehicle.

Additionally illustratively, transmitting information includes transmitting information regarding at least one individual who will be operating the vehicle.

Illustratively, transmitting information regarding the at least one individual includes transmitting a pseudonym.

Further illustratively, determining the quote for insurance includes considering the information regarding the at least one individual who will be operating the vehicle.

Additionally illustratively, transmitting information includes dynamically creating at least one data entry screen on a monitor associated with the first computer.

Further illustratively, the method includes storing the quote once it has been received.

Illustratively, receiving a quote includes providing at least first and second quotes and comparing the first and second quotes.

Further illustratively, the method includes transmitting from the first computer additional information regarding property to be insured, and receiving a second quote based on the additional information.

Further illustratively, the method includes transmitting proof of insurance via facsimile.

Further illustratively, the method includes dispatching proof of insurance via carrier.

Illustratively, receiving a quote for insurance includes recommending at least one insurance coverage level.

Further illustratively, the method includes transmitting additional information regarding the property to be insured.

Additionally illustratively, receiving a quote for insurance includes receiving a quote determined by considering the additional information regarding the property to be insured.

Illustratively, purchasing insurance includes transmitting payment information.

Further illustratively, the method includes transmitting proof of insurance in machine-readable form.

Further illustratively, the method includes creating a tangible expression of the machine-readable proof of insurance.

Illustratively, transmitting information regarding property to be insured includes transmitting at least one item of demographic information regarding a user of the property to be insured.

Additionally illustratively, the method includes optimizing the quote as transmitted demographic information increases.

Illustratively, transmitting from the first computer information regarding property to be insured includes transmitting from a first computer information regarding property to be insured utilizing Hypertext Markup Language (HTML)-capable software.

Additionally illustratively, the method further includes monitoring inputs made by a user, determining whether the user may be confused, and providing the user with information when it is determined that the user may be confused.

According to another aspect of the invention, a method for providing an insurance quotation includes transmitting, using a computer, information regarding property to be insured, analyzing the information regarding the property, modifying at least one quotation calculation underwriting rule based on the analysis of the information, creating an insurance pricing model based on the at least one modified underwriting rule, and receiving, using a computer, a quote for insurance.

Illustratively, the method further includes filing the insurance pricing model with a state insurance regulatory authority.

Additionally illustratively, modifying the at least one underwriting rule includes using predictive techniques to estimate at least one future risk.

According to yet another aspect of the invention, a method for purchasing and selling insurance includes transmitting information regarding property to be insured to a first insurance provider, transmitting information regarding at least one existing insurance policy covering the property to the first insurance provider, and generating a document directed to a second insurance provider authorizing cancellation of the at least one existing insurance policy and directing the second insurance provider to remit a refund payment.

Illustratively, the method further includes executing the document via a digital signature.

Further illustratively, the method includes manually executing the document.

Additionally illustratively, directing the second insurance provider to remit the refund payment includes directing the second insurance provider to remit the refund payment to the first insurance provider.

Illustratively, the method further includes providing a credit upon receipt by the first insurance provider of the executed document.

Further illustratively, the method includes the first insurance provider receiving a remittance from the second insurance provider.

Additionally illustratively, directing the second insurance provider to remit a refund payment includes directing the second insurance provider to remit the refund payment to an insured.

Illustratively, transmitting information includes transmitting information using a computer.

According to still another aspect of the invention, a method for modifying insurance coverage includes transmitting information regarding a piece of property that is insured to an insurance provider, transmitting information relating to a desired modification to the insurance on the piece of property, modifying the insurance, and generating an endorsement reflecting the insurance as modified.

Illustratively, modifying the insurance includes suspending insurance coverage for a particular period of time.

Further illustratively, modifying the insurance includes modifying at least one insurance coverage limit for a particular period of time.

Additionally illustratively, transmitting information includes transmitting information using a computer.

Further illustratively, the method includes providing a credit based on the modification.

Illustratively, suspending insurance coverage for a particular period of time includes utilizing a first date and a second date to delimit the particular period of time.

Additionally illustratively, modifying at least one insurance coverage limit for a particular period of time includes utilizing a first date and a second date to delimit the particular period of time.

Further illustratively, the method includes providing a credit based on the modification after the particular period of time has elapsed.

According to another aspect of the invention, a method for purchasing and selling insurance includes an insurance provider providing liability insurance coverage above a particular limit to an insured, and the insured obtaining credit from a guarantor in an amount up to the particular limit.

Illustratively, the method further includes calculating the cost of the insurance coverage based at least in part upon the particular limit.

Additionally illustratively, the insured obtaining credit from a guarantor in an amount up to the particular limit includes the insured obtaining credit in favor of the insurance provider.

Further illustratively, the method includes paying a claim and receiving subrogation from the guarantor.

Illustratively, providing liability insurance coverage includes providing bodily injury insurance coverage.

Additionally illustratively, providing liability insurance coverage includes providing property damage insurance coverage.

Illustratively, the insured obtaining credit includes the insured obtaining secured credit.

According to another aspect of the invention, a method of purchasing and selling insurance on personal property includes submitting information regarding at least one item of personal property, using a computer, to a database controlled by the provider of insurance on the at least one item of personal property.

Illustratively, submitting information includes submitting the Universal Product Code (UPC) of the at least one item of personal property.

Additionally illustratively, submitting a UPC includes using a bar code scanner to read the UPC.

Illustratively, submitting information regarding at least one item of personal property, using a computer, to a database includes submitting information utilizing Hypertext Markup Language (HTML)-capable software.

Further illustratively, the method includes preparing warranty registration information for the at least one item of personal property.

Illustratively, the method further includes submitting the warranty registration information to a warrantor of the at least one item of personal property.

Additionally illustratively, the warranty registration information is submitted electronically.

Additionally or alternatively illustratively, the warranty registration information is submitted in the form of a physical document.

Further illustratively, the method includes submitting a claim for a loss of the at least one item of personal property by selecting the at least one item of personal property from the database.

Additionally illustratively, submitting a claim for loss of the item includes submitting the claim using a computer.

Illustratively, submitting a claim for loss of the item includes providing information relating to the loss.

Further illustratively, the method includes identifying at least one source of personal property of the type of the at least one item, identifying at least one source of personal property of the type of the at least one item including identifying at least one source of personal property of the type of the at least one item capable of receiving orders electronically.

Illustratively, the method further includes ordering at least one item of replacement personal property of the type of the at least one item of personal property identified in the claim.

Additionally illustratively, the method further includes removing information regarding the at least one item of personal property from the database using a computer.

Illustratively, the method further includes editing information regarding the at least one item of personal property in the database using a computer.

Further illustratively, the method includes providing a list, viewable via a computer, of the at least one item of personal property described in the database.

According to yet another aspect of the invention, a method for modifying a price for property insurance on a property includes obtaining information from at least one database, utilizing an algorithm to determine an insurance price, and comparing the price resulting from utilization of the algorithm with an existing price of property insurance on the property.

Illustratively, the at least one database includes information relating to a market value of the property.

Additionally or alternatively illustratively, the at least one database includes information relating to labor cost to replace the property.

Additionally or alternatively illustratively, the at least one database includes information relating to material cost to replace the property.

Further illustratively, the method includes modifying a premium for the property insurance based upon the price resulting from utilization of the algorithm.

Illustratively, the method further includes notifying an insured of the modified premium.

Further illustratively, the method includes the insured's accepting the modified premium.

Additionally illustratively, accepting includes accepting by using a computer.

Illustratively, notifying the insured includes comparing the price resulting from the algorithm and the existing price of the insurance, and determining how the insured is notified based upon the comparison.

Additionally illustratively, notifying the insured includes notifying the insured using a computer.

According to still another aspect of the invention, a method for determining insurance pricing for property includes obtaining information regarding an insured, utilizing an algorithm to determine operational costs associated with a customer segment of which the insured is a member, and determining an insurance price considering the operational costs associated with the customer segment.

Illustratively, utilizing an algorithm to determine operational costs associated with a customer segment of which the insured is a member includes utilizing an algorithm to determine operational costs associated with customers within a particular age range.

Additionally illustratively, utilizing an algorithm to determine operational costs associated with a customer segment of which the insured is a member includes providing the algorithm with input from a financial computer system of an insurance provider.

Further illustratively, utilizing an algorithm to determine operational costs associated with a customer segment of which the insured is a member includes providing the algorithm with input of at least one operational statistic of an insurance provider.

According to another aspect of the invention, a method for selling a product or service includes transmitting from a first computer information regarding an individual, receiving at a second computer the information, transmitting the information from the second computer to a third computer, and transmitting an offer for sale of the product or service from the third computer to the first computer.

Illustratively, transmitting the information from the second computer to the third computer includes formatting the information into a message.

Further illustratively, formatting the information into a message includes utilizing a markup language.

Illustratively, the method further includes storing the information in a memory of the third computer.

Additionally illustratively, the method includes transmitting information regarding an event from the third computer to the second computer.

Illustratively, the method further includes transmitting information regarding connecting to the third computer from the second computer to the first computer.

Further illustratively, the method includes transmitting additional information regarding the individual from the first computer to the third computer.

Illustratively, the method further includes transmitting acceptance of the offer for sale via the first computer.

Additionally illustratively, the transmission medium is the internet.

Alternatively or additionally illustratively, the transmission medium between the second and third computers is a private network.

Illustratively, the private network includes a frame relay.

Further illustratively, the transmission medium between the first and second computers and between the first and third computers is the internet.

Illustratively, the first computer includes an HTML-capable client software application.

Additionally illustratively, the second computer includes an HTML-capable server software application.

Further illustratively, the third computer includes an HTML-capable server software application.

Illustratively, HTML-capable includes HTTP secure-capable.

Additionally illustratively, transmitting the information from the second computer to the third computer includes using encryption techniques.

Illustratively, the product or service includes insurance.

BRIEF DESCRIPTION OF THE DRAWINGS

The invention may best be understood with reference to the following detailed description and accompanying drawings which illustrate the invention. In the drawings:

Figure 4:
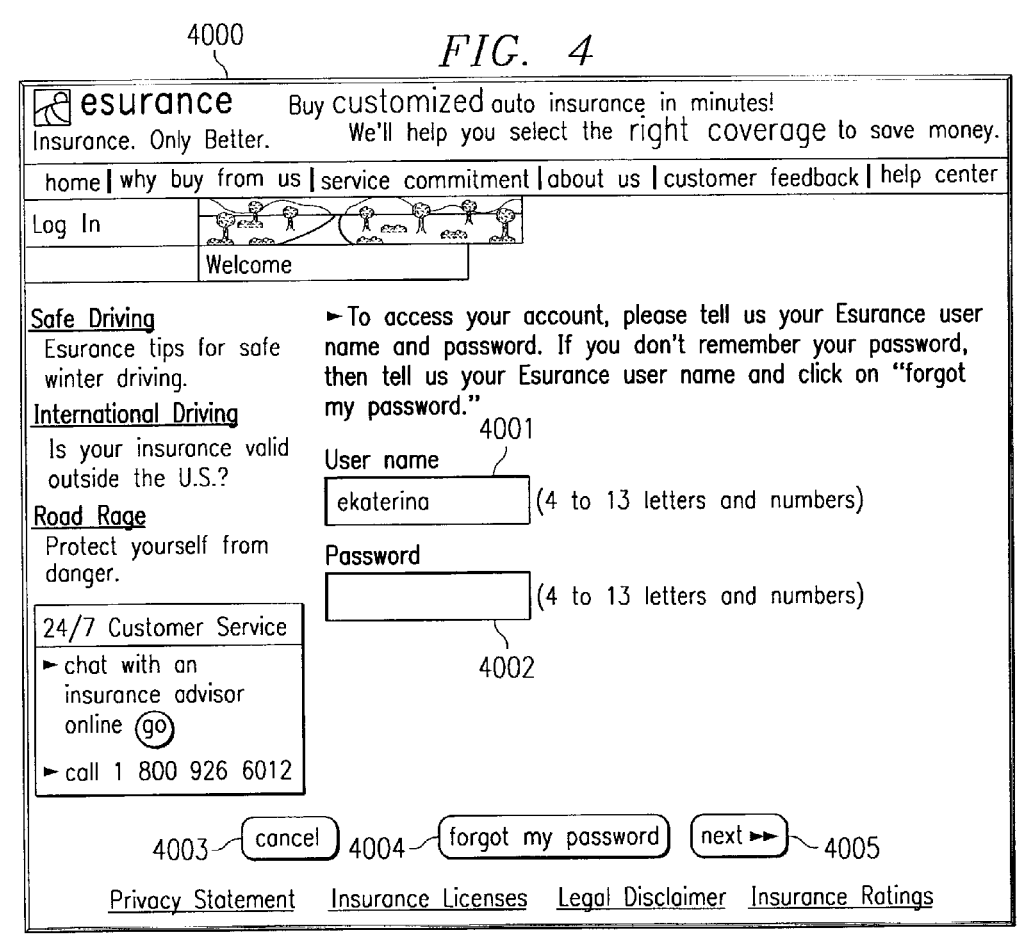
Figure 4A:
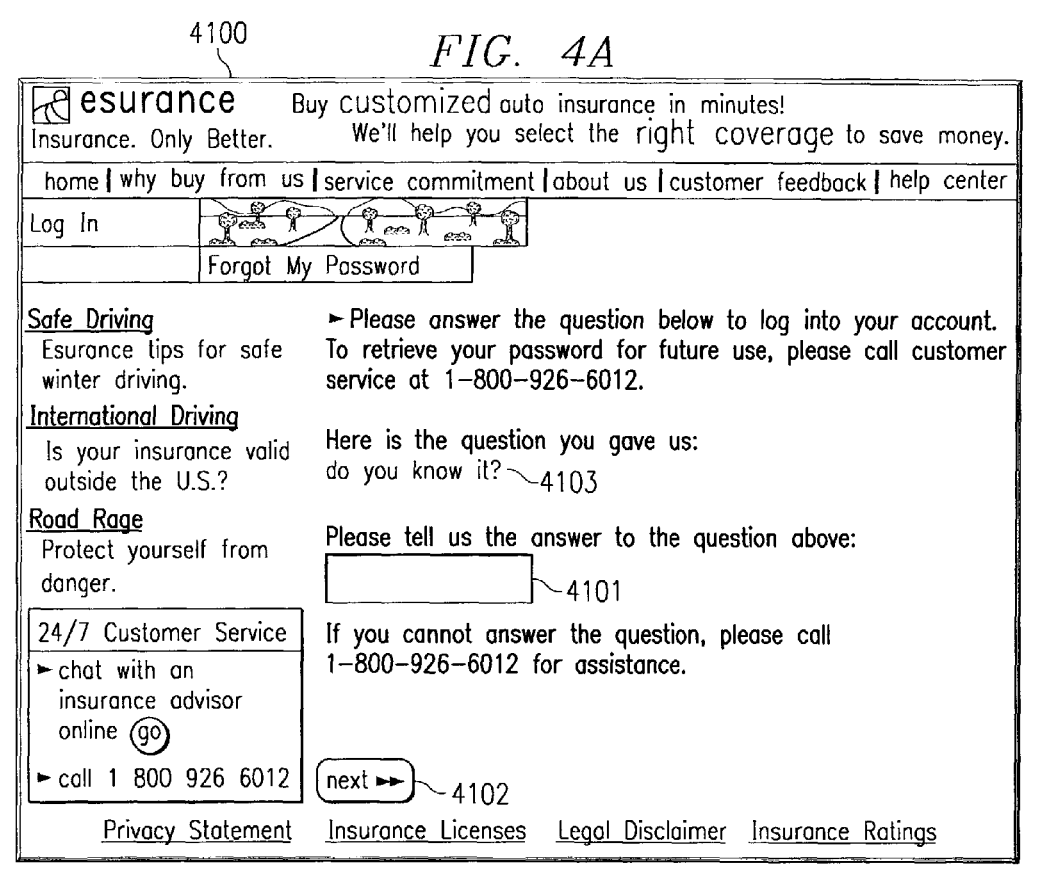

FIGS. 1, 2, 2A-E, 3, 3A-M, 4, 4A-B, 5 and 5A-C illustrate a website implementing a system according to one aspect of the present invention;

FIGS. 7 and 7A illustrate methods of implementing a system of insurance coverage roll-over according to the present invention;

FIGS. 12-16 illustrate methods of marketing products and services according to the invention.

DETAILED DESCRIPTIONS OF ILLUSTRATIVE EMBODIMENTS

Figure 1:
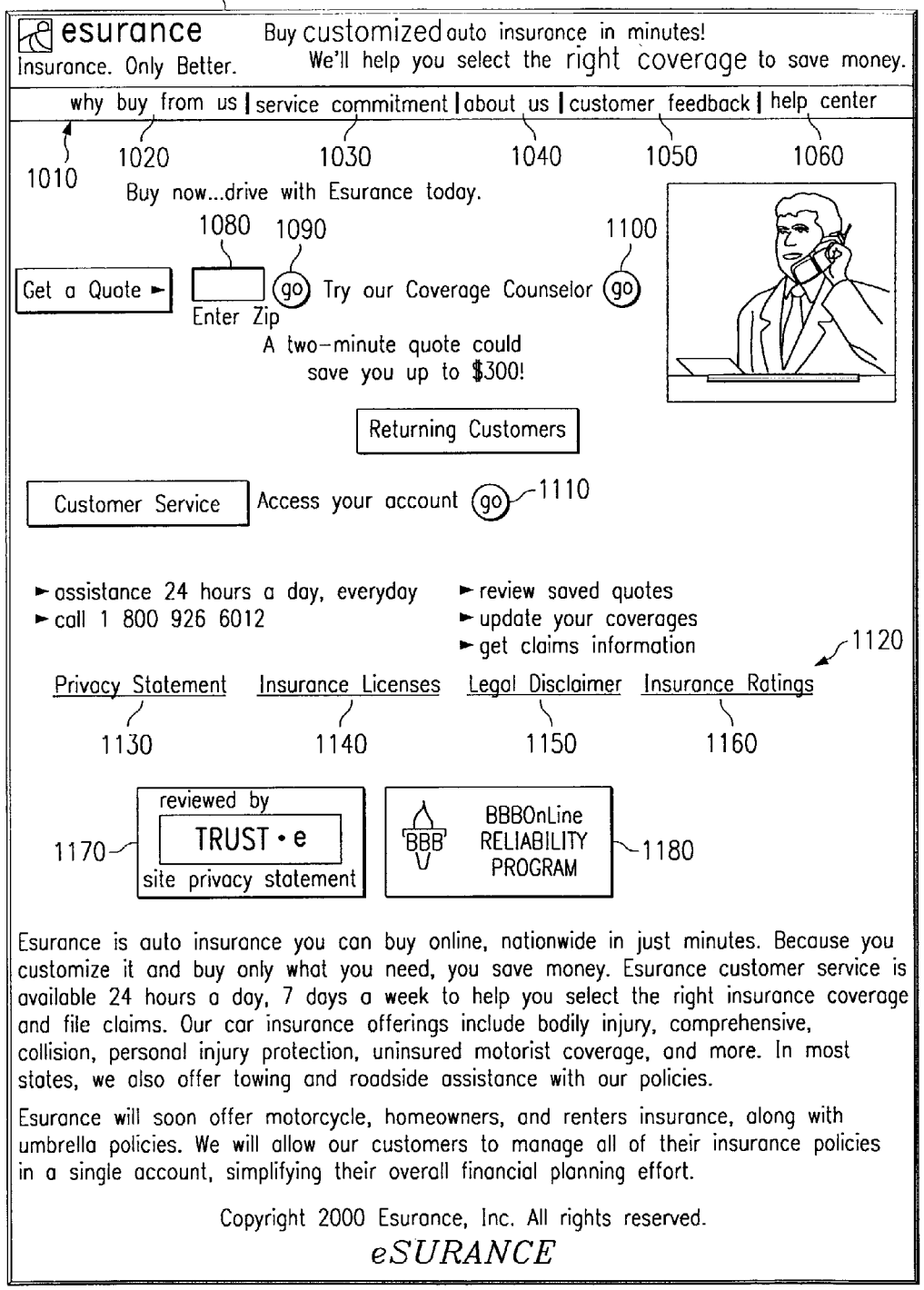

Turning now particularly to FIG. 1, a user accesses a system according to the invention via a client machine capable of processing a script language, for example Java. The user enters the world wide web address of the server running the system into the address bar of a world wide web browser, such as Netscape. The server machine responds with Home page 1000. One item contained on Home page 1000 is a Menu Bar 1010, which is contained on every page of the system. Menu Bar 1010 contains the following five widgets: Why Buy From Us widget 1020; Service Commitment widget 1030; About Us widget 1040; Customer Feedback widget 1050; and, Help Center widget 1060. Additionally, on every page except for the Home page 1000, the menu bar 1010 contains Home widget 1070. Home page 1000 further includes Enter Zip code widget 1080, a first Go widget 1090, a second Go widget 1100, a third Go widget 1110, a Site Privacy Statement widget 1170, a Reliability Program widget 1180, and a Second Menu Bar 1120. Second Menu Bar 1120 includes a Privacy Statement widget 1130, an Insurance Licenses widget 1140, a Legal Disclaimer widget 1150, and an Insurance Ratings widget 1160. The Second Menu Bar 1120 is also contained on every page of the system.

If the user selects Why Buy From Us widget 1020, the system responds with a pop-up window containing text. The text explains how the system works, how the system is different from standard insurance purchasing methods, and why the user can rely on the system. If the user selects Service Commitment widget 1030, the system responds with a pop-up window containing text. The text explains the insurance provider's commitment to provide quality service. If the user selects About Us widget 1040, the system responds with a pop-up window containing a number of hypertext links. These links link to further information regarding the operation and management of the insurance provider. If the user selects the Customer Feedback widget 1050, the system responds with a pop-up window which permits the user to enter his name, e-mail address, state of residence, the topic of a question, and the question. This information is then transmitted to the insurance provider for response. If the user selects Help Center widget 1060, the system responds with a pop-up window containing information regarding how a user may obtain help, either via a "frequently asked questions" section, a glossary of insurance terms, an on-line advice section, or other methods of contacting the insurance provider.

If the user selects Privacy Statement widget 1130, the system responds with a pop-up window containing text. The text explains the insurance provider's policy on privacy of information provided to the system by the user. If the user selects Insurance Licenses widget 1140, the system responds with a pop-up window containing text. The text provides information regarding states in which the insurance provider is licensed to provide insurance, and other license information for those states. If the user selects Legal Disclaimer widget 1150, the system responds with a pop-up window containing a text legal disclaimer message. If the user selects Insurance Ratings widget 1160, the system responds with a pop-up window containing a text message explaining the insurance provider's ratings, as established by independent rating organizations.

If the user selects Site Privacy Statement widget 1170, the system responds with the pop-up window that is displayed when the user selects Privacy Statement widget 1130. If the user selects Reliability Program widget 1180, the system responds with a pop-up window linked to another site. The pop-up window contains text explaining business rating information regarding the insurance provider.

If the user enters a zip code in Enter Zip widget 1080, and then selects the first Go widget 1090, the system responds with first Quotes page 3000. If the user selects the second Go widget 1100, the system responds with first Coverage Counselor page 2000. If the user selects the third Go widget 1110, the system responds with Log In page 4000.

Figure 2B:
Figure 2A:
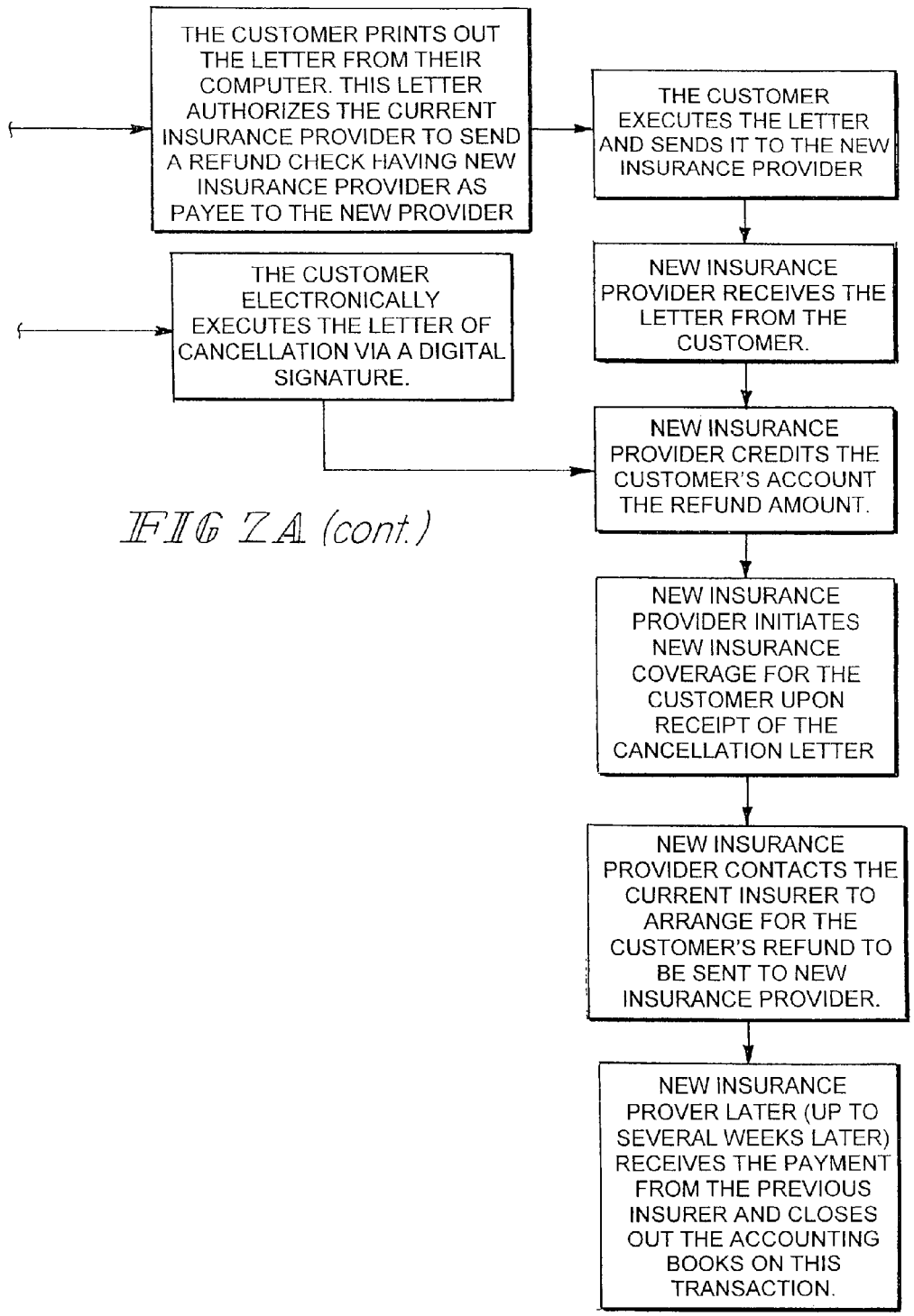

Referring now to FIG. 2, first Coverage Counselor page 2000 contains Marital Status widget 2001, Children At Home widget 2002, Children Licensed To Drive widget 2003, Children 18 Or Older widget 2004, Own widget 2005, Rent widget 2006, Home Value widget 2007, health insurance Yes widget 2008, health insurance No widget 2009, Health insurance Coverage widget 2010, and Continue widget 2011. The user communicates information to the coverage counselor by selecting and/or entering information into the appropriate widgets. First the user selects a marital status from Marital Status widget 2001. The following are valid marital status options: Single, Married/Partner, Divorced/Widow. Next the user completes the Children At Home widget 2002. Valid options for Children At Home widget 2002 are: "No, I do not have children;" "Yes, I have children who live at home;" and, "Yes, I have children, but they do not live at home." The user then enters a integer value into Children Licensed To Drive widget 2003 to indicate how many children living at home are licensed to drive. The user then selects how many children are 18 years old or older by entering an integer value into Children 18 Or Older widget 2004. The user selects either Own widget 2005 or Rent widget 2006. If the user owns his or her home, the user selects a value range from Home Value widget 2007. Home value ranges for Home Value widget 2007 are: "Less than $75,000 to $99,999;" "$100,000 to $149,000;" "$150,000 to $199,999;" "$200,000 to $249,000;" "$250,000 to $499,999;" and, "More Than $500,000." The user selects either Yes widget 2008 or No widget 2009 depending upon whether frequent passengers in user's car do or do not have health insurance. Next the user selects a description of the user's health insurance by a Health Coverage widget 2010. Valid options for Health Coverage widget 2010 are: "Covers Almost All Medical and Dental;" "Covers Only Some Medical and Dental;" and, "Covers Only Emergency Medical and Dental."

After the user has entered the appropriate information by items 2001 through 2010, user selects Continue widget 2011. The system responds with second Coverage Counselor page 2100, illustrated in FIG. 2A. Second Coverage Counselor page 2100 contains Income widget 2101, Assets widget 2102, Net Worth widget 2103, Yes widgets 2104, 2106, 2108, 2110, 2112, 2114, 2116 and 2118, and No widgets 2105, 2107, 2109, 2111, 2113, 2115, 2117 and 2119. Finally, second Coverage Counselor page 2100 contains View Results widget 2120. The user selects a range describing the user's household salary-based annual income from Income widget 2101. Income widget 2101 contains a list of eleven salary ranges. The user selects an estimated value of the user's savings and other liquid assets from Assets widget 2101. Assets widget 2101 contains a list of six ranges of asset values. The user selects the user's expected net worth at retirement from Net Worth widget 2103. Net Worth widget 2103 contains a list of five ranges of net worth values. The user selects either Yes widget 2104 or No widget 2105 depending upon whether any of the user's vehicles are financed or leased. The user selects Yes widget 2106 or No widget 2107 depending upon whether any of the user's vehicles are currently in storage. The user selects Yes widget 2108 or No widget 2109 depending upon whether the user or any drivers in the user's household often park in areas where vehicles are reportedly vandalized and/or stolen. The user selects Yes widget 2110 or No widget 2111 depending upon whether the user or other drivers in the user's household operate vehicles in areas where accidents with deer and other large animals are common. The user selects Yes widget 2112 or No widget 2113 depending upon whether the user lives in an area where severe storms, snow accumulation, flooding, and/or natural disasters occur. The user selects Yes widget 2114 or No widget 2115 depending upon whether the user has access to temporary alternative transportation in the event the user's vehicle is damaged or needs replacement. The user selects Yes widget 2116 or No widget 2117 depending upon whether any of the user's vehicles have a history of unexpected breakdowns. The user selects Yes widget 2118 or No widget 2119 depending upon whether the user belongs to an auto club or other roadside assistance plan which pays for towing. After the user has entered information using widgets 2101 through 2119, the user selects the View Results widget 2120. The system responds with Personalized Results page 2200.

Figure 3A:
Figure 3D:
Figure 3F:
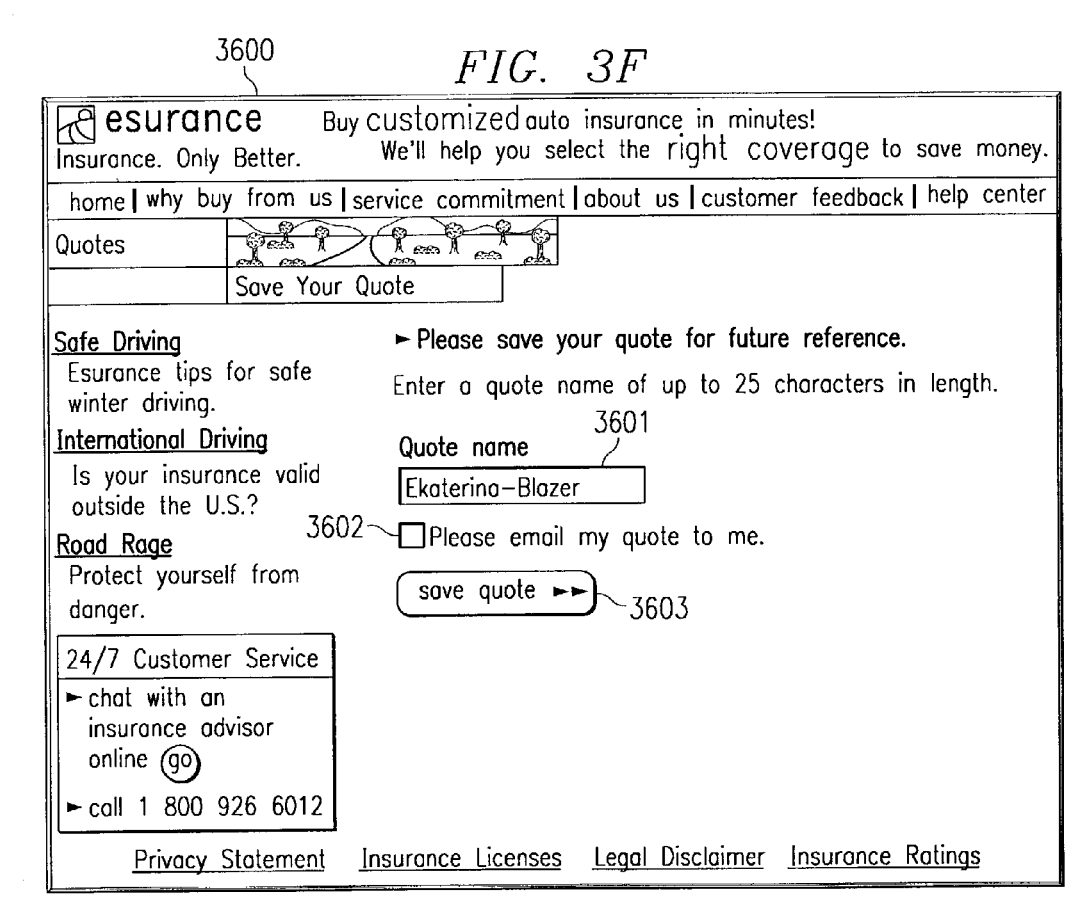
Figure 3H:

Referring to FIGS. 2B-E, Personalized Results page 2200 contains insurance coverage levels recommendations in a Recommendations Table 2210. These recommendations include a suggested level for a collision deductible, a suggested level for a comprehensive deductible, a suggested level for medical payments coverage, a suggested level for bodily injury liability and uninsured/under insured motorist coverage, a suggestion for whether or not to include rental car reimbursement, and a suggestion for whether to include towing reimbursement. Additionally, Personalized Results page 2200 includes information explaining the meanings of all of the terms in Recommendation Table 2210. Further, Personalized Results page 2200 contains Enter Zip widget 2220, Go widget 2230, and Home widget 1070. See FIG. 2E. Home widget 1070 is included in Menu Bar 1010, which, again, is present on every page of the system. If the user selects Home widget 1070, the system responds with Home page 1000. If the user enters a zip code in Enter Zip widget 2220 and then selects Go widget 2230, the system responds with first Quotes page 3000. See FIG. 3.

First Quotes page 3000 contains Year widget 3001, Make widget 3002, Model widget 3003, Zip Code widget 3004, Years Continuously Insured widget 3005, Miles widget 3006, Commuting to Work/School widget 3007, Pleasure widget 3008, Business widget 3009, Paid For widget 3010, Financed widget 3011, Leased widget 3012, Current Insurance Company widget 3013, Expiration Date widget 3014, Current Premium widget 3015, Add Another Car widget 3016 and Next widget 3017. The user enters information regarding the first vehicle for which insurance is sought, Car #1, as follows. First the user selects the year the vehicle) was manufactured from Year widget 3001. Next the user selects the manufacturer of the vehicle from Make widget 3002. The user selects the model and body style of the vehicle from Model widget 3003. The user enters the zip code where the car is parked at night in Zip Code widget 3004. The user enters the number of years the primary driver of this vehicle has been continuously insured in Years Insured widget 3005. The user selects a range of miles from Miles widget 3006 corresponding to either the number of miles driven one way if the user commutes, or, the number of miles driven daily if the user does not commute. The user then indicates the primary use of the vehicle by selecting either Commuting To Work/School widget 3007, Pleasure widget 3008, or Business widget 3009. The user indicates the ownership status of the vehicle by selecting either Paid For widget 3010, Financed widget 3011, or Leased widget 3012. The user then indicates the user's current auto insurance company by selecting an insurance company from Insurance Company widget 3013. The user enters the expiration date of the current auto policy in expiration date widget 3014. As an option, the user may enter the current annual auto premium that the user is paying to the current auto insurer in Current Premium widget 3015 to insure this vehicle. If the user selects Add Another Car widget 3016, the system responds with first Quotes page 3000, except that tag 3020 now reads Car #2. In this event, the user again completes the information on first Quotes page 3000, this time for the second vehicle for which insurance is sought. If the user selects the next widget 3017, the system responds with Second Quotes page 3100. See FIG. 3A.

Second Quotes page 3100 contains Driver's Name widget 3101, Month widget 3102, Day widget 3104, Year widget 3103, Male widget 3105, Female widget 3106, Single widget 3108, Married widget 3107, Occupation widget 3109, Years employed widget 3110, Years Licensed widget 3111, Email Address widget 3112, and Notifications widget 3113. Second Quotes page 3100 further includes Violation Dates widgets 3114, 3116, 3118 and 3120, and Violation Type widgets 3115, 3117, 3119 and 3121. Additionally, second Quotes page 3100 includes Accident Dates widgets 3122, 3124, 3126 and 3128, and Accident Type widgets 3123, 3125, 3127 and 3129. Finally, Second Quotes page 3100 contains Next widget 3130.

Second Quotes page 3100 provides a means for the user to enter information regarding the driver of a vehicle on which insurance is sought. The user enters either the first name or a synonym for the first driver in Name widget 3101. The user enters the month of this driver's date of birth in Month widget 3102, the day of the month of the driver's birth in Day widget 3104 and the year of the driver's birth in Year widget 3101. The user indicates the driver's gender via selecting either Male widget 3105, or Female widget 3106. The user indicates the driver's marital status via either Single widget 3108, or Married widget 3107. The user indicates the occupation by selecting an occupation from Occupation List widget 3109. The user indicates the number of years the driver has been employed in this occupation in Years Employed widget 3110. The user indicates the number of years this driver has been licensed to drive in the United States by entering an integer in Years Licensed widget 3111. The user indicates an e-mail address in Email widget 3112, and further indicates whether the user would like to receive advertisements at this email address by either selecting or deselecting Notifications widget 3113. The user enters information regarding this driver's driving record by entering the dates of any traffic violations in Violation Dates widgets 3114, 3116, 3118 and 3120, and the types of violations in Violation Type widgets 3115, 3117, 3119 and 3121. The user enters information regarding any accidents this driver has had in the past five years by entering the dates of those accidents in Accident widgets 3122, 3124, 3126 and 3128, and the types of accidents in Accident Type widgets 3123, 2125, 3127 and 3129.

After all information regarding this driver has been entered in second Quotes page 3100, the user selects Next widget 3130. The system responds either Declination page 3200 (see FIG. 3B) or third Quotes page 3300 (see FIG. 3C). Declination page 3200 contains the text "We are sorry. Given the information you have provided, we regret that we cannot currently offer you coverage." Declination page 3200 is displayed, for example, where a driver has been licensed for less than three years or has a significant number of accidents. If the driver is deemed to be insurable, the system responds with third Quotes page 3300. Third Quotes page 3300 includes Good Student widget 3301, Resident Student widget 3302, Single Parent widget 3303, Add Another Driver widget 3304, and Get My Quote widget 3305. Third Quotes page 3300 provides the user with a means for indicating whether a driver may be eligible for certain discounts. If the driver is under the age of 25, enrolled as a full time student in high school, college, or a university, and maintains a grade point average of at least 3.0 out of 4.0, the user indicates that the driver is a good student by selecting Good Student widget 3301. If the driver is under the age of 21 years, and resides at a school over 100 miles from where the car is kept, the user indicates whether the driver is a resident student by selecting Resident Student widget 3302. If the driver is a single adult with legal responsibility for a child living in his or her home, the user indicates that the driver is a single parent by selecting Single Parent widget 3303. If the user selects Add Another Driver widget 3304, the system responds with second Quotes page 3100. However, this time second Quotes page 3100 is displayed, line 3131 reads, "Please tell us about Driver #2." Otherwise, this second Quotes page 3100 is as previously described. If the user selects Get My Quote widget 3305, the system responds with fourth Quotes page 3400. See FIG. 3D.

Fourth Quote page 3400 includes Save Quote widget 3401, Compare widget 3402, Purchase widget 3403, Change Car/Driver widget 3404, Customize Coverages widget 3405, Email My Quote widget 3406, Save Quote widget 3407, Compare widget 3408, Purchase widget 3409, and Information widgets 3410. If the user selects Save Quote 3401, the system responds with Create Account page 3500 (see FIG. 3E) if the user is not already logged into the system. Alternatively, the system responds with Save Quote page 3600 (see FIG. 3F) if the user is already logged into the system. If the user selects Compare widget 3402 or 3408, the system responds with Quote Comparison page 3700. See FIG. 3G. If the user selects Change Car/Driver widget 3404, the system responds with Change Car/Driver Info page 3800. See FIG. 3H. If the user selects Customize Coverages widget 3405, the system responds with Customize Coverages page 3840. See FIG. 3I. If the user selects Email My Quote widget 3406, the system responds with Create Account page 3500, FIG. 3E, if the user is not logged into the system, or, with Email Quote page 3900, FIG. 3J, if the user is logged into the system. If the user selects Purchase widget 3409, the system responds with first Purchase page 5000. See FIG. 5. If the user selects an Information widget 3410, the system responds with a pop-up window explaining the term described by the particular Information widget 3410.

Create Account page 3500, FIG. 3E, is an account security page. Create Account page 3500 contains User Name widget 3501, Password widget 3502, Re-type Password widget 3503, Your Question widget 3504, Your Answer widget

3505, Email Address widget 3506, Notifications widget 3507, Cancel widget 3508 and Next widget 3509. The user creates and enters a user name in User Name widget 3501. The user creates and enters a password in Password widget 3502, and then enters the identical password in Re-type Password widget 3503. The user enters a pass question in Your Question widget 3504, and then enters the answer to that question in Your Answer widget 3505. The user enters an email address in Email Address widget 3506. The user then selects or deselects widget 3507 depending upon whether the user wishes to receive advertisements at this email address. If the user selects Cancel widget 3508, the system returns to the page which had been displayed immediately preceding Create Account page 3500. If the user selects Next widget 3509, the system responds with Save Quote page 3600 if the system was responding to a selection of Save Quote widget 3401. Alternatively, if the system was responding to selection of the Email My Quote widget 3406, the system responds with Email Quote page 3900, FIG. 3J.

Save Quote page 3600, FIG. 3F, contains Quote Name widget 3601, Email Quote widget 3602, and Save Quote widget 3603. The user enters a reference name in Quote Name widget 3601. The user selects or deselects the Email Quote widget 3602 depending upon whether the user desires to have the quote sent to the user's email account. The user selects Save Quote widget 3603, and the system responds with fourth Quote page 3400.

Quote Comparison page 3700, FIG. 3G, contains Table widget 3701, Purchase widget 3702, Change Car/Driver widget 3703, Customize Coverages widget 3704, Email My Quote widget 3705, Save Quote widget 3706, Purchase widget 3707 and Back widget 3708. Table widget 3701 includes estimated quotes of insurance companies for comparison purposes. If the user selects Change Car/Driver widget 3703, Customize Coverages widget 3704, Email My Quote widget 3705, Save Quote widget 3706, or Purchase widget 3707, the system responds in the same way as to the selection of Change Car/Driver widget 3404, Customize Coverages widget 3405, Email My Quote widget 3406, Save Quote widget 3407 and Purchase widget 3409, respectively. If the user selects Back widget 3708, the system) responds with fourth Quote page 3400. If the user selects Purchase widget 3702, the system responds in the same way as if the user had selected Purchase widget 3707.

Change Car/Change Driver Info page 3800 includes Car Information widget 3801, Driver Information widget 3802, Driver and Car Matching widget 3803, Coverages/Coverage Levels widget 3804, Cancel widget 3805, and Recalculate widget 3806. If the user selects Car Information widget 3801, the system responds with Car Summary page 3810. See FIG. 3K. If the user selects Driver Information widget 3802, the system responds with Driver Information page 3820. See FIG. 3L. If the user selects Driver and Car Matching widget 3803, the system responds with Matching Drivers to Cars page 3830. See FIG. 3M. If the user selects Coverage Levels widget 3804, the system responds with Customize Coverages page 3840. See FIG. 3I. If the user selects Cancel widget 3805, the system responds with fourth Quote page 3400. See FIG. 3D. If the user selects Recalculate widget 3806, the system recalculates the quotation based upon some change in the information provided by the user, and responds with fourth Quote page 3400, FIG. 3D. Car Summary page 3810 includes table 3814, Add Another Car widget 3812, and Next widget 3813. Table 3814 includes a summary of information regarding the cars considered in the quotes and also Edit widget 3811. If the user selects Edit widget 3811, the system responds with first Quote page 3000 wherein the information relating to the selected vehicle is already entered into the information fields of the page. If the user selects Add Another Car widget 3812, the system responds with first Quote page 3000 wherein the information fields relating to the vehicle to be described are blank. If the user selects Next widget 3813, the system responds with Change Car/Driver Info page 3800. Driver Information page 3820, FIG. 3L, includes table 3824, Add Another Driver widget 3822 and Next widget 3823. Table 3824 contains information regarding the drivers included in the current quote, and also Edit widget 3821. If the user selects Edit widget 3821, the system responds with second Quote page 3100, wherein information regarding the driver whose information is to be edited is already entered into the information fields of the page. If the user selects Add Another Driver widget 3822, the system responds with second Quote page 3100, wherein the information fields regarding the driver to be entered are blank. If the user selects Next widget 3823, the system responds with Change Car/Driver Info page 3800.

Matching Drivers to Cars page 3830 includes matrix 3836 and Next widget 3835. Matrix 3836 has as rows drivers entered in the existing quote, and as columns vehicles entered in the existing quote. Illustratively, for a quote containing two vehicles and two drivers, matrix 3836 would contain four percentage driven widgets 3831, 3832, 3833 and 3834. Percentage driven widget 3831 permits entry of the amount of time the first driver operates the first vehicle. Percentage driven widget 3832 permits entry of the amount of time the first driver operates the second vehicle. Percentage driven widget 3833 permits entry of the amount of time the second driver operates the first car vehicle. Percentage driven widget 3834 permits entry of the amount of time the second driver operates the second vehicle. The user selects the percentage of time each vehicle is operated by each driver by selecting the appropriate values from the list contained in percentage driven widgets 3831, 3832, 3833 and 3844. However, each vehicle must have a primary driver identified by the selection of one driver operating that vehicle more than half of the time. If the user selects Next widget 3835, the system responds with Change Car/Driver Info page 3800. See FIG. 3H.

Customize Coverage page 3840, FIG. 3I, includes Coverage Level widgets 3841, Cancel widget 3842 and Next widget 3843. The user selects a coverage limit to modify by selecting the corresponding Coverage Level widget 3841, and then selecting a new coverage limit from the drop-down list displayed for that widget. If the user selects Cancel widget 3842, the system responds with Change Car/Driver Info page 3800. See FIG. 3H. If the user selects Next widget 3843, the system recalculates the quote based on the changed information, if any, and returns to Change Car/Driver Info page 3800.

Figure 3J:
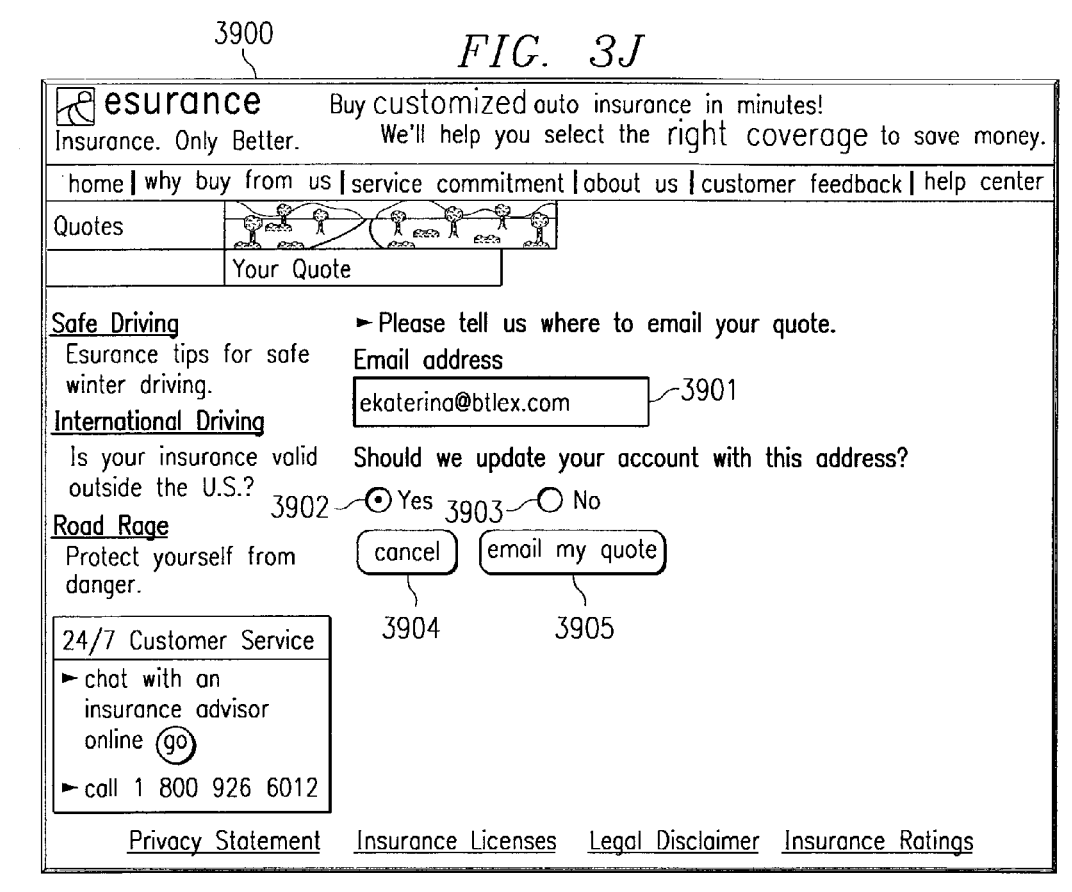

Email Quote page 3900, FIG. 3J, includes E-Mail widget 3901, Yes widget 3902, No widget 3903, Cancel widget 3904, and E-Mail My Quote widget 3905. The user enters the E-Mail address to which he or she wishes to have the quote e-mailed in Email Address widget 3901. The user selects Yes widget 3902 or No widget 3903 depending upon whether the user wishes for the email addressed entered in Email Address widget 3901 to be the email address associated with the user's account. If the user selects Cancel widget 3904, the system responds by returning to the frin which Email Quote page 3900 was called. If the user selects Email My Quote widget 3905, the system responds by emailing the user the current quote, and then returning to the page from which the Email Quote page 3900 was called.

Figure 5B:
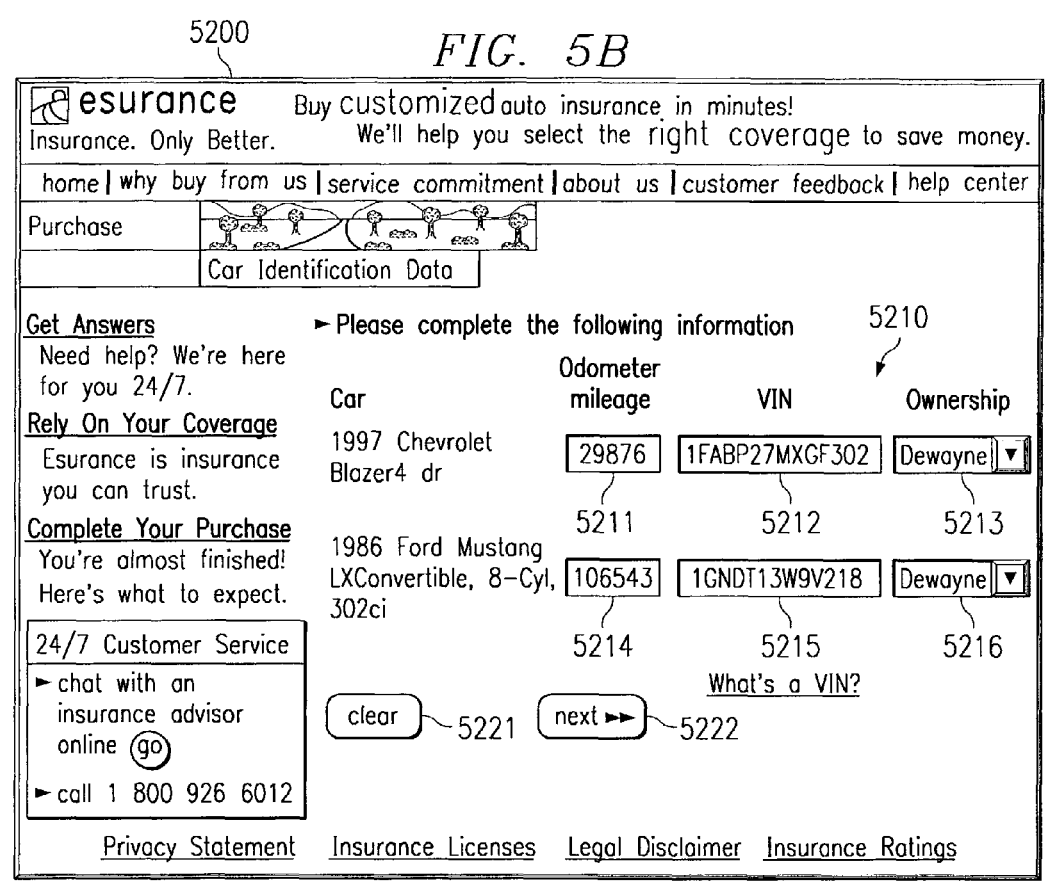

Turning now to FIG. 5, first Purchase page 5000 includes Date widget 5001, First Name widget 5002, Middle Initial widget 5003, Last Name widget 5004, Mailing Address widget 5005, City widget 5006, State widget 5007, Zip Code widget 5008, Home widget 5009, Business widget 5010, Both widget 5011. Phone Area Code widget 5012, Phone Number widget 5013, Fax Area Code widget 5014, Fax Number widget 5015, Driver's License Number widget 5016, Issuing State widget 5017, Email Address widget 5018, Clear widget 5019 and Next widget 5020. The user enters the effective date for the insurance policy in Date widget 5001. The user enters the policy holder's first name, middle initial, and last name in First Name widget 5002, Middle Initial widget 5003 and Last Name widget 5004, respectively. The user enters the policy holder's mailing address, city, state and zip code in Mailing Address widget 5005, City widget 5006, State widget 5007 and Zip Code widget 5008, respectively. The user selects either Home widget 5009, Business widget 5010 or Both widget 5011 depending upon whether the indicated address is a home address, business address or both. The user enters a phone area code and phone number and fax area code and fax number in Phone Area Code widget 5012, Phone Number widget 5013, Fax Area Code widget 5014 and Fax Number widget 5015, respectively. The user enters the policy holder's driver's license number in Driver's License Number widget 5016 and also the issuing state of the policy holder's driver's license in Issuing State widget 5017. The user enters the policy holder's email address in Email Address widget 5018. If the user selects Clear widget 5019, the system responds by displaying first Purchase page 5000 with all of the widgets blank. If the user selects Next widget 5020, the system responds with second Purchase page 5100 (see FIG. 5A) if there is a second driver on the policy, or Car Identification Data page 5200 (see FIG. 5B) if there is no second driver on the policy.

Second Purchase page 5100, FIG. 5A, is identical to first Purchase page 5000, except Second Purchase page 5100 lacks Date widget 5001, and second Purchase page 5100 includes Relationship widget 5101. The user enters information regarding the second driver in second Purchase page 5100. Additionally, the user selects a relationship to the policy holder for the second driver, using Relationship widget 5101. If the user selects Next widget 5102, the system responds with either another second Purchase page 5100 if there are additional drivers on the policy, or with Car Identification Data page 5200, FIG. 5B, if there are no more additional drivers on the policy.

Car Identification Data page 5200 includes matrix 5210, Clear widget 5221 and Next widget 5222. Matrix 5210 includes a row for each vehicle identified in the policy. Illustratively, for a policy containing two vehicles, matrix 5210 includes odometer widgets 5211 and 5214, VIN widgets 5212, and 5215, and ownership widgets 5213 and 5216. The user enters the odometer mileage reading from each vehicle in Odometer widgets 5211 and 5214. The user enters the vehicle identification number for each vehicle in VIN widgets 5212 and 5215. The user enters the name of the owner for each vehicle in Ownership widgets 5213 and 5216. If the user selects Clear widget 5221, the system responds by clearing the information from matrix 5210. If the user selects Next widget 5222, the system responds with Payment Information page 5300. See FIG. 5C.

Payment Information page 5300 includes Monthly widget 5301, Six Month widget 5302, MasterCard widget 5303, Visa widget 5304, Credit Card Number widget 5305, Expiration Date widget 5306, Social Security Number widget 5307, First Name widget 5308, Middle Initial widget 5309, Last Name widget 5310, Billing Address widget 5311, City widget 5312, State widget 5313, Zip Code 5314, Phone Number widget 5315, Policy Email Address widget 5316 Update widget 5317 and Next widget 5318. The user selects either Monthly widget 5301 or Six Month widget 5302, depending upon whether the user desires to make payments monthly or bi-annually. The user selects either MasterCard widget 5303 or Visa widget 5304 depending upon which credit card the user desires to use to make payments for the policy. The user enters the credit card number to be used for payments in Credit Card Number widget 5305, and further enters the expiration date for that credit card in Expiration Date widget 5306. The user enters the social security number of the credit card holder in Social Security Card widget 5307. The user enters the first name, middle initial, and last name of the credit card hold in First Name widget 5308, Middle Initial widget 5309 and Last Name widget 5310, respectively. The user enters the billing address, city, state and zip code of the credit card holder in Billing Address widget 5311, City widget 5312, State widget 5313 and Zip Code 5314, respectively. The user enters the credit card holder's telephone number in Telephone Number widget 5315. The user enters the address to send renewal and billing notices in Email Address widget 5316. The user either selects or deselects Update Account widget 5317, depending upon whether the user wishes to make the email address entered in Email Address widget 5316 the email address associated with the user's account. The user then selects Next widget 5318.

Figure 6:
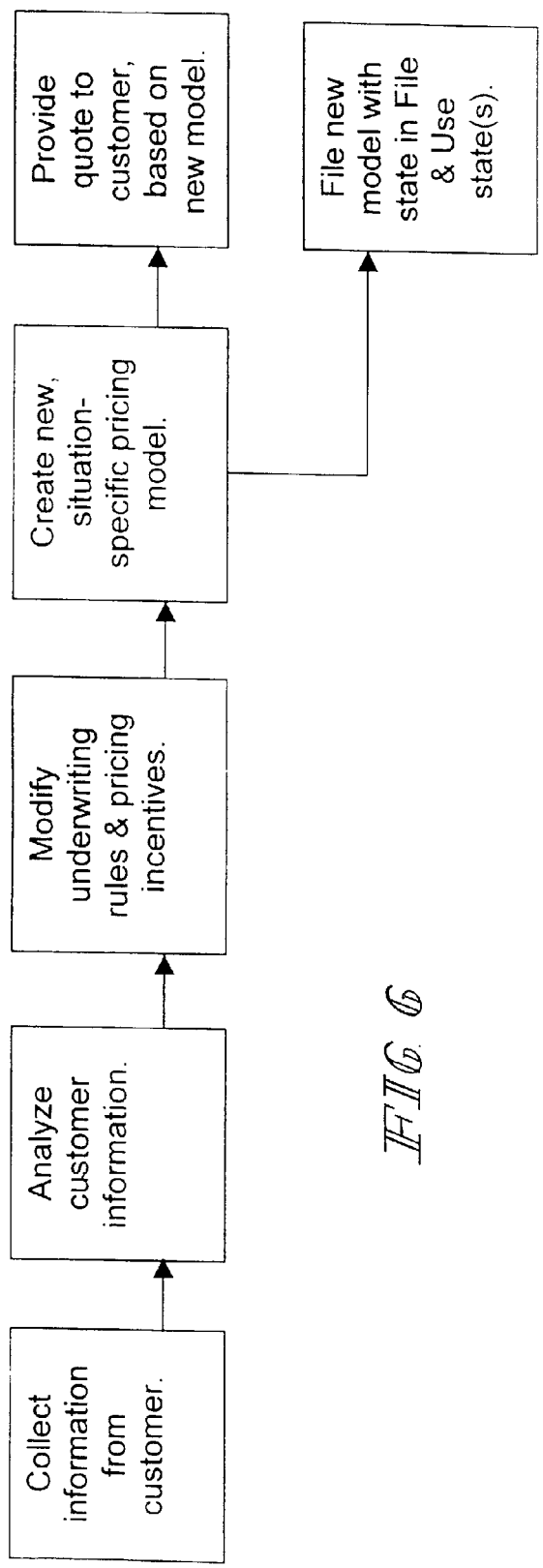
FIG. 6 illustrates a method of creating insurance pricing models according to the present invention.

A method for creating and using insurance pricing models is illustrated in FIG. 6. A real-time, closed loop system permits an insurance provider dynamically to create and use new underwriting rules, pricing incentives and pricing disincentives in file and use states. First, the insurance provider collects information from individual customers. As each customer provides information, the information is analyzed. This analysis leads to the modification of the underwriting rules and pricing incentives upon which the pricing model is based. A new pricing models is created based upon the changed rules and incentives. The customer is provided a quote based on the new pricing model. At the same time, the new insurance pricing model is filed with the state.

According to another illustrative embodiment of the invention, the method described in FIG. 6 can be used with predictive techniques which provide an estimation of an insurance provider's book by considering the time of year, trends in claims, and trends in regional traffic. For example, in Florida, the winter months have higher tourist traffic and increased accident rates. Knowing this, an insurance provider may use these predictive techniques, for example, to raise insurance prices in September for customers purchasing six-month policies in Florida during the winter months. This permits an insurance provider to price insurance for these customers more appropriately in relation to the risks involved. These techniques can be used to provide insurance customized down to the level of the individual customer.

Figure 7:
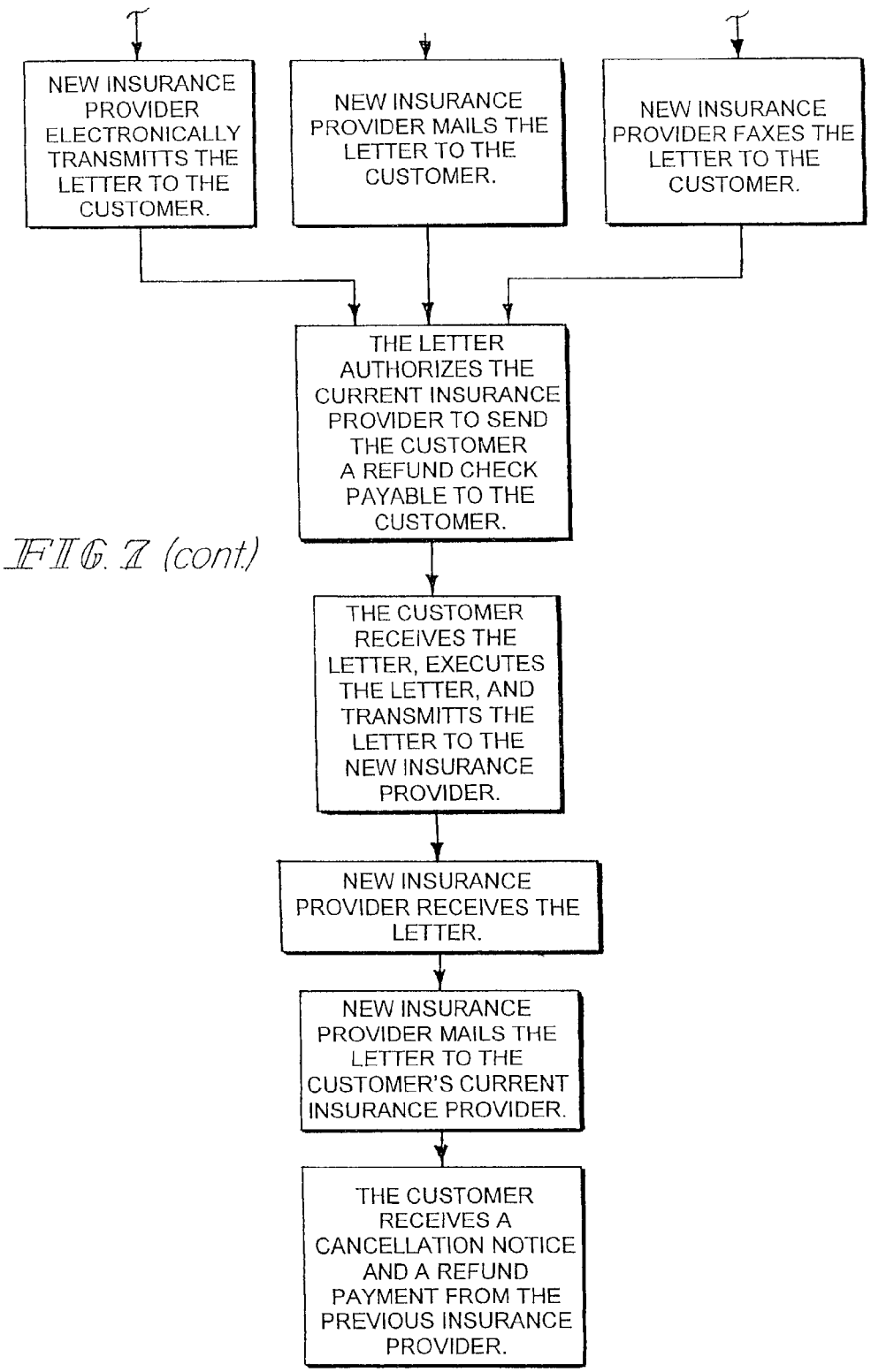

A method for insurance policy roll-over is illustrated in FIG. 7. This method simplifies the process of transferring a remaining balance on one insurance policy to a new insurance policy. When a user purchases a new insurance policy, the new insurance provider asks the user if he or she is interested in rolling over the balance of his or her existing insurance policy. If so, the user provides the name of his or her current insurance provider and the number of his or her current policy. The system then generates a document indicating the customer's desire to cancel his or her current policy and to appoint the new insurance provider as his or her representative. The user then prints this document, executes it, and transmits it to his or her current insurance provider. Thereafter, the current insurance provider transmits the balance amount remaining on the cancelled insurance policy to the user.

FIG. 7A illustrates another embodiment of this aspect of the invention. Referring to FIG. 7A, when a user purchases a new insurance policy, the new insurance provider asks the user if he or she is interested in rolling over the balance of his or her existing insurance policy. If so, the user provides the name of his or her current insurance provider and the number of his or her current policy. The system then electronically generates a document indicating the customer's desire to cancel his or her current policy and to appoint the new insurance provider as his or her representative. The user then prints this document, executes it, and transmits it to the new insurance provider, or the user executes the document electronically via a digital signature which is immediately received by the new insurance provider. Thereafter, the new insurance provider contacts the current insurance provider and obtains directly the balance amount of current insurance policy. The new insurance provider applies this balance amount to the new policy.

Figure 8:
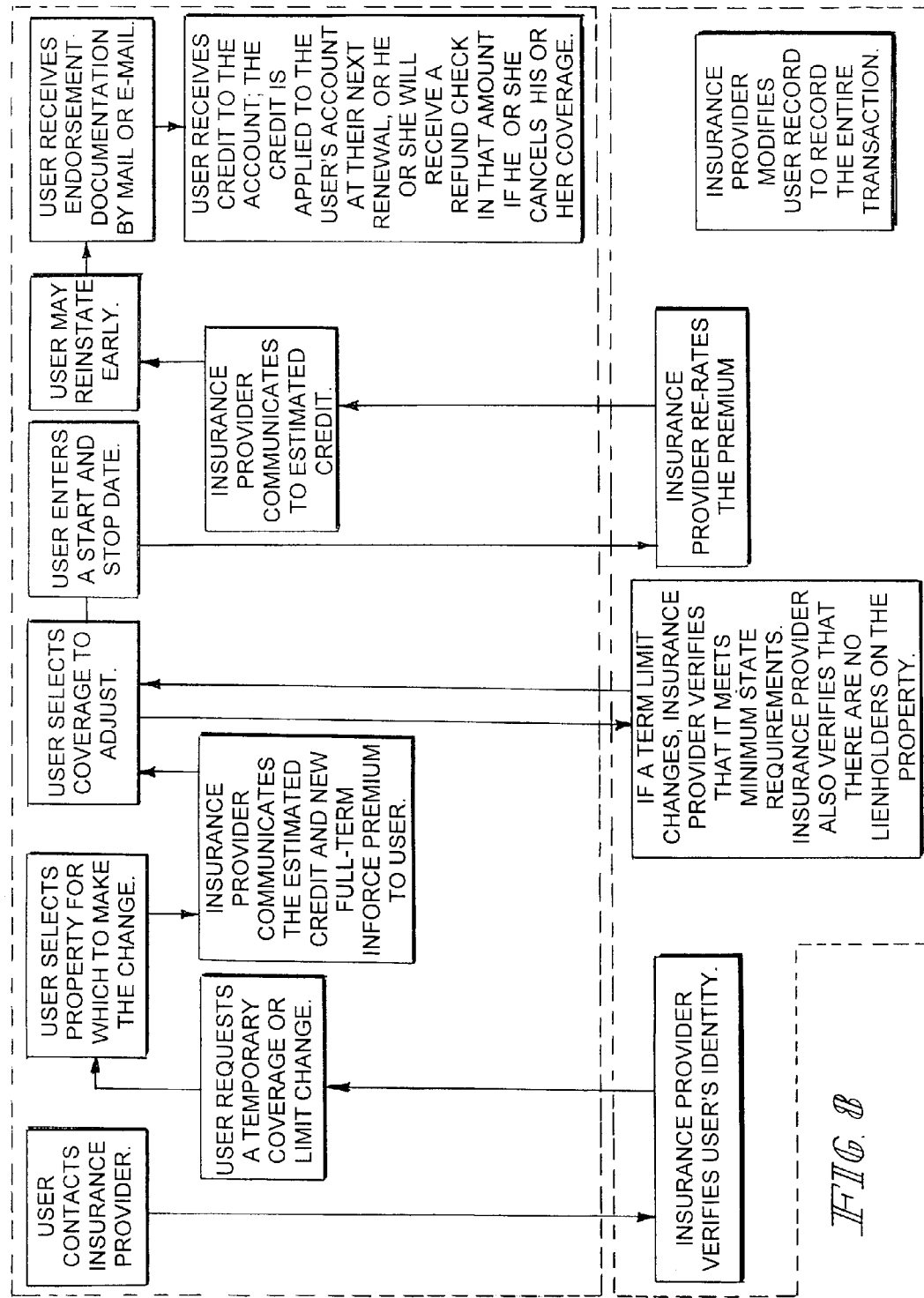
FIG. 8 illustrates a method of modifying insurance coverage according to the present invention.

Turning to FIG. 8, a method is illustrated for permitting an individual to control more completely the level of indemnification he or she purchases. For example, an individual who travels for extended periods of time may wish to suspend all vehicle insurance coverage except for comprehensive, because the only risks of loss for an unused vehicle are those associated with fire, theft and the like. Another example in which such control might be useful is in the case of a vehicle that is only used on a seasonal basis. This aspect of the invention permits an individual to suspend insurance coverage temporarily in such events.

According to this aspect of the invention, the user contacts the insurance provider. The insurance provider verifies user's identity. The user requests a temporary coverage or limit change. The user selects the property for which to make the change. The insurance provider communicates the estimated credit and new full-term in-force premium to the user. The user selects the coverage to adjust. If there is a term limit change, the insurance provider verifies that the change meets any minimum state requirements. The insurance provider also verifies that there are no lienholders on the property. The user enters start and stop dates. The insurance provider re-rates the premium. The insurance provider communicates the estimated credit to the user. The user receives endorsement documentation by mail or e-mail. The user receives credit to the user's account, which credit is either applied to the user's account at the next policy renewal, or sent to the user as a refund check if he or she cancels his or her coverage. This aspect of the invention also contemplates that the user may reinstate the coverage early for a fee.

Figure 9:
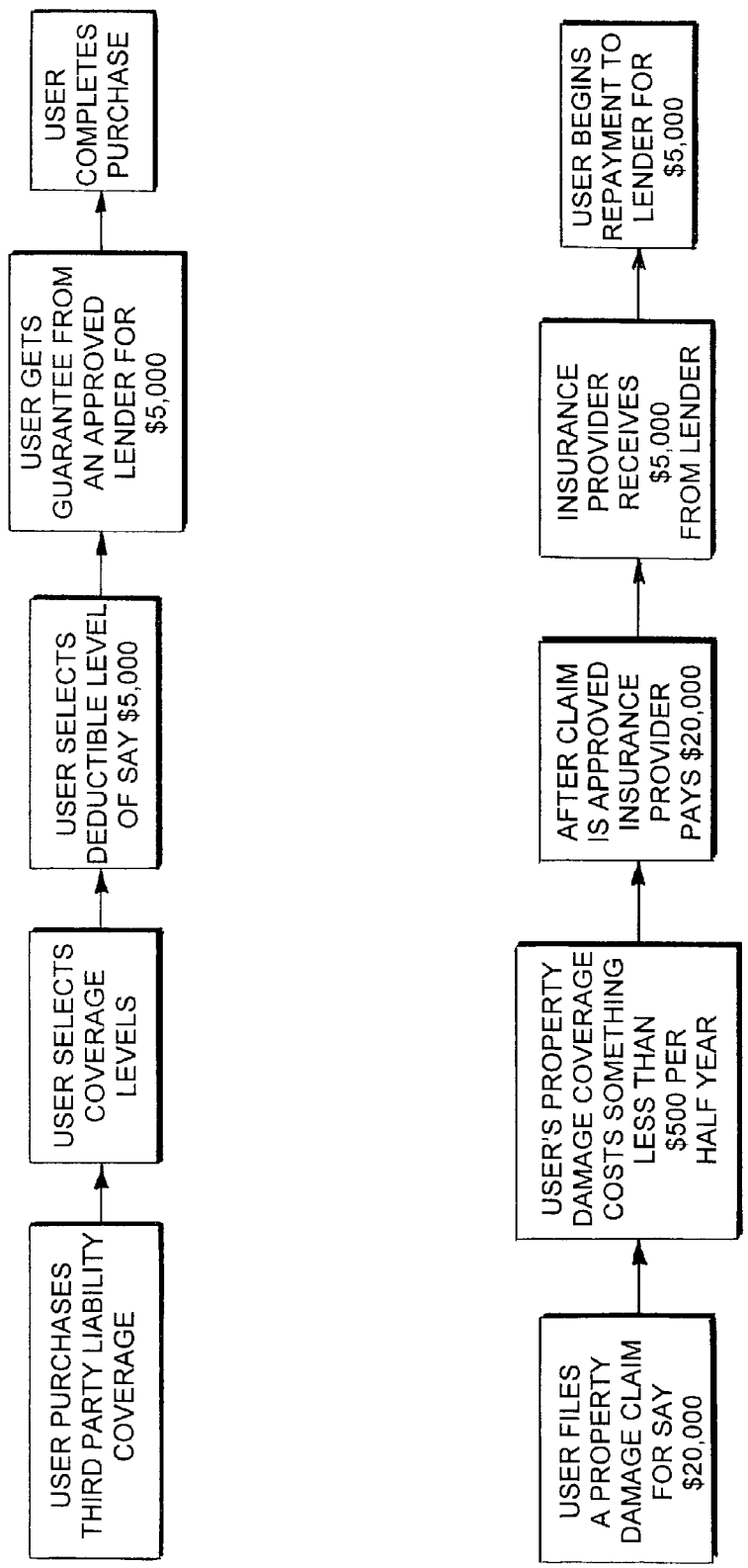
FIG. 9 illustrates a method of utilizing a secured deductible for liability insurance coverage according to the present invention.

Turning to FIG. 9, a method is illustrated which permits an insurer to provide a user with a third party liability insurance deductible by utilizing a third party guarantor. Specifically, according to this illustrative embodiment, a third party guarantor that is able to secure the deductible obligation and provide for reliability in its payment is required. In this way, an insurance provider pays a claim, but subrogates the user's deductible with his third party guarantor. The third party guarantor is ultimately responsible for collection of the deductible from the user, and the insurance provider bears no credit risk. This permits an insurance provider to offer an insurance price, for those users willing to bear some risk, that is difficult to match by competitors who are obligated to pay first dollar exposure on claims.

Figure 10:
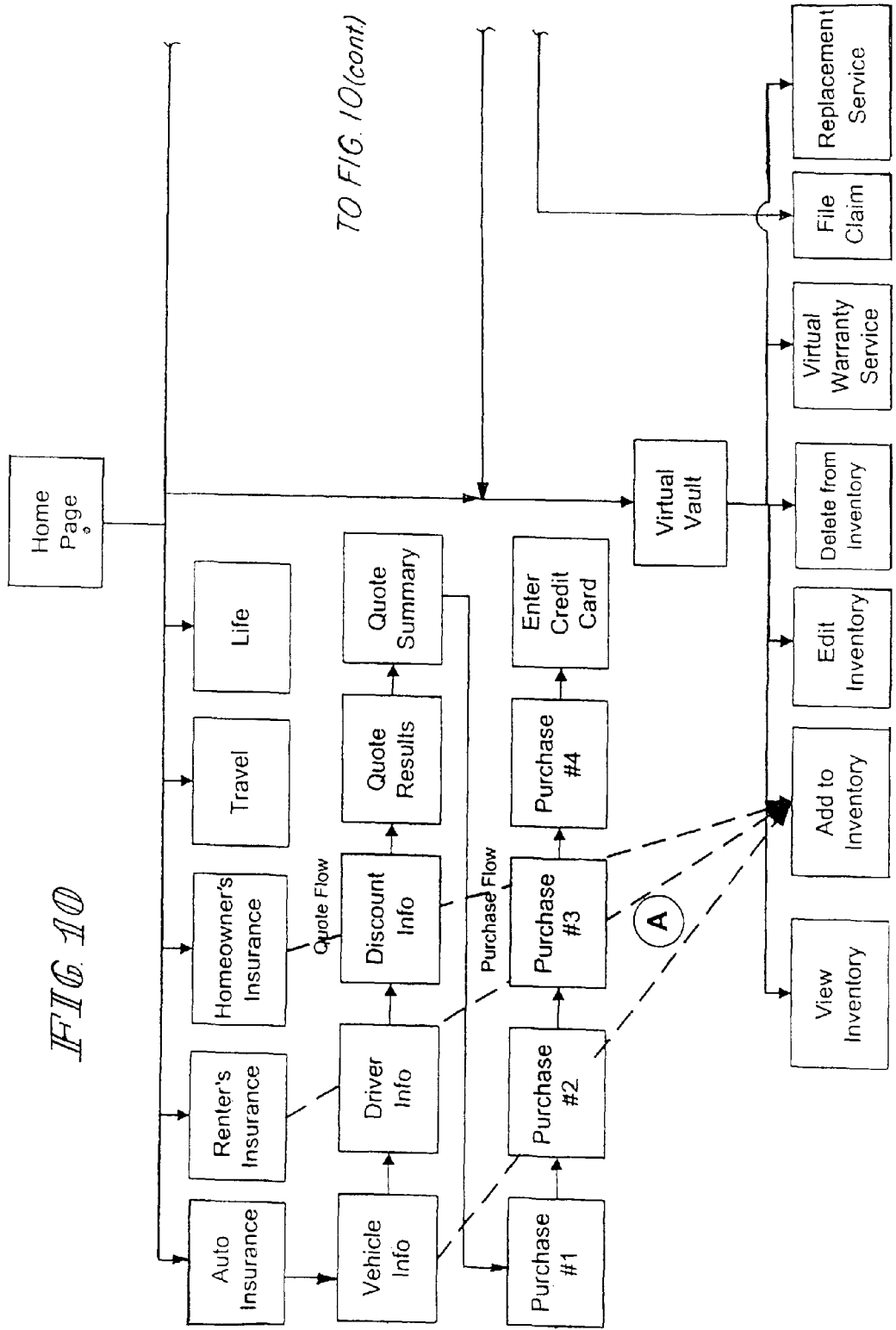
FIGS. 10 and 10A-G illustrates methods of storing information regarding personal property in databases according to the present invention.
Figure 10:
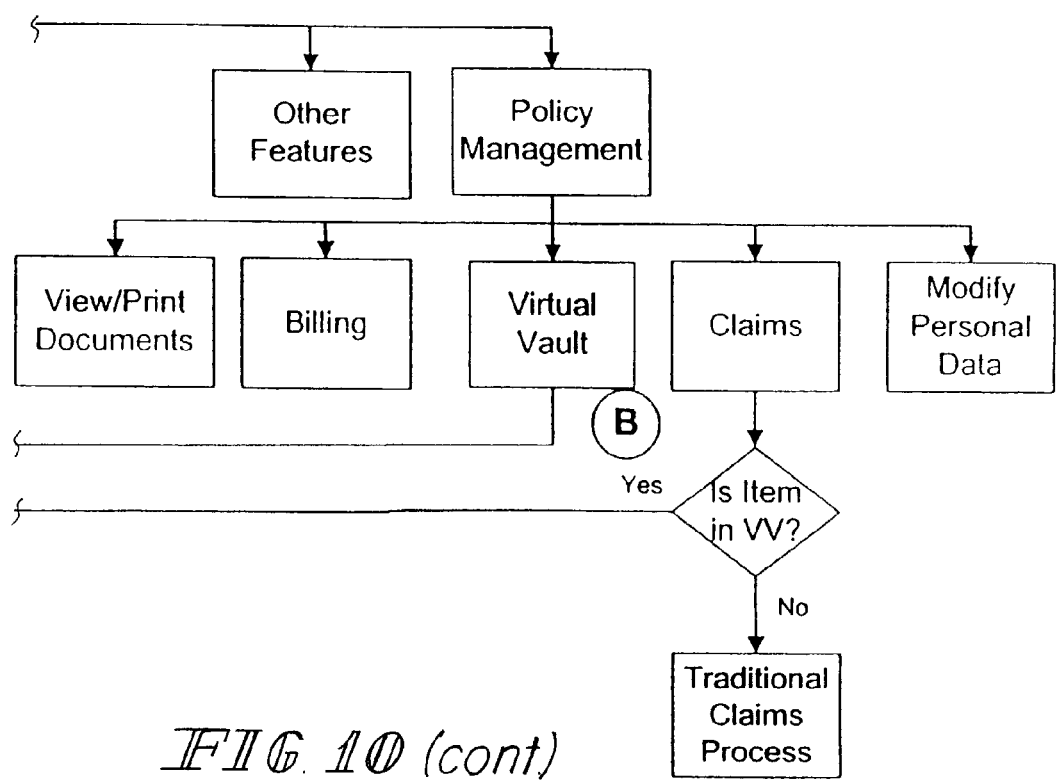
Figure 10A:
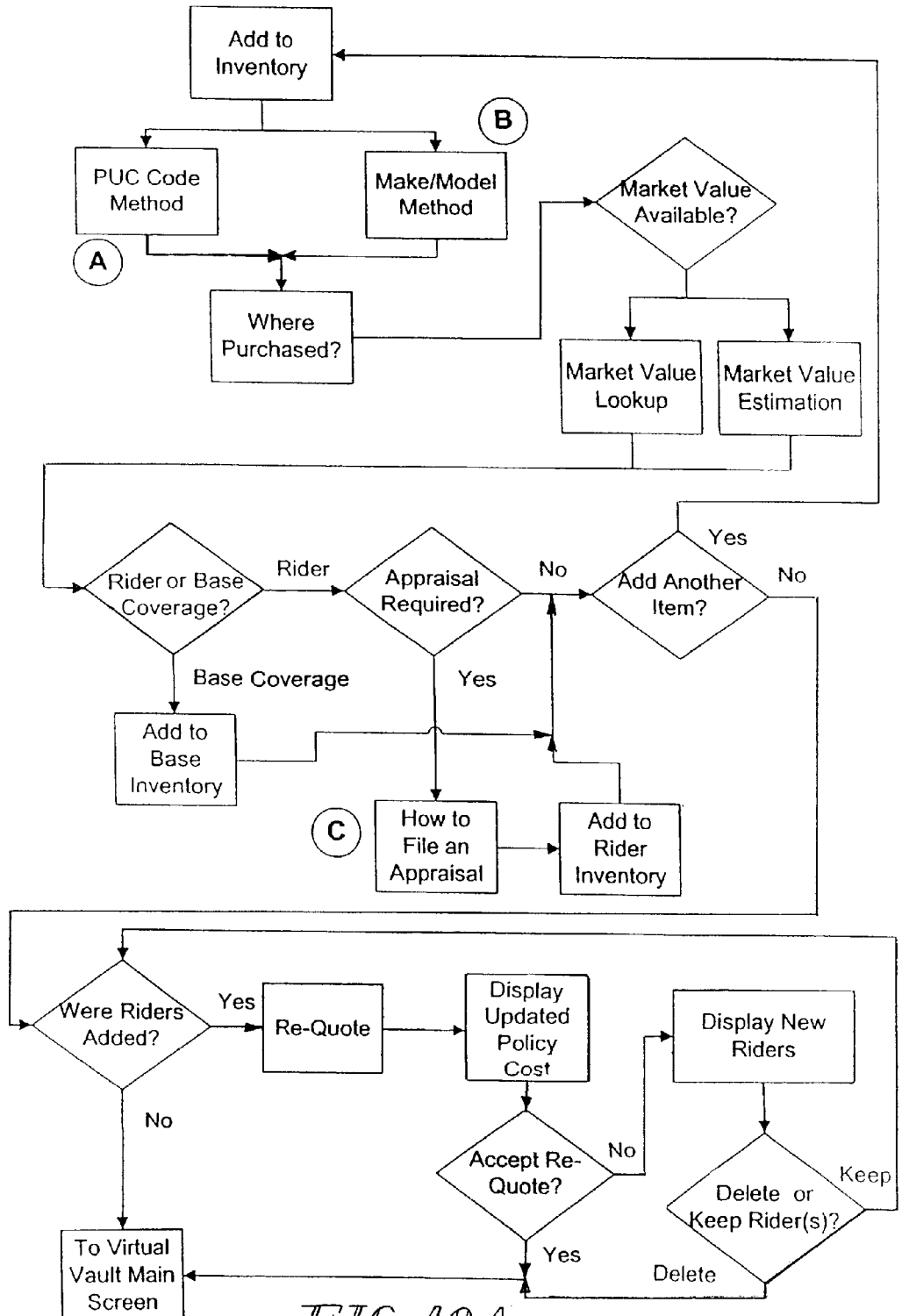
Figure 10B:
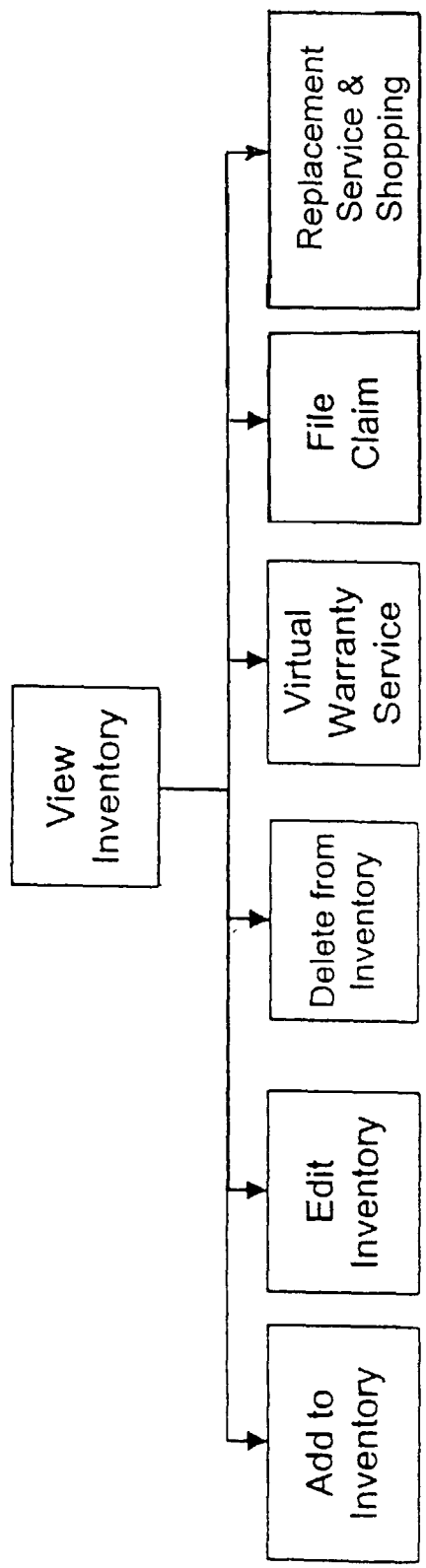
Figure 10C:
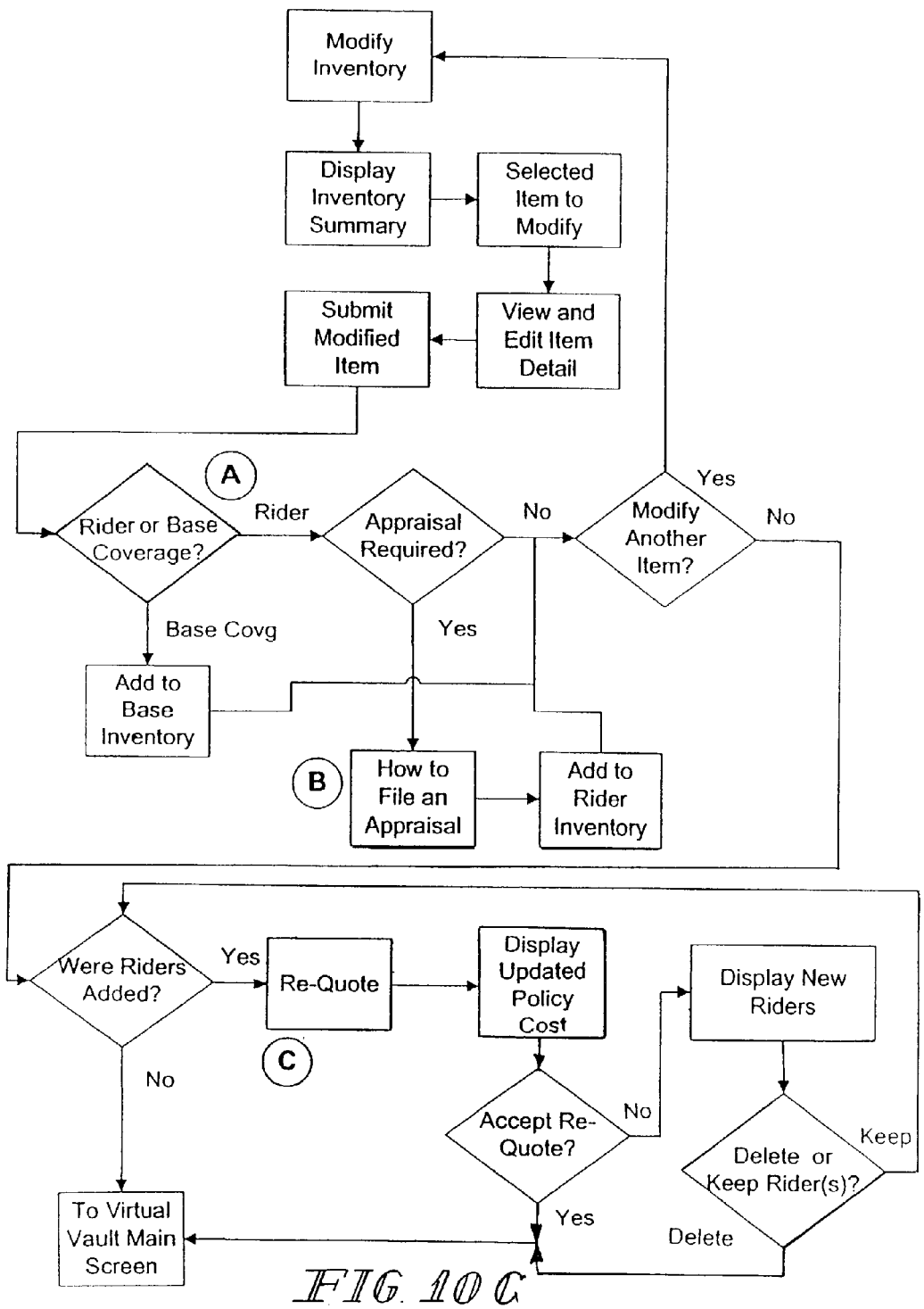
Figure 10D:
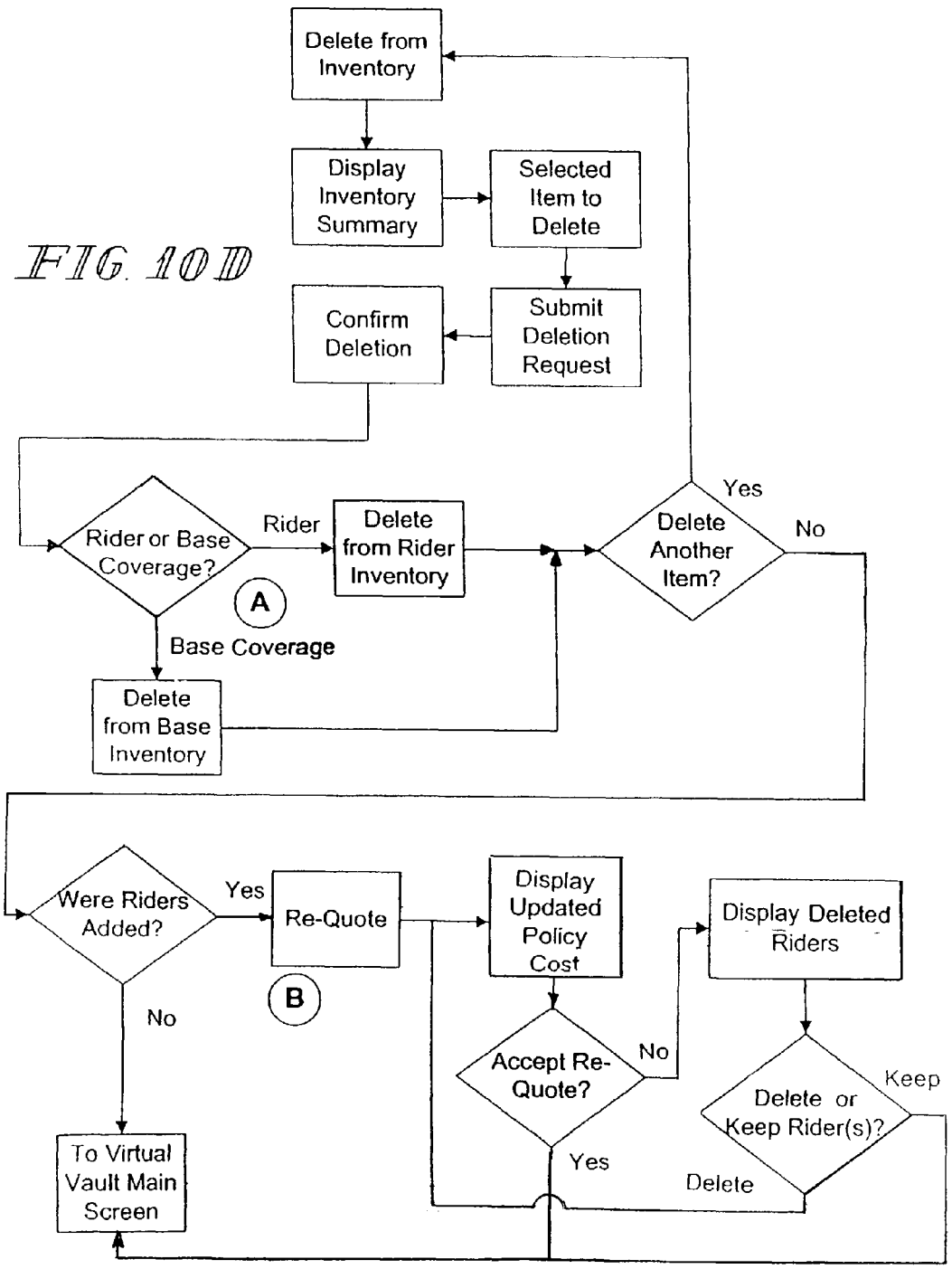
Figure 10E:
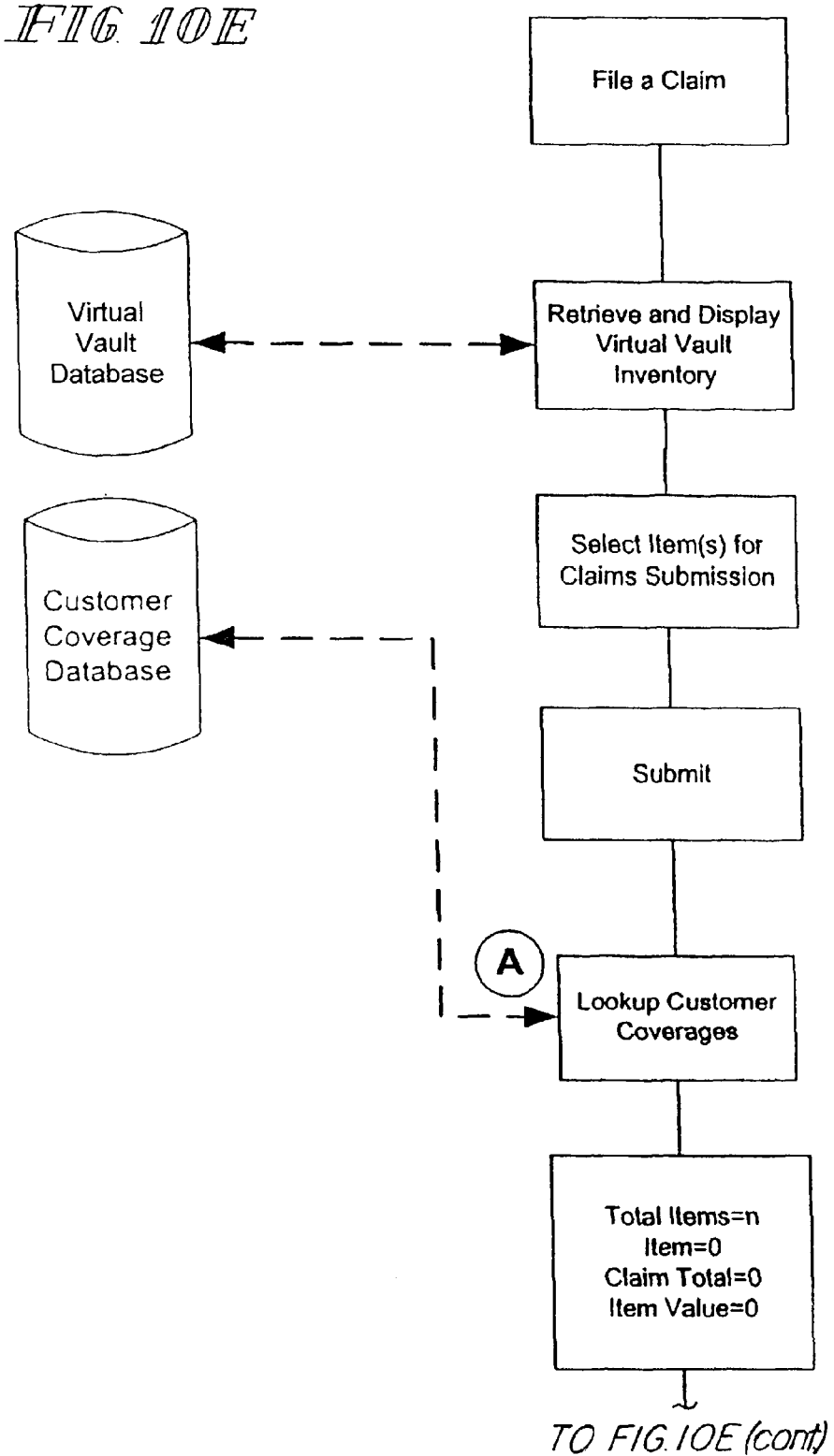
Figure 10E:
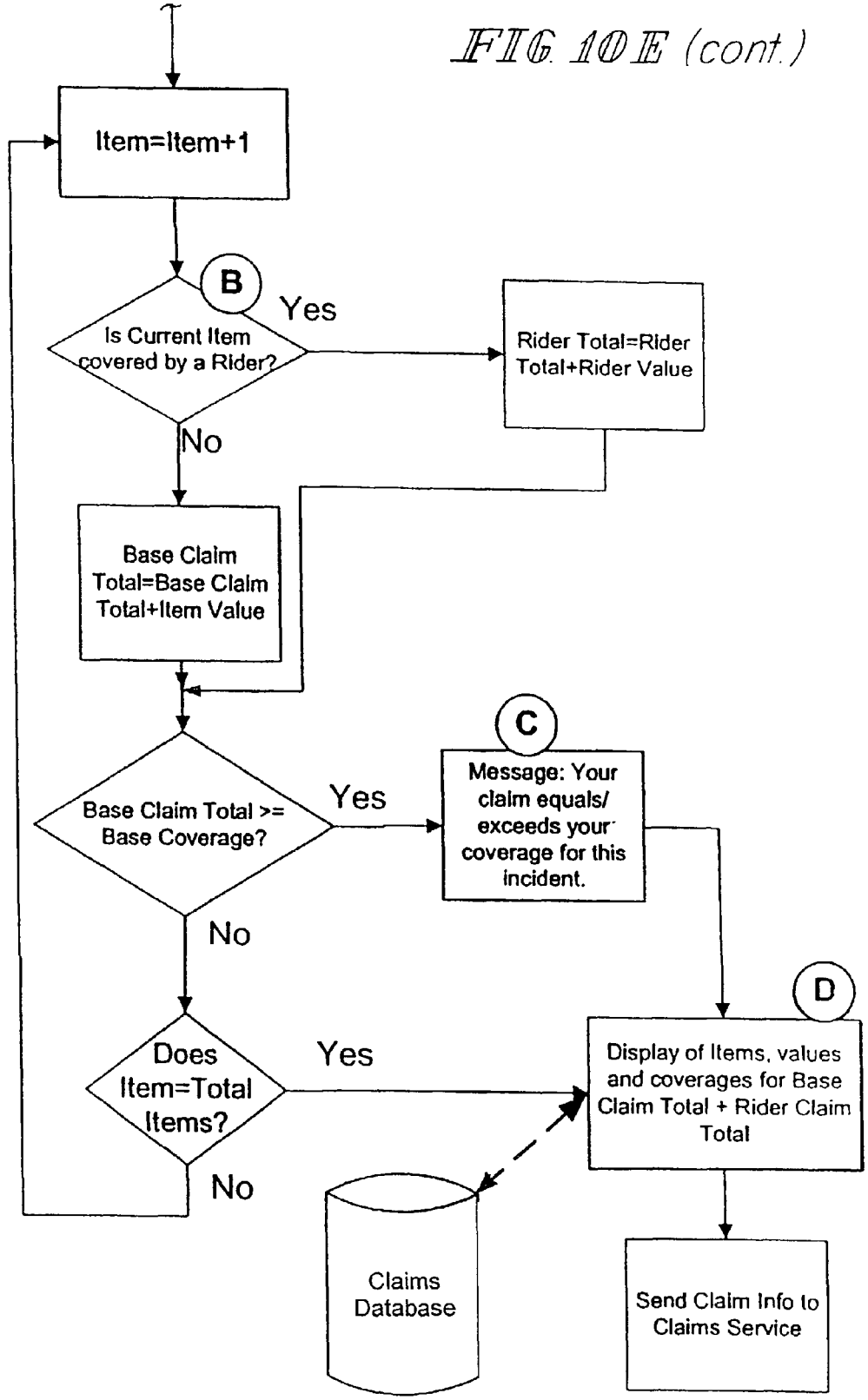
Figure 10F:
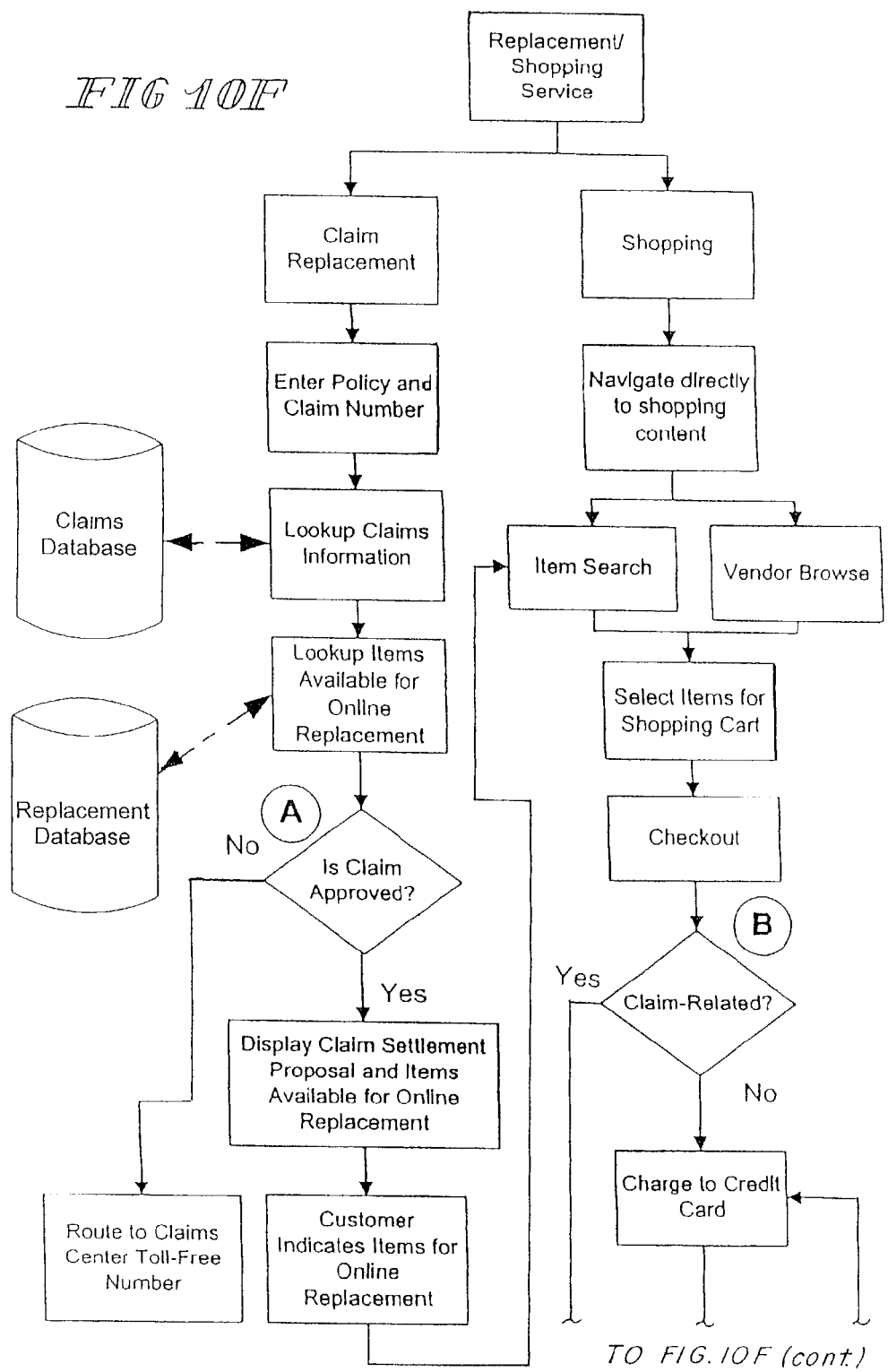
Figure 10F:
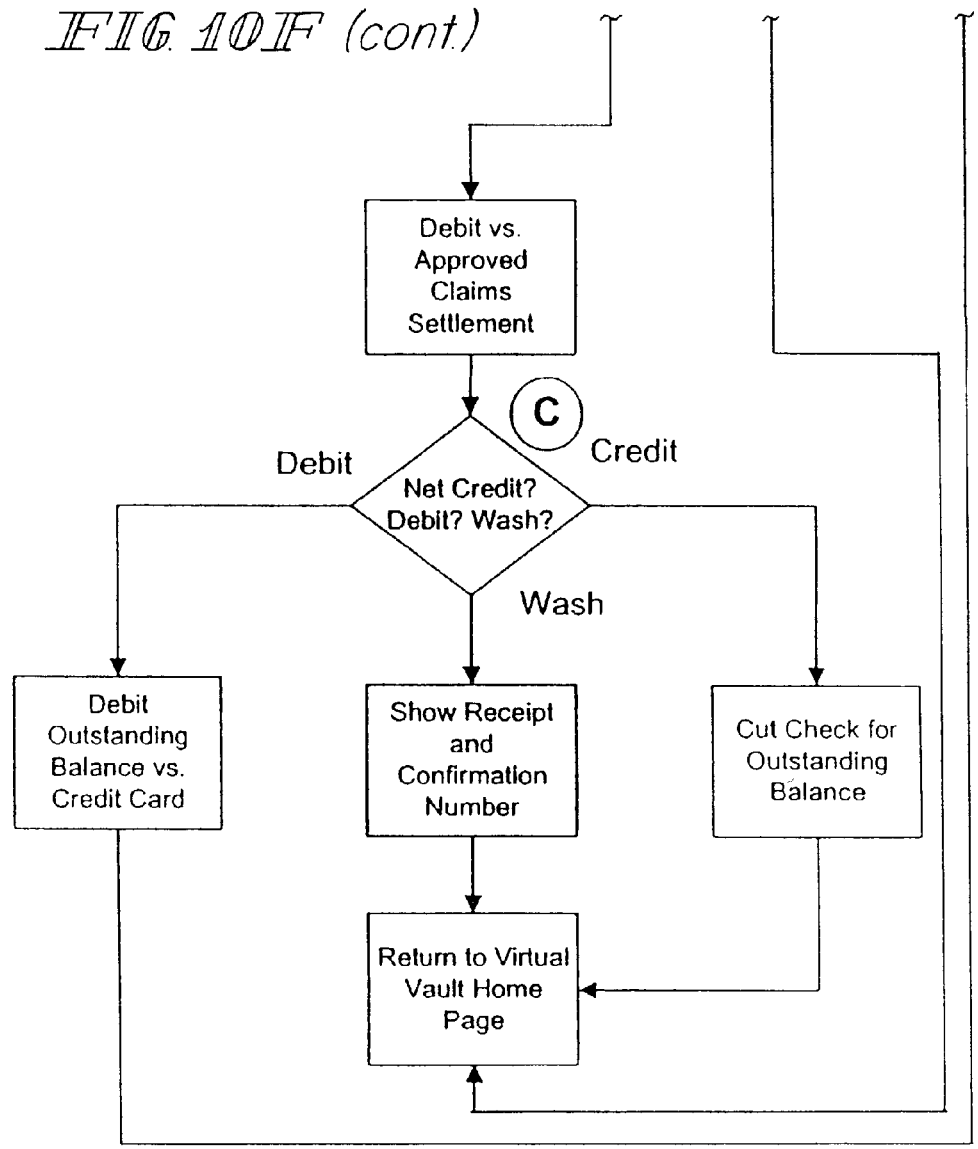

Turning to FIGS. 10-10F, a database is provided into which a user enters information regarding personal property. The information includes such elements as model number, serial number, description, purchase price, purchase location, and the like for each piece of property. Users may either enter information directly into the database, as illustrated in FIG. 10, or, if they purchase insurance from an insurance provider using a computer, in which specific property is itemized, such as automobile insurance or riders to a homeowner's or renter's policy, then the information is automatically entered into the database, as indicated at A of FIG. 10.

Referring now to FIG. 10A, and with reference to those steps labeled A, a method is illustrated wherein users enter the Universal Product Code (UPC) code found on the packaging of most products, or the products themselves, and the insurance provider's computer performs a database query to determine appropriate product details from a family of databases licensed for this purpose. The user also enters the serial numbers of the products in order to specify the exact items to be insured. The data elements the user is required to enter to complete a record using this method are: UPC, serial number, date of purchase, place of purchase, and purchase price. Additionally, if a credit card was used in the transaction, the user would enter the credit card type, and the credit card statement date.

Alternatively, and with reference to those steps labeled B in FIG. 10A, a method is illustrated in which a user activates on-screen pull-down menus to select make and model designations in order to enter information pertaining to the property into a database. The user also enters the serial number of the property in order to specify the exact item to be insured. The data elements the user is required to enter to complete a record using this method are: product type, product make, product model, date of purchase, place of purchased and purchase price. Additionally, if a credit card was used in the transaction, the user would enter the credit card type, and the credit card statement date.

After the above information has been entered, the system determines whether market value data is available. If market value data is available, the system performs a database query to determine the market value. If market value data is not available, the system performs a market value estimation. Next, the system determines whether the insurance coverage type for the property is a rider or base coverage. For base coverage, the system adds the information to the base property inventory. For rider, the system determines whether an appraisal is required for the property. If an appraisal is required, the system explains to the user how to file an appraisal. Once the user has filed an appraisal, the information regarding the property is added to the rider inventory. If an appraisal is not required, the information regarding the property covered by the rider is added immediately to the rider inventory. After the information regarding the property is added to either the base inventory or the rider inventory, the system determines whether the user wishes to add another item of property. If so, the system returns to the beginning of the loop and asks the user to enter information regarding this item of property. If not, then the system determines whether riders were added during this session. If riders were added, the system recalculates the quote for the policy, displays the updated policy costs, and asks the user whether he or she desires to accept the updated policy cost. If the user selects no, the system displays the newly created riders, and asks the user whether to delete the riders or keep the riders. If the user decides to keep certain of the riders, the system returns to the decision of whether riders were; aided this session. If the user decides to delete the riders, the system returns to the main screen. Likewise, if the user decides to accept the newly updated quote for the policy, the system returns to the main screen.

As illustrated in FIG. 10B, the system provides the user with the ability to see a summary of all items of property stored in the database, including, items covered under the user's policy, items covered by riders to the policy, and additional items the user may wish to record. From the page implementing this ability to view the inventory, the user can select items of personal property, modify the descriptions of items of personal property, delete items of personal property, use a warranty service, file a claim, use the replacement service for approved claims, or shop for merchandise.

The system provides the user with the ability to modify the inventory stored in the database. As illustrated in FIG. 10C, this process is similar to the process described above for adding items to the database. The primary difference is that, rather than entering information into blank fields, the user selects an item to modify, and views and edits the details of that item.

The system further provides the user with the ability to delete items from the database. As illustrated in FIG. 10D, this process is also similar to the processes for adding and modifying items in the database. The primary difference is that here, rather than adding or modifying an item, the user is selecting an item to be removed.

When it is necessary to file a claim, a user having information stored in the database need only check off the items that were lost or damaged and enter a police or fire report number, as illustrated in FIG. 10E. The system quickly calculates a claim settlement. This settlement typically is subject to review by human claims handlers. Once a settlement has been reached, customers will be able to replace many of their items directly from an on-line replacement center maintained by the insurance provider.

With continuing reference to FIG. 10E, the process of filing a claim is illustrated. First, the user elects to file a claim. The system responds by retrieving and displaying information regarding all of the inventory contained in the database for that user. Next, the user selects items from the for claim submission, and submits the claim. The system responds by determining the user's insurance coverages. The system then proceeds to examine each item for which a claim has been submitted. First, the system determines whether an item is covered by a rider. If an item is covered by a rider, the value of that item is added to the rider total for the claim submission. If the item is not covered by a rider, the item's value is added to the base claim total for this submission. Next, the system determines whether the base claim total is greater than or equal to the base coverage. If it is, the system notifies the user that the claim equals or exceeds the user's coverage for this incident, displays the items and the values for this submission, displays the coverages for the base claim total and the rider claim total and sends the claims information to the insurance provider's claim service for processing. If the base claim total is not greater than or equal to the base coverage, the system repeats this process for the following item, and for all subsequent items, until either all items have been processed, or the base claim total is equal to or greater than the base coverage. In this manner, a claim can be almost immediately processed.

Turning to FIG. 10F, after a claim has been filed, the insurance provider works with on-line retailers to find replacement items of property for lost items of property identified in the claim, order these replacement items electronically, and have these replacement items shipped to the user. Additionally, the insurance provider assists the user in obtaining replacement manuals for goods, in obtaining extended warranties for goods, in obtaining replacement parts for goods, and by suggesting upgrades and cross-purchases when exact replacement is not possible. FIG. 10F describes this process in detail.

Figure 10G:
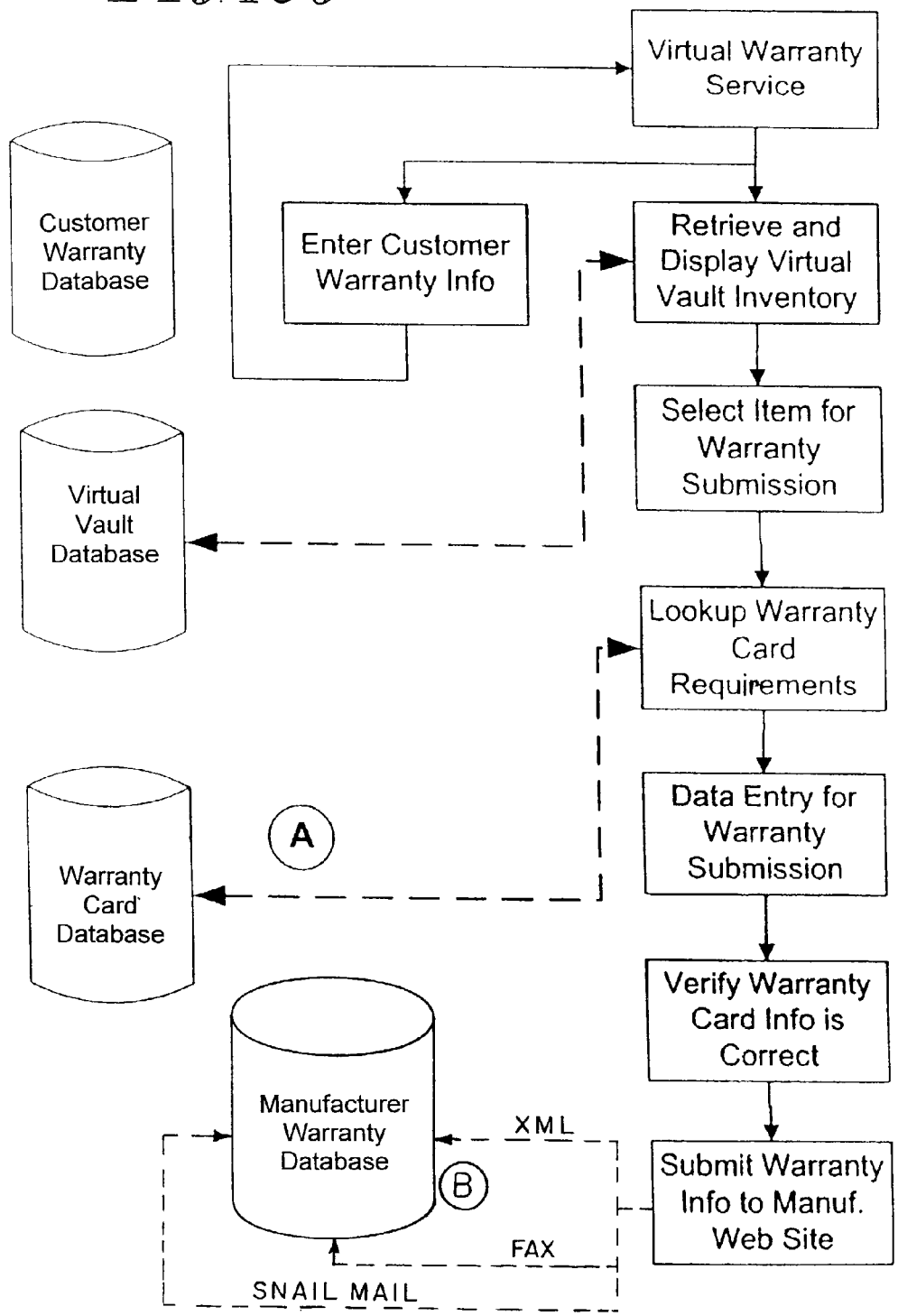

Turning to FIG. 10G, when a user establishes a database account, the user will have the option to direct the insurance provider to automatically submit warranty cards to manufacturers for all items of personal property the user enters into the database in the future. To accomplish this, the user enters standard warranty card data, for example, name and address, only one time. From that point forward, whenever the user purchase a new product, the user only needs to enter product information as described above, and the system will automatically create a warranty card, and transmit the card to the manufacturer electronically if possible, or otherwise via postal service.

Figure 11:
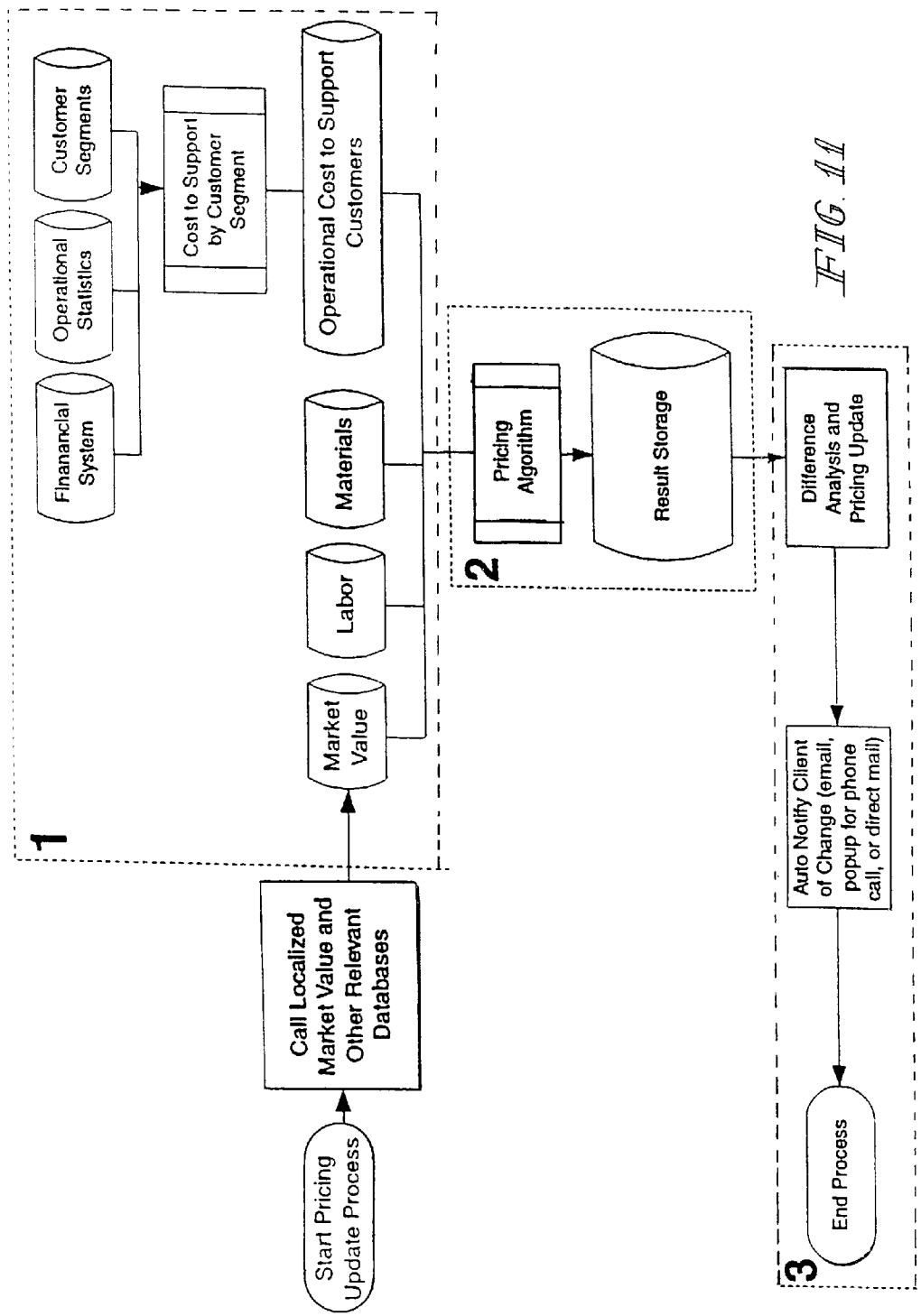
FIG. 11 illustrates a method for calculating insurance pricing according to the present invention.

Turning to FIG. 11, a method is illustrated which uses information technology to automatically extract and integrate relevant market variables in order to continuously adjust and update pricing for property and casualty lines of insurance. This process requires minimal human intervention and maintenance. This method is advantageous because previous methods for adjusting homeowners' insurance rates and coverages were so time-consuming and cumbersome that it was essentially impossible to do so on any sort of a regular basis. The illustrated method also provides for significant savings in operational efficiency. Specifically, fewer people are required at all levels of an insurance provider's organization, including both the main office and the local offices in towns and cities. Consequently, less physical infrastructure is required. This illustrative embodiment provides an insurance provider with a competitive advantage by permitting it to reduce operating costs.

The process begins when a machine makes a request for data from external data sources. A call to localized market value and other relevant databases is initiated. Dashed line box 1 of FIG. 11 contains two main components, one including databases for market value, labor, and materials; and the other including databases for financial systems, operational statistics, and customer segments, an algorithm to determine cost to support customers by segment, and a database of operational cost to support customers.

Continuing to refer to FIG. 11, data regarding localized market conditions is passed from external sources to the data collection system. The data includes local real estate market values and the home replacement value. Home replacement value is calculated based on home size, home configuration (ranch, split level, two story, etc.), the home's external construction materials, the home's internal construction materials (flooring materials, frame, etc.), the home's foundation type (basement poured, basement brick, no basement, etc.), whether the home's basement is finished, the roof configuration (number of faces, number of edges, pitch, etc.), the home's roof materials (slate, shingle, composite, steel, tile, etc.), and the local labor rates for construction workers.

Where cost data from the insurance provider's financial system can be "spread" (allocated among customer segments), for example, in direct proportion to the economic resources consumed by each customer segment. For example, variable costs, such telephone center support costs and claims department costs, can be distributed to customer segments in direct proportion to the consumption of those resources by the various customer segments, as determined from the operational statistics database. For example, operational data may indicate that individuals in the 30 to 35 year old age range make one call per policy sold, and always file claims online, as compared with individuals in the 40 to 45 year old age range who call an average of four times per policy sold and call two times per claim filed. The individuals in the 40 to 45 year old age range are more costly to support, and this additional cost can be reflected in the pricing of insurance policies sold to these individuals. Customer segments can defined as precisely as possible, for example, to the level of precision where statistically significant differences between groups exist. Groups can be defined by any combination of age, sex, marital status, location, education, or like demographic information. Any measurable operational variable with a direct cause-effect relationship to customer segments may be used to allocate costs. These operational variables include number of claims, number of calls, call duration, call complexity, number of policies, and other similar variables.

Fixed costs that are directly related to customer support, such as heating costs and electricity costs, are allocated to customer segments in the manner described above. However, fixed costs that are generally associated with the business as a whole, and that are not directly attributable to customer segments via a cause-effect relationship, such as corporate headquarters heating costs and electricity costs, are allocated in proportion to the number of customers in each segment. To the extent that multiple insurance product lines consume the same cost pools, similar mathematical methods are applied to appropriately allocate costs to segment-product combinations.

Turning to dashed line box 2 of FIG. 11, a processing algorithm factors together the variables relevant to automatically generating insurance rates. Cost to support by customer segment localized real estate market values are compared to national averages and a normalized (relative) distribution of real estate values is generated and stored. Localized economic conditions including cost of living and standard labor rates are compared with national averages. A normalized (relative) distribution of labor cost is generated and stored. These costs are then factored into the labor component of the replacement value equation. Home size, configuration, and materials data are combined to generate an estimate of the "materials" component of the replacement value equation. A processing algorithm retrieves the risk, replacement, and valuation variables, and the insurance provider's operational support cost in order to generate a profitable pricing target for each customer segment. Additional localized factors, such as risk of fire, hurricane, crime and the like are factored against replacement value and the insurance provider's operational expense to support business in order to automatically generate an insurance premium rate. By using this method to continuously monitor and store the variation in these variables, an insurance provider is able to stay abreast of costs and replacement values very precisely.

Turning to dashed line box 3 of FIG. 11, a computer evaluates variances between currently stored pricing and the newly calculated pricing resulting from the algorithm of dashed line box 2 above, and then updates the pricing accordingly. Next, the system identifies those customers whose pricing has changed, and automatically sends out notification of the new pricing to those customers. Different levels of notification may be implemented in order to handle more appropriately customers whose pricing has risen by different amounts, percentages or the like. For example, a customer whose pricing goes up by four percent might best be notified personally by an agent of the company, whereas someone whose pricing goes up by a fraction of a percent might best be notified by a formal letter.

As discussed in the background, a business partnership is an arrangement in which one internet site (the referrer or partner) directs customers to another site (the merchant or vendor). Technical aspects of the transfer should be invisible. One method of achieving this generally seamless transition is through "deep integration" between the business partners. Deep integration entails customer data transfer, in a secure environment, between business partners, plus process design such that merchant purchase completion is the logical conclusion to the customer experience.

Figure 12:
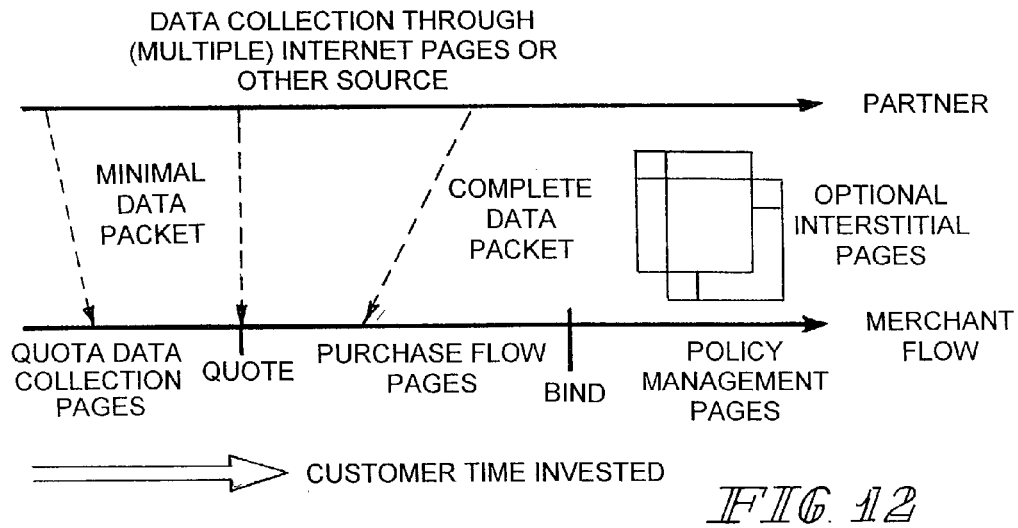

According to an illustrative embodiment of the invention, a new method for a business partnership in which one internet site directs customers to another site is described in FIG. 12. Because the attrition between the classes of internet users, for example browsers, prospects, and customers, is tremendous, a merchant or service provider would like to obtain qualified leads and quickly execute a purchase. Business partnerships are one route for obtaining internet user referrals that have prospered on the internet.

A business partnership is an arrangement in which one internet site (the referrer, a business partner) directs customers to another site (the merchant or vendor), usually under a fee arrangement. Business partnerships have varying levels of complexity from a simple "Click Here" hyperlink to a full qualification and customer specification process before prospect transfer. One desirable form of business partnership is an online "mall" or "aggregator" which offers comparison shopping among many vendors for a standardized product. A prospect, or lead, from this site has already indicated interest in purchasing the product, specified the desired product, and probably determined that a merchant is acceptable. When a prospect is transferred to the merchant, the merchant is responsible to close the sale. A second desirable business partnership is an "affinity" relationship that permits logical cross-selling opportunities. For example, a car purchase site may form an affinity relationship with a financing provider and a car insurance provider.

Several factors have been identified as relevant to converting prospects to customers. Simplicity, speed and "comfort" or trust are positively related to closing a sale. Thus, a prospect who arrives at a merchant site should be only minimally aware that a site "handoff" has occurred. Some differences are part of the expected customer experience, in particular, merchant branding is visible after the move. This is called site cobranding. However, all technical aspects of the transfer should be invisible. One method of achieving this generally seamless transition is through "deep integration" between the business partners. Deep integration entails customer data transfer, in a secure environment, between business partners, plus process design such that merchant purchase completion is the logical conclusion to the customer experience.

Figure 13:
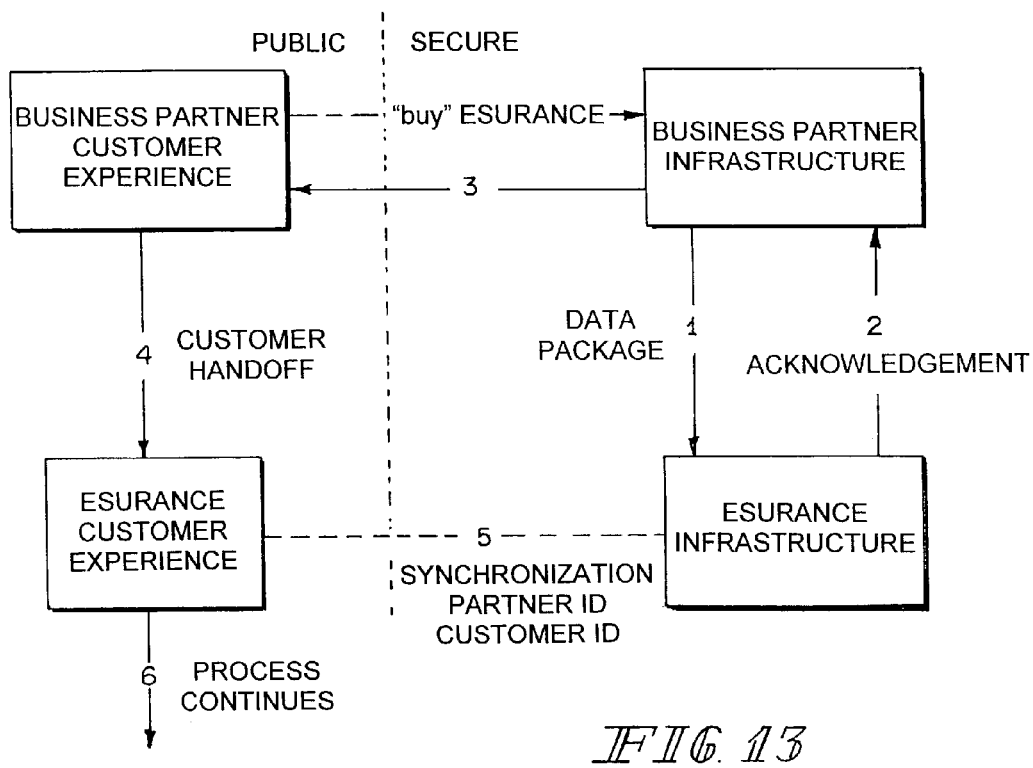

FIG. 12 illustrates this relationship. The customer begins deep partner integration on a partner site. At some point, potentially after many data entry sessions on the partner site, the customer chooses to purchase from the merchant. From the customer's perspective, the user session is then transferred to the merchant's site. This transfer may include routing through partner-specific dedicated interstitial pages. Once on the merchant's site, the customer experience may either be cobranded (for example, merchant and business partner) or single branded (for example, merchant or private label). FIG. 13 illustrates a context diagram illustrating the logical portions of the technical architecture and the macro transactions in order. On the public side, the customer experiences the business partner. The customer is handed off to the merchant. The customer experiences the merchant. The purchase process then continues. On the secure side, the customer's experience with the partner interacts with the partner's business infrastructure. The partner's infrastructure interacts with the merchant's business infrastructure via the passage of a data package from the partner to the merchant and an acknowledgment from the merchant to the partner. The customer's experience with the merchant is synchronized via the partner identification and customer identification with the merchant's business infrastructure. The customer experience is coordinated on the "back end" or infrastructure to increase the likelihood that the customer is smoothly handled and the technical details are hidden.

There are several benefits to this business model. The system is flexible in that the data transfer can occur at multiple logical insertion points in the merchant's flow. This flexibility is enhanced by data pre-population support in the system. Further, many partners with varying data encoding formats and different data packets can be supported concurrently. Additionally, the system can be configured to used secure Hypertext Transfer Protocol (HTTP) over the public internet or use dedicated connectivity when justified by volume. Further, the online customer experience permits a business partner to cross-sell additional products and increase the business partner's perceived value to the customer.

The architecture for online lead handoff includes information transfer and user redirection. It employs a transport protocol (a network protocol used for exchanging information), a network (the physical connectivity between the partner and the merchant data colocation), a message format (formatting of the information exchange between the partner and the merchant), error handling (making sure the user experience in case of system errors is handled in a way that results in minimal inconvenience and concern to the user), security to protect private customer information, performance (criteria established to achieve reasonable response time for transfers), bandwidth (the ability to connect multiple users at the same time), and reporting (how to report all lease and closures from the merchant to the partner).

Information transfer is the process by which lead information is exchanged from the partner's website to the merchant's website. This communication should be reliable and secure. It is usually achieved through a Transmission Control Protocol/Internet Protocol (TCP/IP) connection, either a socket or HTTP. It is responsible for connection the partner site to the merchant site, detecting whether the merchant site is available, compressing/decompressing the data to optimize communication overhead. It marshals information in and out of the network pipe at both ends. It parses eXtensible Markup Language (XML) formatted information exchange at both ends. The information typically includes the partner name, customer identification provided by the partner, and customer information. It detects whether the merchant connection is alive or dead. It detects whether the transfer of information was successful or not.

User redirection is the process by which a user is redirected from the partner website into the merchant website to initiate the purchasing process. User redirection is achieved through an HTML Href on the partner web page. The exchange of information should be done through the query string of the Uniform Resource Locator (URL) referral. The user redirection should contain at least the customer identification, generated by the partner, to map the user being redirected to the information already mapped in the database. This should be synchronized with the information transfer process to make sure that a user is redirected once the lead information has been passed over to the merchant.

The transport protocol should be a synchronous protocol to provide reliability of the information transfer. If a raw TCP/IP socket is chosen, then a specific protocol, such as a TCP/IP handshaking sequence, must be agreed upon between the partner and merchant. A raw TCP/IP socket permits the merchant and partner to avoid any platform dependency in their connection. For user redirection to the merchant's website, HTTP is a convenient standard, and standard HTTP redirect can be used.

It is contemplated that the public internet will be the network. It is a convenient medium of physical connectivity. Information transfer can also be achieved through, for example, a frame relay or other dedicated system. Factors involved in the choice of physical network implementation include security, reliability, installation and maintenance cost, and the like.

To adhere to industry standards, XML is contemplated as the message format. It is contemplated that a different data interface specification will be defined for each partner. However, there should still be a common message format for all partners, even though some data fields will not be applicable for certain partners. It is contemplated that a different parser will be used for each partner. In addition, standard compression algorithms can be used to reduce communication overhead.

Error handling is designed around certain guiding principles. For information transfer, in case of a failure such as a connection time-out or the like, the user should be redirected to explanation pages with customer support telephone numbers for the merchant and the partner. The partner should always be made aware if the lead was successfully processed by the merchant's application. The partner should always be made aware that the client has been redirected to the merchant's site. These objectives can be achieved by having the merchant acknowledge the correct handling of the information through a return code formatted in XML. A suitable acknowledge format is:

<?xml version="1.0" standalone="yes"?>
<Transaction>
<Header>
  <MessageSize>215</MessageSize>
  <ApplicationID>A123987456</ApplicationID>
  <ReturnCode>CODE</ReturnCode>
</Header>
</Transaction> where, for example, CODE equals 0 for a successful transfer, 222 for an unsuccessful transfer that can be retried, 111 for a redundant lead that cannot be retried, and 333 for invalid data that cannot be resent. If the merchant website is not available for information transfer, the partner site communication layer should time out after a specified time, such as, for example, twenty seconds. In this case, the partner website should redirect the customer to an error page, stating that the merchant's website is not available, and providing a customer service representative telephone number. Whenever the merchant website is not available at the time a redirection is attempted, the user will encounter the standard timeout page of a web browser. In that case, the partner should ensure that if the user hits the "back" button, the user will be able to resubmit the HTTP request for the merchant website. Whenever the user is on the merchant website, any error should be part of the standard error handling procedures defined for the system.

All personal information transmitted over the network should be secure. All communications should be encoded using, for example, Secure Sockets Layer (SSL) (128 bits if supported by the browser). This encoding should be used for all customer interaction with the merchant over the network, and therefore, should also be used in all user redirection. It can also be used for the information transfer for communications over the internet. If greater security is necessary or desirable, a private network may be used.

To provide reasonable performance for lead handoffs, the amount of information should be less than about 2K bytes. This reduces the likelihood that the customer will spend more than about ten seconds waiting to be redirected to the merchant's website. If a larger amount of information needs to be exchanged over the network, or if processing on both the partner and merchant sides exceeds performance requirements, the merchant and partner can explore the use of a private network, such as a frame relay, to speed transfer and avoid a congested public network. The system should have sufficient bandwidth to support twenty simultaneous connections from a particular partner.

Partners should receive monthly reports detailing the number of leads reported from their websites to the merchant. Depending upon the business arrangements between the various partners and the merchant, these reports could also include such additional information as believed necessary or desirable, including, for example, closure ratios (numbers of leads sold), and the like. In order to prepare such reports, it is desirable to track the partner source of each lead. The source information should be stored for an agreed-upon period of time, for example, one month, in order to increase the likelihood that the partner will get appropriate credit for a closed lead. It may be necessary to store this information at the policy level, in the case of insurance.

Three different implementations of these principles are described. In a first implementation, illustrated in FIG. 14, establishes the responsibility to synchronize information transfer and user redirection on the partner website. In a first phase of this implementation, Distributed Component Object Model (DCOM) was used for TCP/IP communication. This phase is performed and acknowledgment is expected before proceeding to a second phase using HTTP Secure (HTTPS) redirection. A second implementation, illustrated in FIG. 15, proposes to execute both phases concurrently to reduce the amount of time a customer has to wait. The synchronization is handled on the merchant's website. A third implementation, illustrated in FIG. 16, is similar to the first implementation, except that it uses HTTPS for both the first (blind post) and second (redirection) phases. In the following descriptions, the following conventions are generally used: A Partner Web/Application Server generally includes a partner's web application where the lead transfer is initiated. A Partner Client generally includes a partner's customer client application that forms the information transfer and communicates with the merchant's server. A Merchant Server generally includes the merchant's server application that accepts the information transfer, processes it and returns acknowledgment to the partner. A Merchant Web/Application Server generally includes the merchant's website which accepts the user session from the partner's website Referring now particularly to FIG. 14, first, the partner sends from the partner website using, for example, TCP/IP raw socket, UDP, or any other protocol, XML formatted information as soon as the user clicks on the merchant's link. The lead information is inserted into the merchant's database. This should return a success or an error code. If the first phase is successful, the second phase includes redirecting the user from the partner website to the merchant's website. A flow description of FIG. 14 follows. Partner Web/Application Server includes two modules. In module one, the web user makes the request for a transaction. Module two includes a server process initiated by module one. The process waits for the partner client application to return acknowledgment of data transfer The Partner Client also includes two modules, a module three in which the user's data is pulled from the database and an XML data document is built, and module four, a listener module initiated by module three. The XML document is sent to the merchant's server. Module four then waits for an acknowledgment.

The Merchant Server includes a module five in which it receives the XML document from module four, parses the XML document, records data to the database, forms the XML acknowledgment, and sends the acknowledgment back to the partner client's module four.

The Partner Client includes two modules. In a module six, it receives the acknowledgment from the merchant's Server. Then it exits to a module seven in which it parses the acknowledgment XML, writes an acknowledgment to the database, and passes control back to the module Web/Application Server.

The Partner Web/Application Server includes two modules, a module eight, which exits the waiting state of module two when acknowledgment data is returned from client application, and passes control to a module nine. Module nine sends the blind post to the Vendor web. Module nine then passes the user session to a module ten. At this point, the partner's application exits A Merchant Web/Application Server includes module ten which receives the POST from module nine and starts the web application Error Handling in this implementation involves four different types of errors. Data error describes the situation in which the merchant's XML parser encountered an XML error and also the situation in which the data delivered to the merchant's server was insufficient to corrupted. In these cases, the merchant's XML parser application raises an error flag, with agreed-upon error codes, and returns an XML error acknowledgment to the partner's sender application. An illustrative error format would be:

<?ml version="yes"?>
<Transaction>
<Header>
<ApplicationID>A123987456</Application ID>
<Return Code>222</ReturnCode>
</Header>
</Transaction> where 222 is the error code and A123987456 is the partner-generated customer ID. Upon the receipt of the error message, the partner's application will act on the error message and direct the user's session according to the partner's guidelines. The different options include displaying an error message with customer representative phone numbers, and giving the customer the choice to resubmit the data. Note that the partner website has complete control over the error handling this case.

Time Out Error describes the situation in which the connection the merchant's XML parsing application was timed out. The partner's information transfer should set a timeout interval (for example, 20 seconds) for lead exchange with the merchant's application and enforce the timeout if no acknowledgment was received in specified time. The partner's application will act upon the timeout message in a, similar manner to that described above.

Errors after the information transfer phase include those in which there was a successful information transfer phase and an error on the merchant's website. The merchant posts an acknowledgment to the partner website, for example, of the following form:

<?xml version="1.0" standalone="yes"?>
    <Transaction>
      <Header>
        <ApplicationID>A123987456</ApplicationID>
        <ReturnCode>0</ReturnCode>
      <Header>
    </Transaction> where 0 is the success code and A123987456 is the partner-generated customer ID. On receiving a successful acknowledgment, the partner's web server initiates the user redirection phase. From that point forward during the communication, the user's experience will be the merchant's sole responsibility and all errors will be handled by the standard error handling procedures. In case of a system error, the customer will be offered the choice to return to the partner web site.

In case of a successful information transfer, there is still the possibility of internet outage or of a complete unavailability of the merchant's web server during the user redirection phase. In either of these events, the user session will time out. It is the partner's responsibility to handle the error and redirect the user to error pages, with a customer service representative's number for both the partner and the merchant.

Referring now particularly to Fig. D, this implementation is structured in three phases. In the first phase, the partner sends from the partner website (using TCP/IP raw socket) XML formatted information as soon as the user clicks on the merchant's link. (Asynchronous event). The second phase includes redirecting the user from the partner's website into the merchant's website. In the third phase, the merchant's web server waits for information transfer to complete. Meanwhile the lead information is inserted into the merchant's database. This should return error codes if any that affect the waiting module of the merchant's web server.

In this implementation, a Partner Web/Application Server includes a module one in which a web user makes a request for a transaction, and a module two which creates a minimal amount of user data and posts it to the merchant's web server. A Merchant Web/Application Server includes a module three which receives the POST from Module two, starts up the web application, and displays received user data and a 'please wait' page. A module four of the Merchant Web/Application Server waits for the partner's merchant server application (module seven, a description of which follows) to return acknowledgment data. A Partner client includes two modules, a module five in which user data is pulled from the database and an XML data document is built, and a module six, which is a listener module started by module three. The XML document is sent to the merchant's server, and module four waits for the acknowledgment The Merchant's Server includes a module seven which receives the XML document from module four, parses the XML document, records the data to the database, forms the XML acknowledgment, sends the acknowledgment back to the partner client's module six, and sends an acknowledgment (for example, a continue flag) to the merchant's Web/Application Server module four.

The Partner Client includes two modules, a module eight, which is a listener that receives the acknowledgment from the merchant's Server (module seven), and exits to a module nine which parses the acknowledgment XML and writes the acknowledgment to the database.

The Merchant Web/Application Server includes a module ten which receives the user session from module four. Module four exits the waiting state when an acknowledgment flag is returned from module 4. Module ten receives the user session from module four, gets user data from the database, and continues with the web application.

In this implementation, data errors are handled as follows. a data error occurs when the merchant's XML parser encounters an XML error or when the data delivered to the merchant is insufficient or corrupted. In any of these cases, the merchant's XML parser application raises error flag, using agreed-upon error codes, and returns an XML error acknowledgment to the partner's sender application. An illustrative error format is as follows:

<?xml version="1.0" standalone="yes"?>
    <Transaction>
      <Header>
        <ApplicationID>A123987456</ApplicationID>
        <ReturnCode>222</ReturnCode>
      <Header>
    <Transaction>

A time out error occurs when the connection to the merchant's XML parsing application is timed out. It is not possible for the partner's application to enforce a timeout, since a user session is already on the merchant's web server. The merchant's web application takes responsibility for enforcing timeout and taking appropriate action, for example, by displaying an error message and offering a link back to the partner's web site.

For errors occurring after the information transfer phase in which there was a successful information transfer phase and a subsequent error on the merchant's website, the merchant posts an acknowledgment to the partner website in the form of:

<?xml version="1.0" standalone="yes"?>
    <Transaction>
      <Header>
        <ApplicationID>A123987456</ApplicationID>
        <ReturnCode>0</ReturnCode>
      <Header>
    </Transaction> where 0 is the success code and A123987456 is the partner-generated customer ID. The user session is already on the merchant's web server. The customer goes through standard merchant screen flow. If any error occurs, the merchant has full responsibility for defining the user experience. Typically, the user will be offered a choice to return to partner's web site.

In case of a successful information transfer, there is still the possibility of internet outage or of complete unavailability of the merchant's web server during the user redirection phase. If this occurs, the user session will time out. It is the partner's responsibility to handle the error and redirect the user to error pages, with customer service representatives' numbers for both the partner and the merchant.

Figure 15:
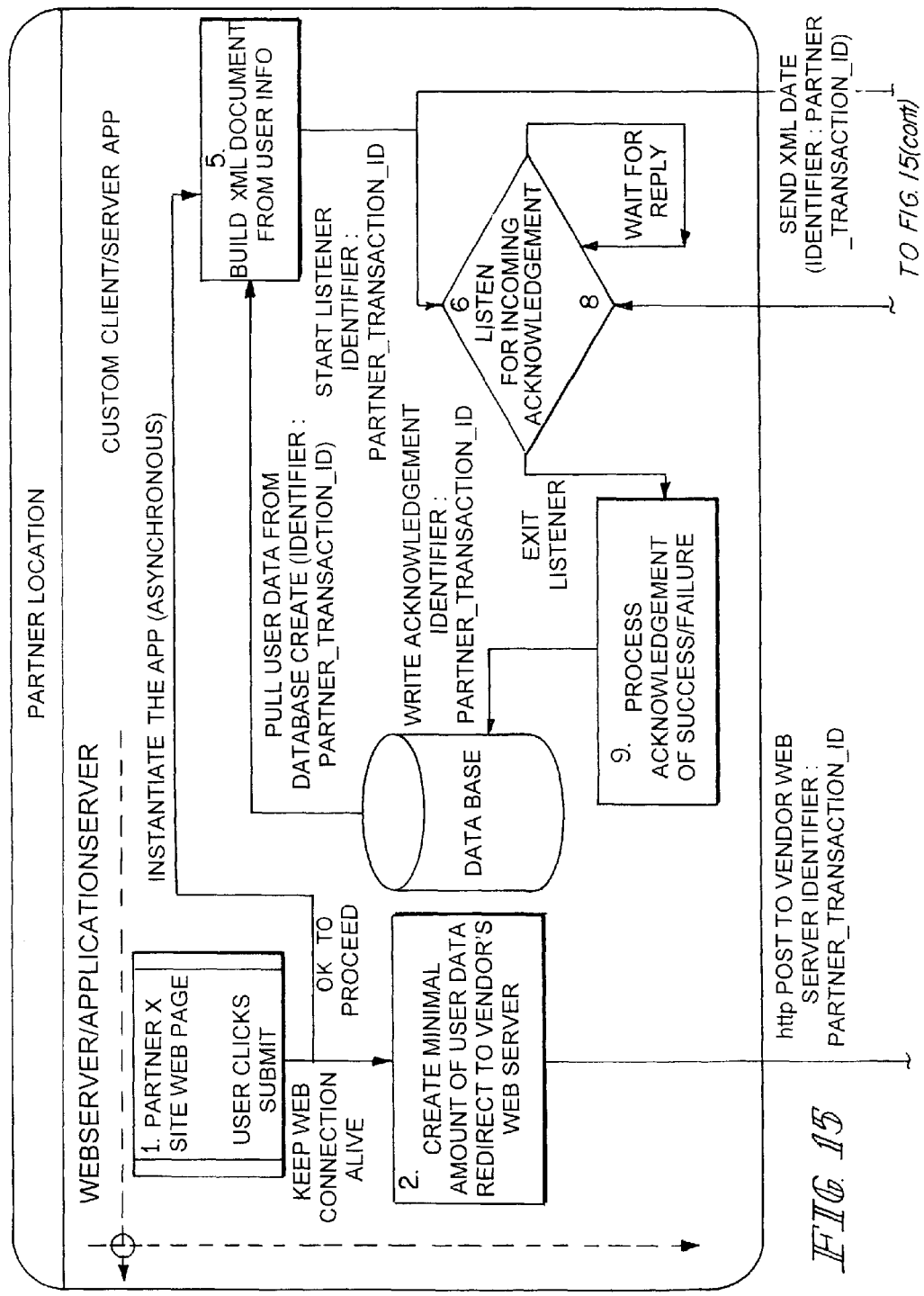
Figure 15:
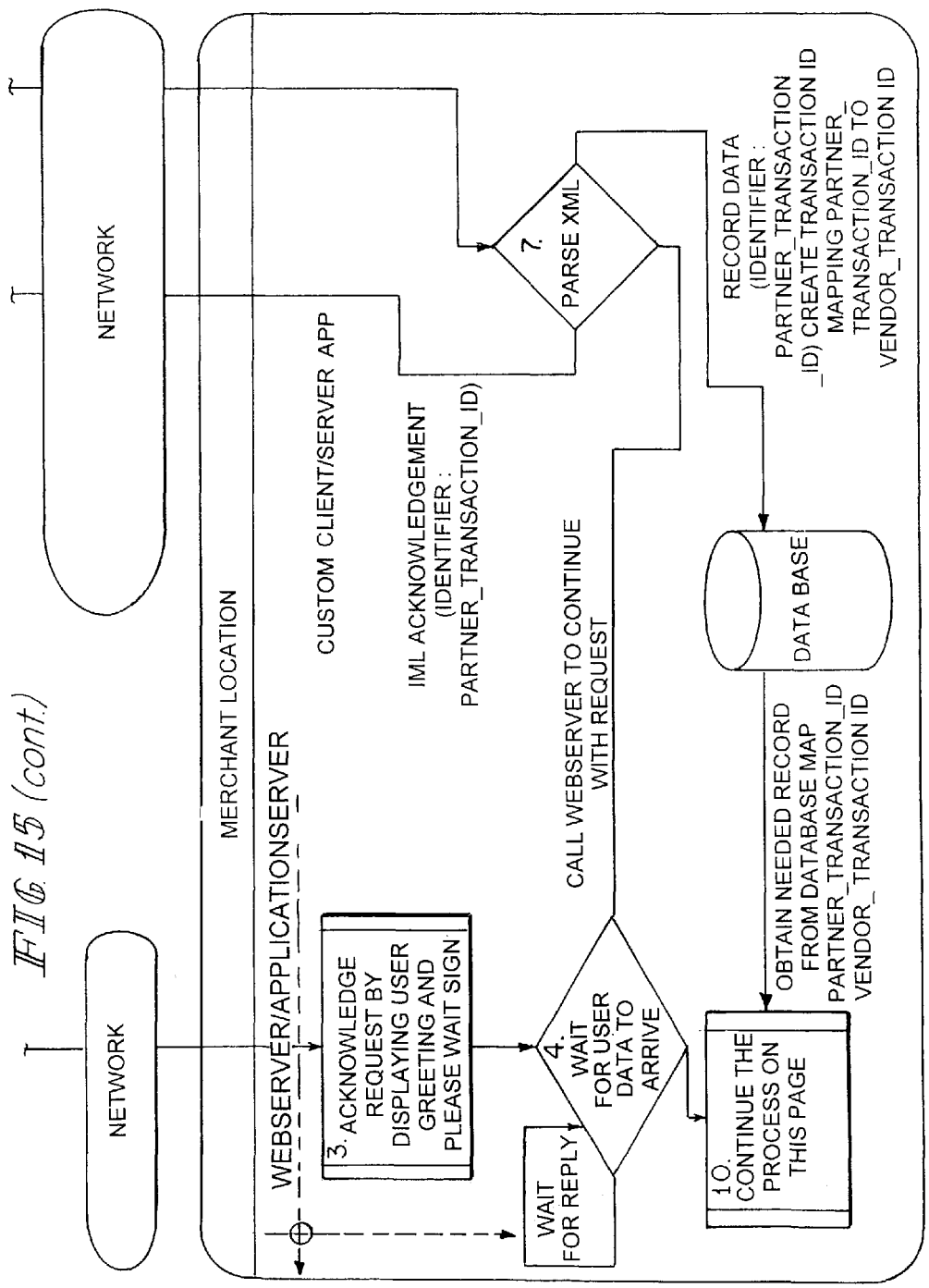

Referring now to FIG. 16, a Web/Application Server solution includes two phases, using HTTPS connection only. First, the partner sends XML formatted document from the partner's website (using HTTPS POST) when the user clicks on the merchant link. The lead information is inserted into the merchant database. This should return error codes if there are any. If the first phase is successful, the second phase consists in redirecting the user from the partner's website into the merchant's website. FIG. 16 illustrates a flow description of this implementation. This describes the synchronous events that occur among the various system components. A Partner Web/Application Server includes a module one in which a user makes a request for a transaction, a module two in which the user's data is pulled from the database and an XML data document is built, and a module three which receives the XML document from module two and makes an XML HTTP post to the merchant's website A Merchant/Application Server includes a module four which parses the XML document, records data to the database, forms the XML acknowledgment, and returns the acknowledgment back to the Partner Web/Application Server module three. The Partner Web/Application Server module three receives the acknowledgment from module four, writes it to the database, and passes the user session to the merchant's server module five. The Merchant/Application Server module five receives the user session from module three and starts up the web application Error handling is as described above in connection with the description of FIG. 14. The three different implementations illustrated in FIGS. 14-16 are similar. The main notable difference lies in the ease of development and maintainability for each solution. The implementation illustrated in FIG. 14 requires custom TCP/IP raw socket development and agreement on a handshake sequence between the partner and the merchant. If communication is over the public internet, the partner and the merchant will have to bear the cost of encryption software to guarantee customer privacy. The implementation illustrated in FIG. 15 requires the use of an asynchronous protocol to be able to cause concurrently the information transfer and the user redirection. The complexity of the processing is believed to make it somewhat more difficult to develop and to maintain. The implementation illustrated in FIG. 16 uses standard HTTP protocol and does not necessitate any extra development to set up the communication. SSL is a standard off-the-shelf encryption software accepted relatively broadly in the e-commerce community. The scalability of the application should be taken in account when choosing among the approaches illustrated in FIGS. 14-16. The approaches illustrated in FIGS. 14 and 15 require effort to optimize scalability of partner integration. The approach illustrated in FIG. 16 can benefit from the merchant's scalability efforts on its main front end web servers, for example, where the merchant intends to expand dramatically its ability to handle concurrent sessions on its website. Independent of the particular implementation, the network is another important factor in the final platform decision. The use of frame relays can greatly enhance availability of the merchant's integration application and ensure independency from internet traffic and outages. This also enhances customer privacy since it will be implemented over a private line. However, this requires both the partner and the merchant to invest in software, hardware and rental cost for a virtual private line. The merchant will have to bear this cost with each partner with whom it has a connection implemented via frame relay. Use of the public internet reduces the up-front and long-term investment since no specific installation is required for every partner. Typically, the merchant will use SSL or some other similar scheme to achieve customer privacy for its own website, and will have consultants certify compliance with security standards.

The invention claimed is:

1. A method of purchasing and selling insurance including:
   receiving, at a server computer and over a network from a client computer associated with a user having a prior insurance policy with a prior insurance company, information regarding property owned by the user;
   receiving, from a first insurance company, a quote for insurance of the property;
   receiving, at the server computer, estimated quotations for insurance of the property from other insurance companies;
   transmitting, from the server computer and to the client computer, the quote for the insurance from the first insurance company and the estimated quotations from the other insurance companies, the quote for the insurance from the first insurance company and the estimated quotations from the other insurance companies presented on a server website associated with the server computer, the server website providing a first user session for the user;
   receiving, at the server computer and through the server website, a request to purchase the insurance from the first insurance company, the request to purchase including credit information for the user and at least one user specified policy term distinct from a quoted policy term;
   generating, by the server computer and in response to the receiving of the request to purchase the insurance from the first insurance company, an electronic prior policy cancellation letter to the prior insurance company for the prior insurance policy;
   sending, electronically from the server computer to the prior insurance company, the prior policy cancellation letter with a digital signature from the client computer and an authorization by the user to apply a user balance from the prior insurance company to the insurance from the first insurance company;
   storing, in a database, user data associated with a server transaction identifier, the user data obtained from the first user session;
   transmitting, by the server computer and in response to the receiving of the request to purchase the insurance from the first insurance company, an instruction to generate a second user session, the second user session provided by a first insurance company web site hosted by a first insurance company server associated with the first insurance company and having a first insurance company transaction identifier, the second user session being generated based on the user data stored in the database;
   receiving, at the server computer and from the first insurance company server, a confirmation of the second user session being generated;
   redirecting, in response to the receiving of the confirmation, the user from the server website to the first insurance company website associated with the first insurance company, the redirecting performed by mapping the server transaction identifier to the first insurance company transaction identifier;
   initiating with the first insurance company, in response to receipt of an indication that the prior policy cancellation letter has been received by the prior insurance company, new insurance coverage for the user; and
   arranging for the user balance to be sent from the prior insurance company to the first insurance company, the arranging in response to the user balance being available.

2. The method of claim 1, further comprising:
   encrypting, by the server computer and subsequent to transmitting of the instruction to generate the second user session, the user data; and decrypting, by the first insurance company server, the user data.

3. The method of claim 1, wherein the server computer and the first insurance company server use a secure protocol for transmitting the instruction to generate the second user session.

4. The method of claim 1, wherein the property owned by the user comprises a vehicle and the method further comprises maintaining a data set containing including, by a vehicle identification number of a vehicle owned by the user, a year of manufacture of the vehicle, a manufacturer identification of the vehicle, a model designation of the vehicle, and a body style of the vehicle.

5. The method of claim 4, wherein the quote for the insurance from the first insurance company is based on one or more of the year of manufacture of the vehicle, the manufacturer identification of the vehicle, the model designation of the vehicle, and the body style of the vehicle.

6. The method of claim 4, wherein the data set is maintained by another server computer having a database of vehicles.

7. The method of claim 4, further comprising receiving information concerning at least one or more of the year of manufacture of the vehicle, the manufacturer identification of the vehicle, the model designation of the vehicle, and the body style of the vehicle.

8. The method of claim 4, further comprising receiving information regarding at least one individual who will be operating the vehicle.

9. The method of claim 8, wherein the receiving of the information regarding the at least one individual includes receiving a pseudonym.

10. The method of claim 8, wherein the quote for the insurance from the first insurance company is based on the information regarding the at least one individual who will be operating the vehicle.

11. The method of claim 1, wherein the transmitting of the quote for the insurance from the first insurance company and the estimated quotations from the other insurance companies includes comparing the quote for the insurance from the first insurance company and the estimated quotations from the other insurance companies.

12. The method of claim 1, further comprising:
receiving from the client computer additional information regarding the property owned by the user, and
transmitting a second quote from the server computer based on the additional information.

13. The method of claim 1, wherein the transmitting of the quote for the insurance from the first insurance company includes recommending at least one insurance coverage level.

14. The method of claim 1, further comprising receiving additional information regarding the property owned by the user.

15. The method of claim 14, wherein the quote for the insurance from the first insurance company is based on the additional information regarding the property owned by the user.

16. The method of claim 1, wherein the information regarding the property owned by the user includes demographic information regarding an operator of the property to be insured.

17. The method of claim 16, wherein the quote for the insurance from the first insurance company is based on optimizing the quote for the insurance from the first insurance company as a quantity of the demographic information increases.

18. The method of claim 1, further comprising receiving information regarding property to be insured utilizing Hypertext Markup Language capable software.

19. The method of claim 1 further comprising:
monitoring inputs made by the user in the first user session;
determining whether the user is confused; and
providing the user with information if the user is determined to be confused.

20. The method of claim 1, further comprising the first insurance company crediting an account of the user for an amount of the user balance.

21. The method of claim 20, further comprising contacting the prior insurance company to obtain the user balance.

22. The method of claim 1, wherein the at least one user specified policy term distinct from a quoted policy term is selected from one or more of body injury limits, property damage limit, medical payment limits, uninsured/underinsured motorist bodily injury limits, uninsured motorist property damage, collision deductible, comprehensive deductible, rental car limits and emergency road service limits.

23. A method comprising:
receiving, at a server computer over a network and from a client computer, information regarding property owned by the user, the client computing associated with a user having a prior insurance policy with a prior insurance company;
preparing a quote for insurance of the property provided by a first insurance company;
generating, at the server computer, estimated quotations for insurance of the property, the estimated quotations including at least one quote from other insurance companies;
transmitting, from the server computer and to the client computer, the quote for the insurance provided by the first insurance company and the estimated quotations, the quote for the insurance provided by the first insurance company and the estimated quotations presented on a server website associated with the server computer, the server website providing a first user session for the user;
receiving, at the server computer and through the server website, a request to purchase the insurance provided by the first insurance company, the request to purchase including credit information for the user and at least one user specified policy term distinct from a quoted policy term;
receiving, electronically at the server computer and from the client computer, an authorization to cancel the prior insurance policy with the prior insurance company, the authorization including permission to receive, by the first insurance company, a balance transfer from the prior insurance company and the authorization including a digital signature of the user;
storing, in a database, user data associated with a server transaction identifier, the user data obtained from the first user session;
transmitting, by the server computer and in response to the receiving of the request to purchase the insurance provided by the first insurance company, an instruction to generate a second user session, the second user session provided by a first insurance company website hosted by a first insurance company server associated with the first insurance company and having a first insurance company transaction identifier, the generating based on the user data stored in the database;

receiving, at the server computer and from the first insurance company server, a confirmation of the second user session being generated;

redirecting, in response to the receiving of the confirmation, the user from the server website to the first insurance company website associated with the first insurance company, the redirecting performed by mapping the server transaction identifier to the first insurance company transaction identifier;

initiating with the first insurance company, in response to receipt of an indication that a prior policy cancellation request has been received by the prior insurance company, new insurance coverage for the user.

\* \* \* \* \*